United States Patent [19]

Honey et al.

[11] Patent Number: 4,796,191

[45] Date of Patent: Jan. 3, 1989

[54] VEHICLE NAVIGATIONAL SYSTEM AND METHOD

[75] Inventors: Stanley K. Honey, Newark; Walter B. Zavoli, Palo Alto; Kenneth A. Milnes, Fremont; Alan C. Phillips, Los Altos; Marvin S. White, Jr., Palo Alto; George E. Loughmiller, Jr., Cupertino, all of Calif.

[73] Assignee: ETAK, Inc., Menlo Park, Calif.

[21] Appl. No.: 618,041

[22] Filed: Jun. 7, 1984

[51] Int. Cl.$^4$ .............................................. G06F 15/50
[52] U.S. Cl. .................................... 364/450; 364/449; 364/447; 73/178 R
[58] Field of Search ............... 364/450, 436, 439, 447, 364/449, 457, 460; 73/178 R; 340/990–993

[56] References Cited

U.S. PATENT DOCUMENTS

| | | | |
|---|---|---|---|
| 4,061,995 | 12/1977 | McCrickerd | 364/450 |
| 4,114,437 | 9/1978 | Krogmann | 364/450 |
| 4,347,730 | 9/1982 | Fisher et al. | 364/571 |
| 4,388,608 | 6/1983 | Bernard | 340/24 |
| 4,403,291 | 9/1983 | Von Tomkewitch | 364/450 X |
| 4,470,119 | 9/1984 | Hasebe et al. | 364/449 |
| 4,521,777 | 6/1985 | Nakamura et al. | 340/995 |

Primary Examiner—Parshotam S. Lall
Assistant Examiner—Thomas G. Black
Attorney, Agent, or Firm—Fliesler, Dubb, Meyer & Lovejoy

[57] ABSTRACT

A vehicle navigational system and method for tracking a vehicle, including a programmed computer, sensors for sensing the distance traveled and heading of the vehicle, and a stored map data base identifying a map of an area over which the vehicle is moving, in which the computer calculates and advances dead reckoned positions of the vehicle in response to distance and heading data, provides data identifying a contour of equal probability containing the dead reckoned positions and having a probability of containing the actual location of the vehicle, derives multiparameters from the map data base, and updates a given dead reckoned position and the contour using a highly developed vehicle navigational algorithm if a more probable dead reckoned position exists based upon the given dead reckoned position, the contour and the derived multi-parameters.

78 Claims, 34 Drawing Sheets

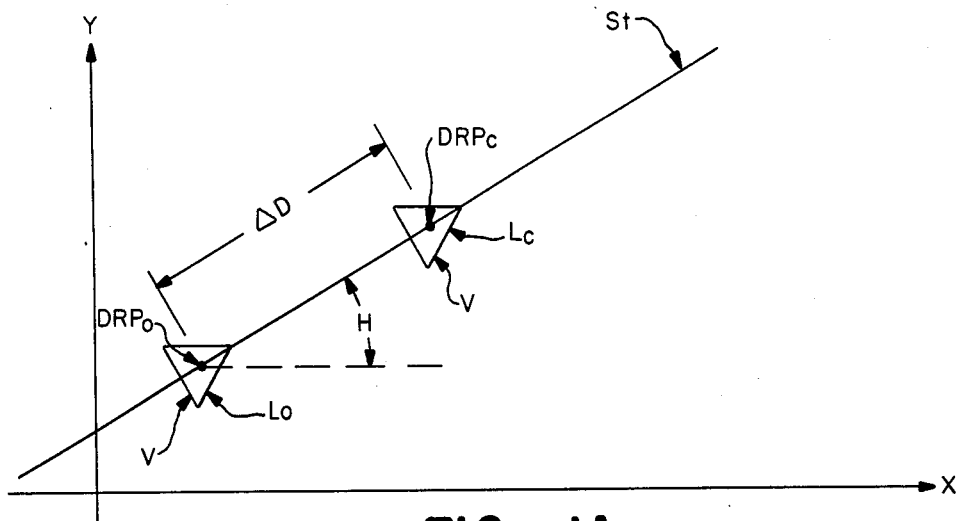
FIG.—1A
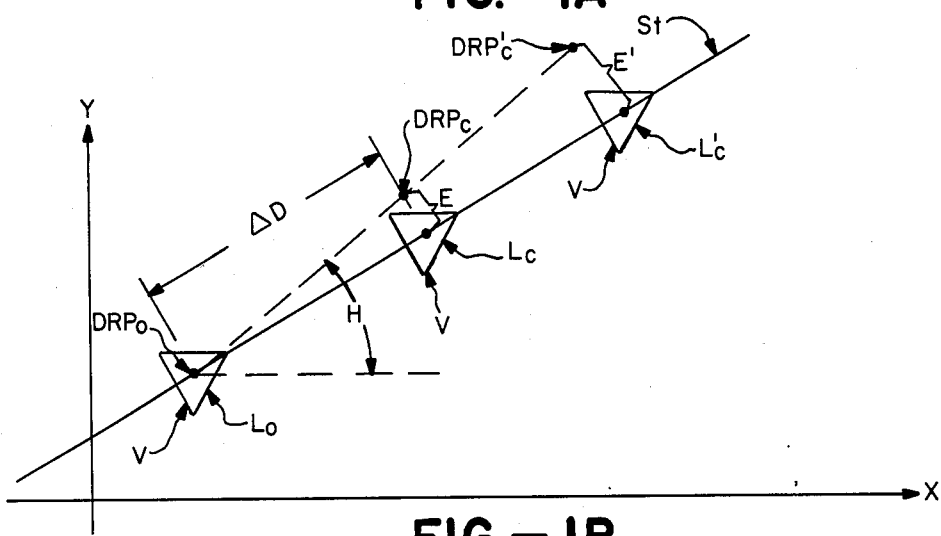
FIG.—1B
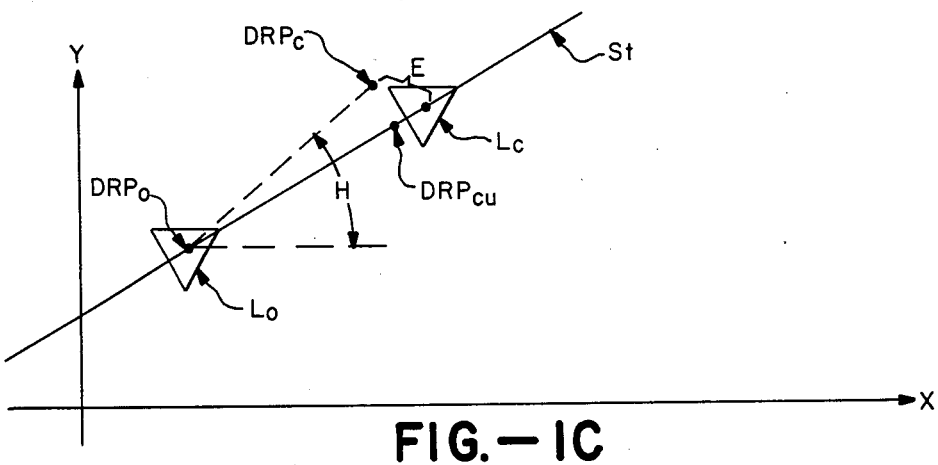
FIG.—1C

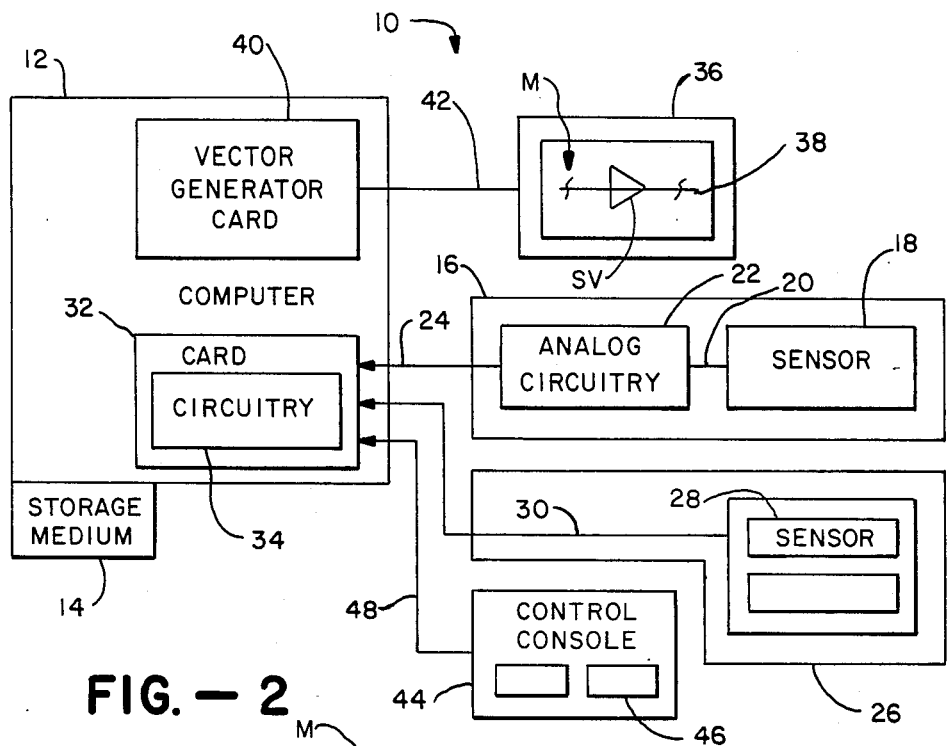
FIG. — 2
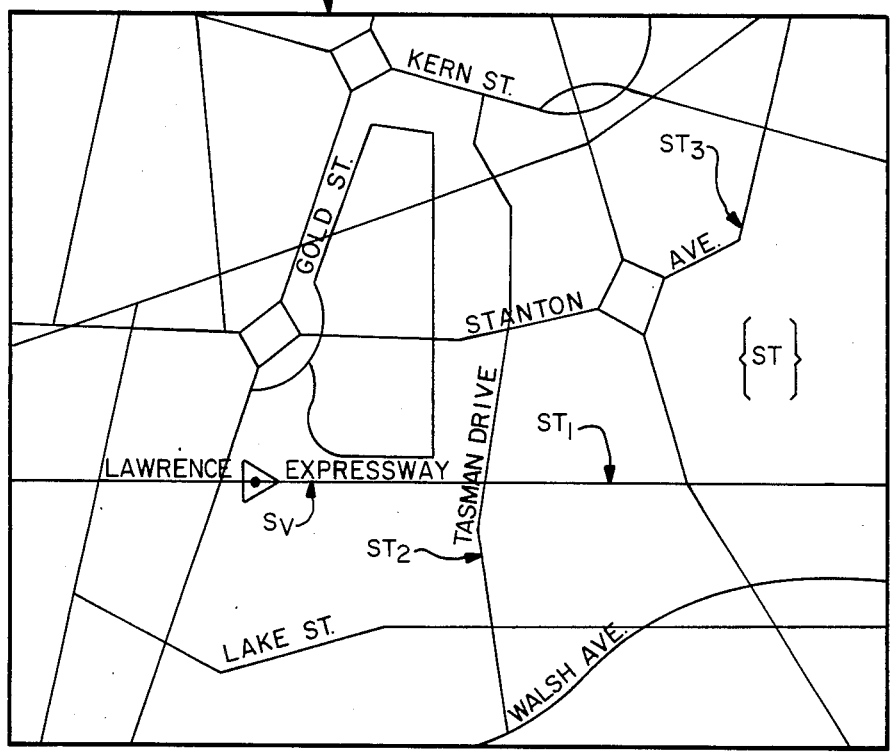
FIG. — 3

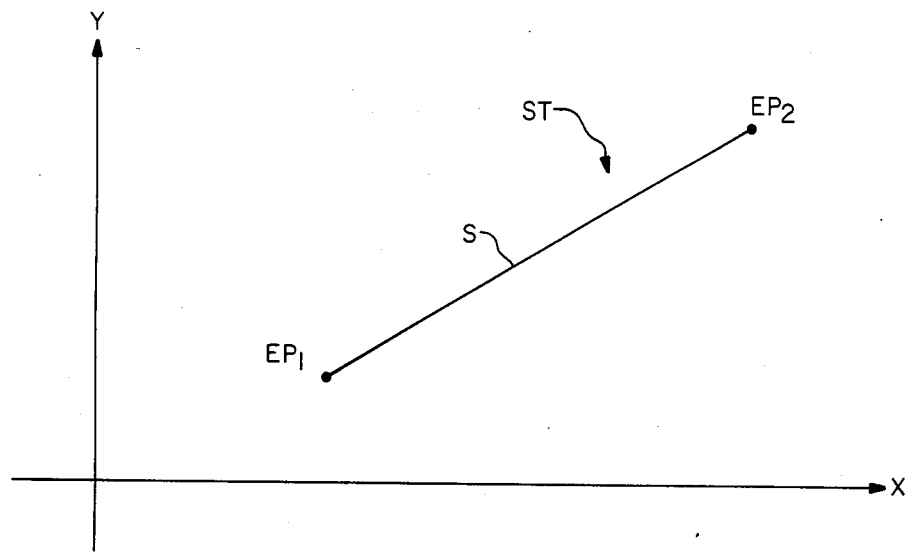
FIG.— 4A
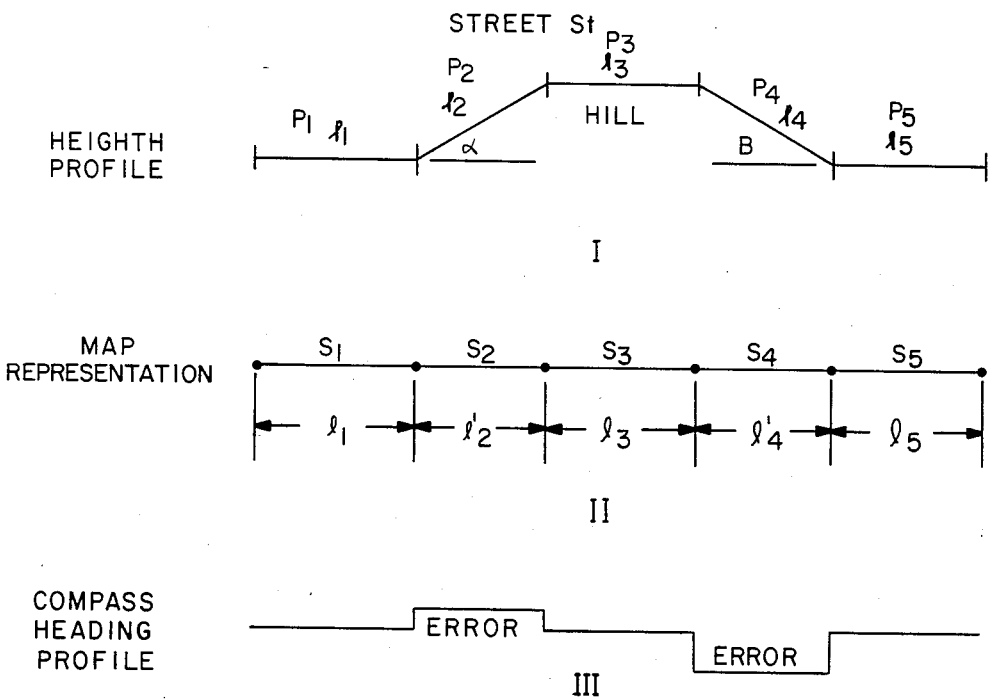
FIG.— 4B

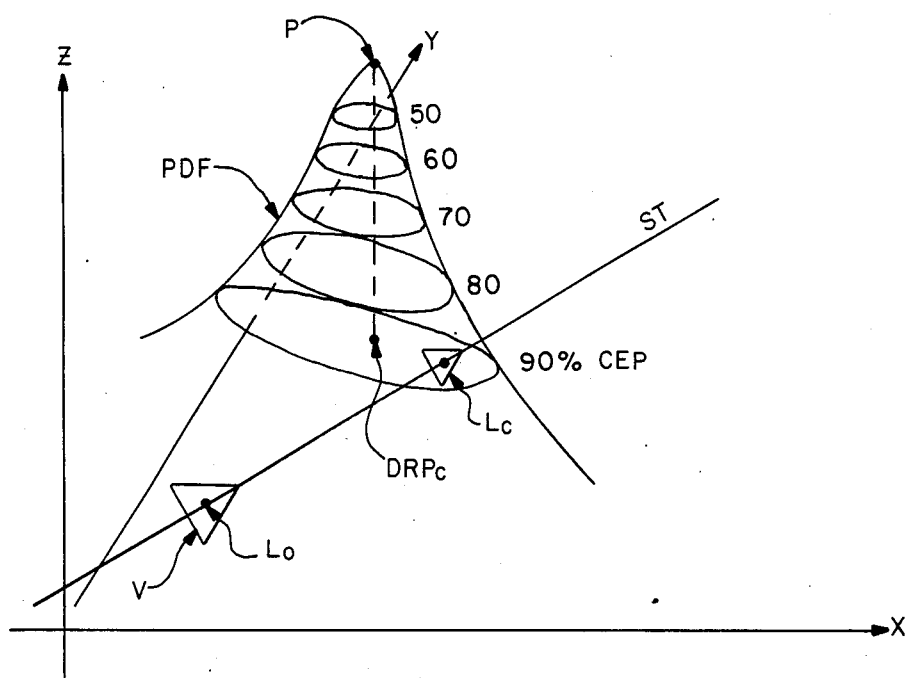
FIG.— 5A
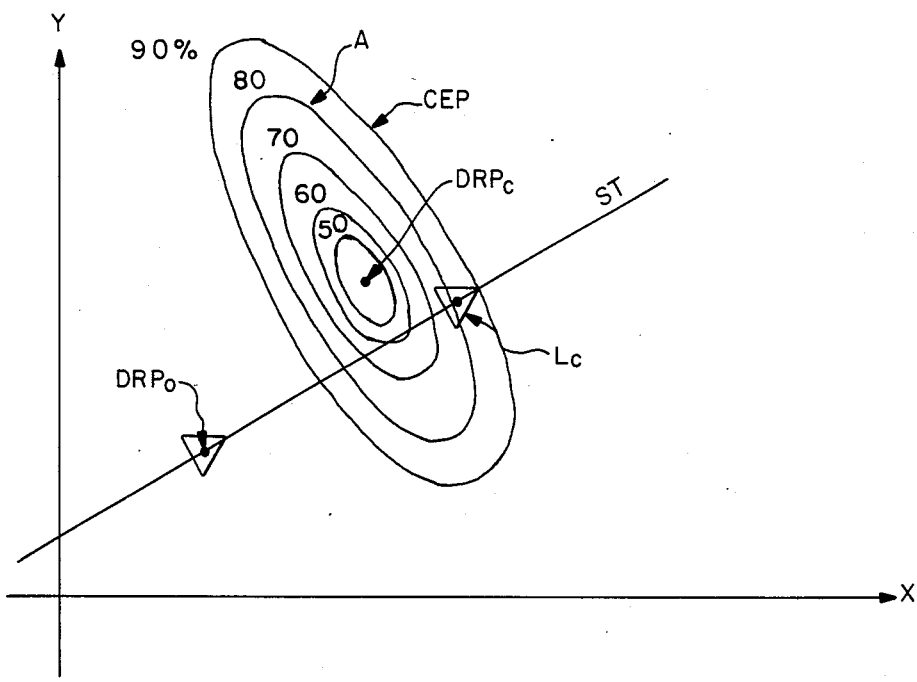
FIG.— 5B

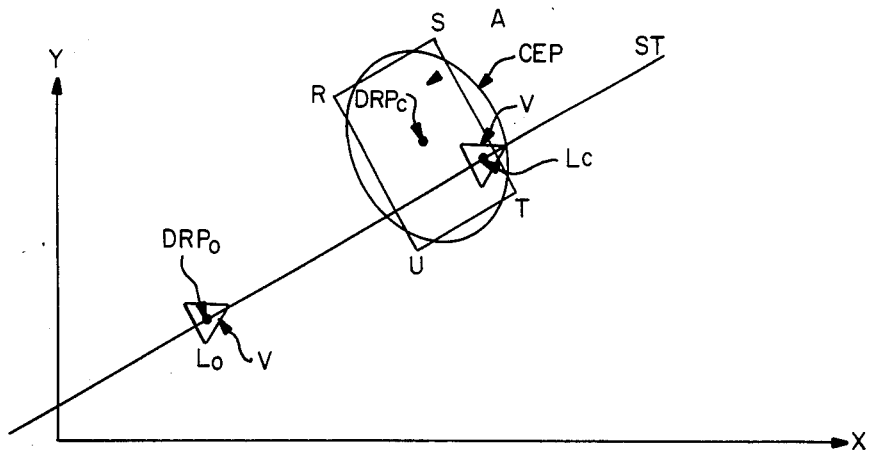
FIG.—5C
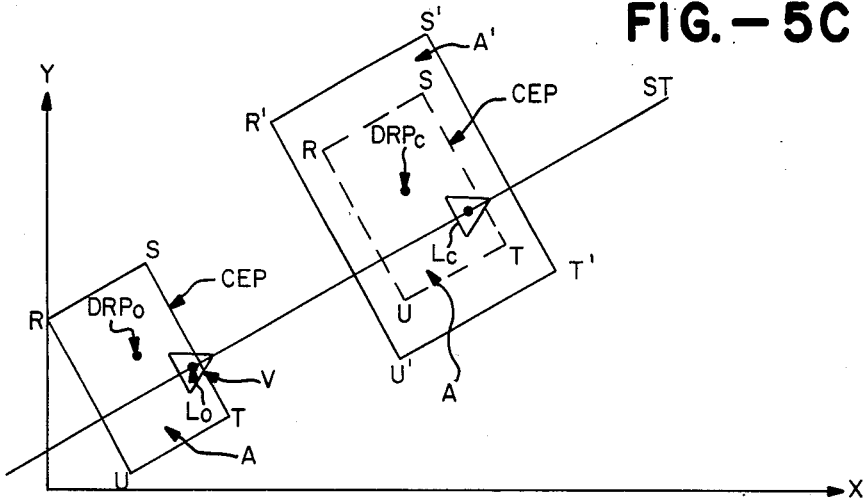
FIG.—5C-1
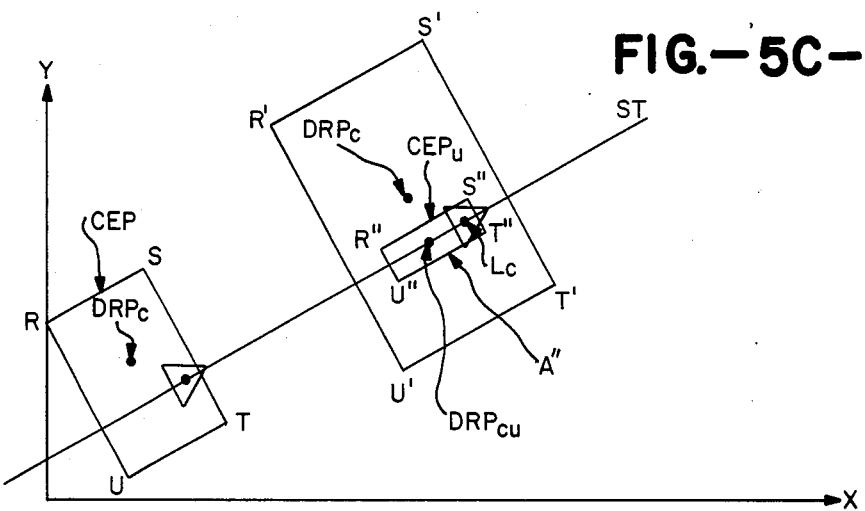
FIG.—5C-2

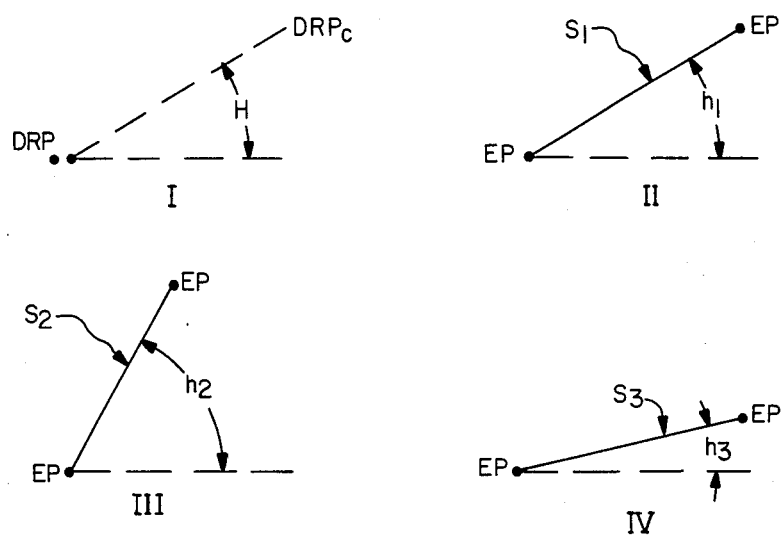
FIG.—6A
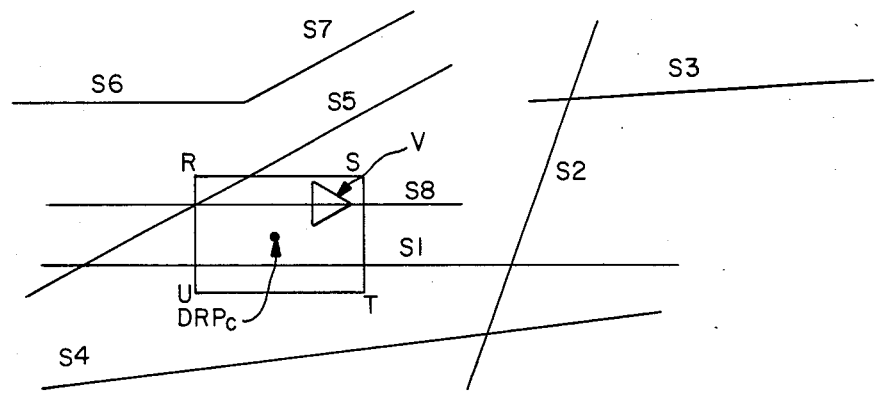
FIG.—6B

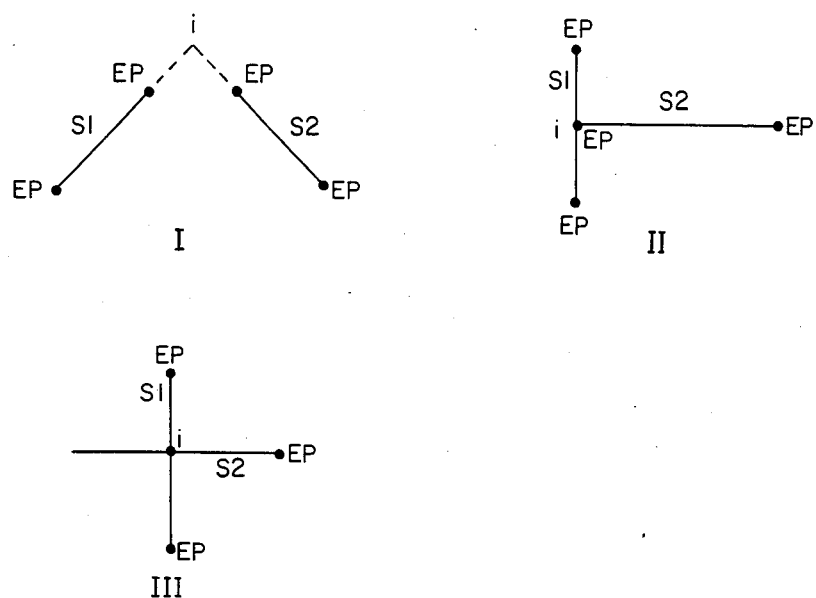
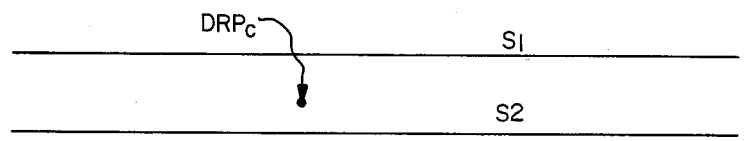
FIG.—6C
FIG.—6D
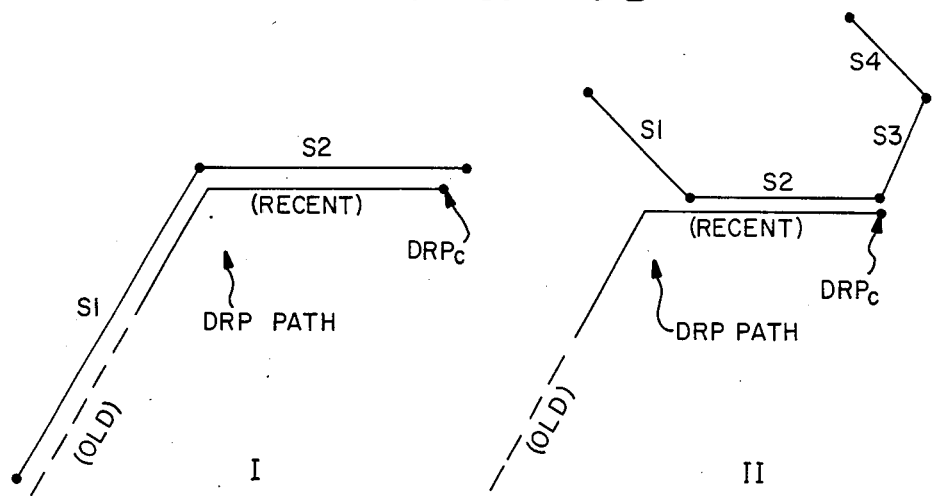
FIG.—6E

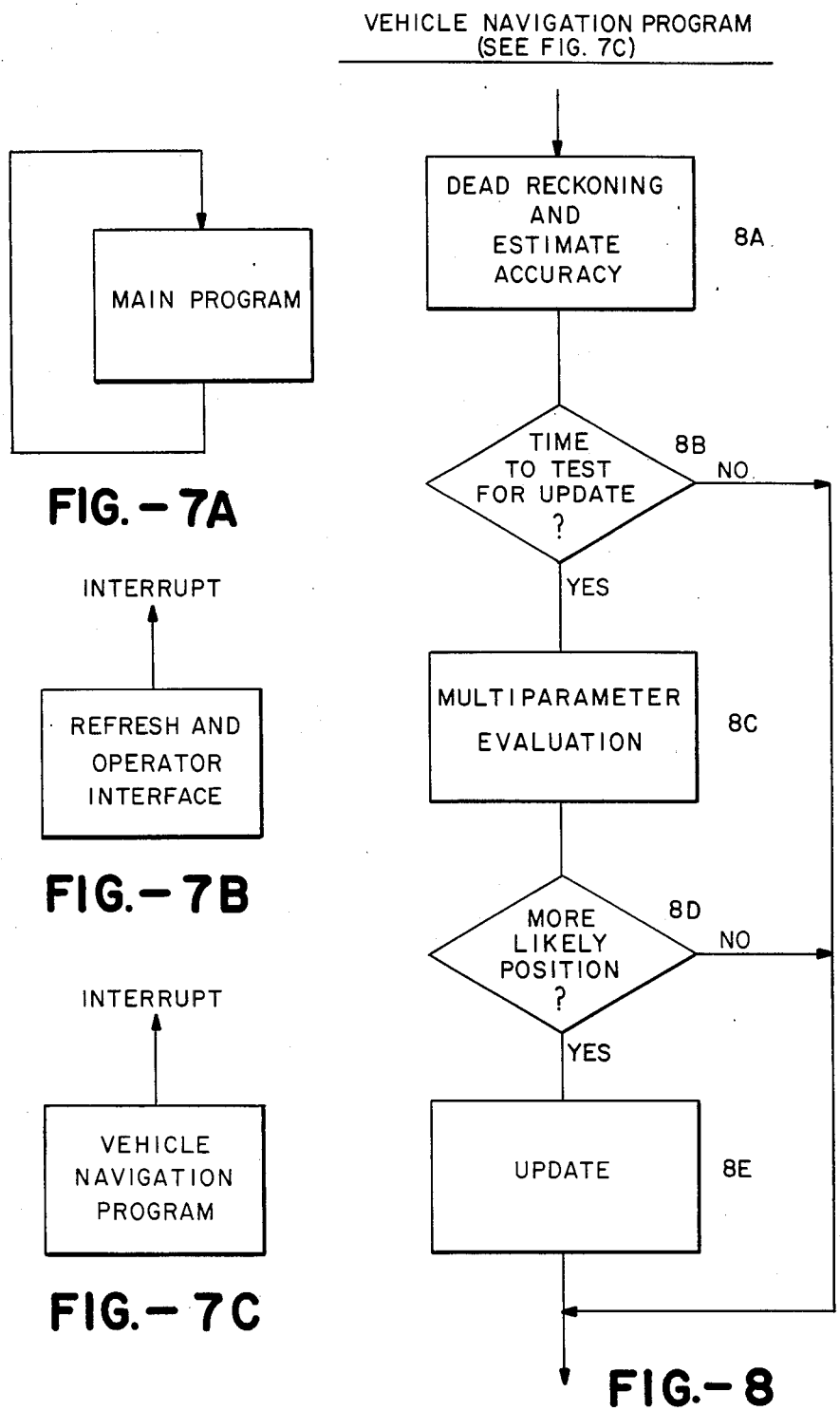

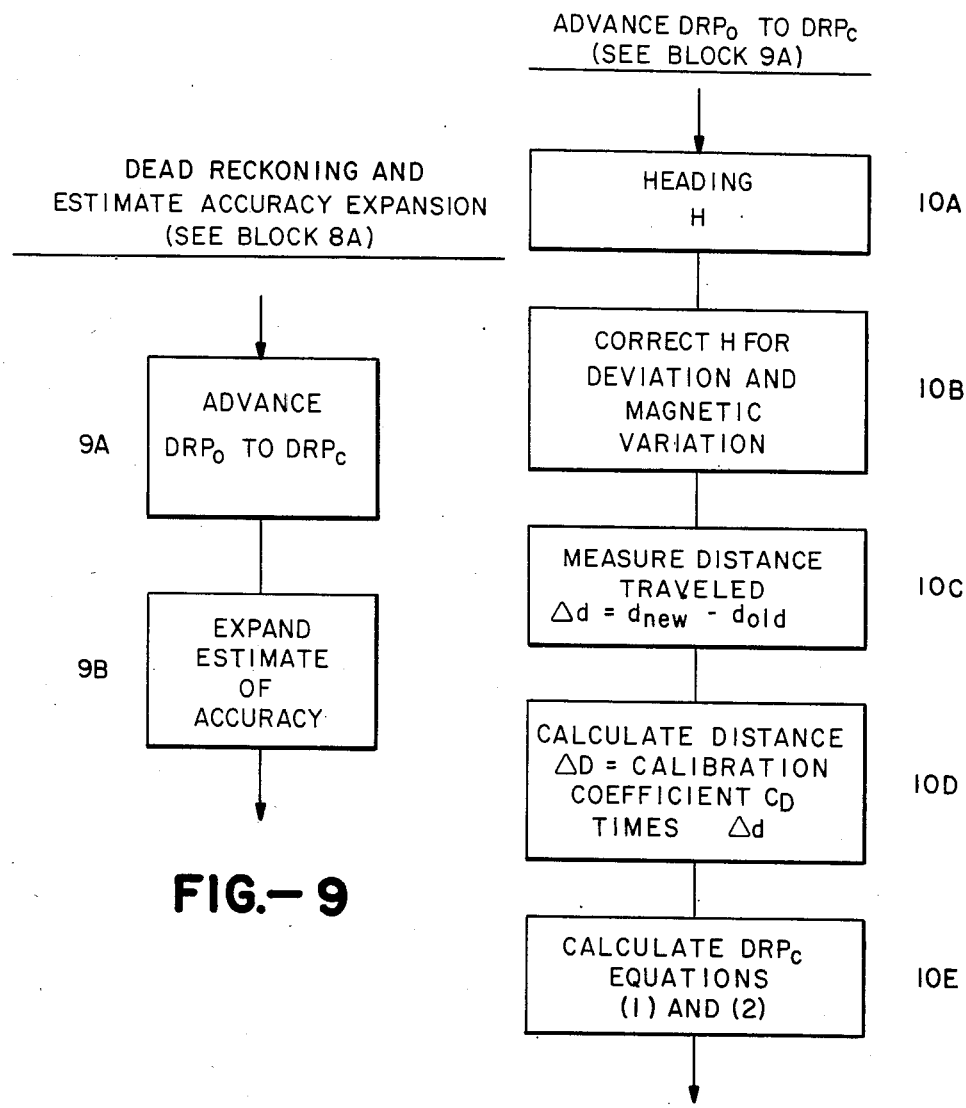

1' $X_c = X_0 + C_F \times \Delta D \times \cos(H')$
2' $Y_c = Y_0 + C_F \times \Delta D \times \sin(H')$
WHERE:
  $\Delta D = C_D \times \Delta d$
  $C_D$ = DISTANCE SENSOR CALIBRATION COEFFICIENT
  $\Delta d$ = UNCALIBRATED DISTANCE MEASURE = $d_{new} - d_{old}$
$d_{old}$ = PREVIOUS DISTANCE SENSOR MEASURE
$d_{new}$ = CURRENT DISTANCE SENSOR MEASURE
  $C_F$ = CORRECTION FACTORS FOR VERTICAL SLOPE
   $H'$ = HEADING CORRECTED FOR MAGNETIC DIP ERROR

FIG.—10

EXPAND ESTIMATE OF ACCURACY
(SEE BLOCK 9B)

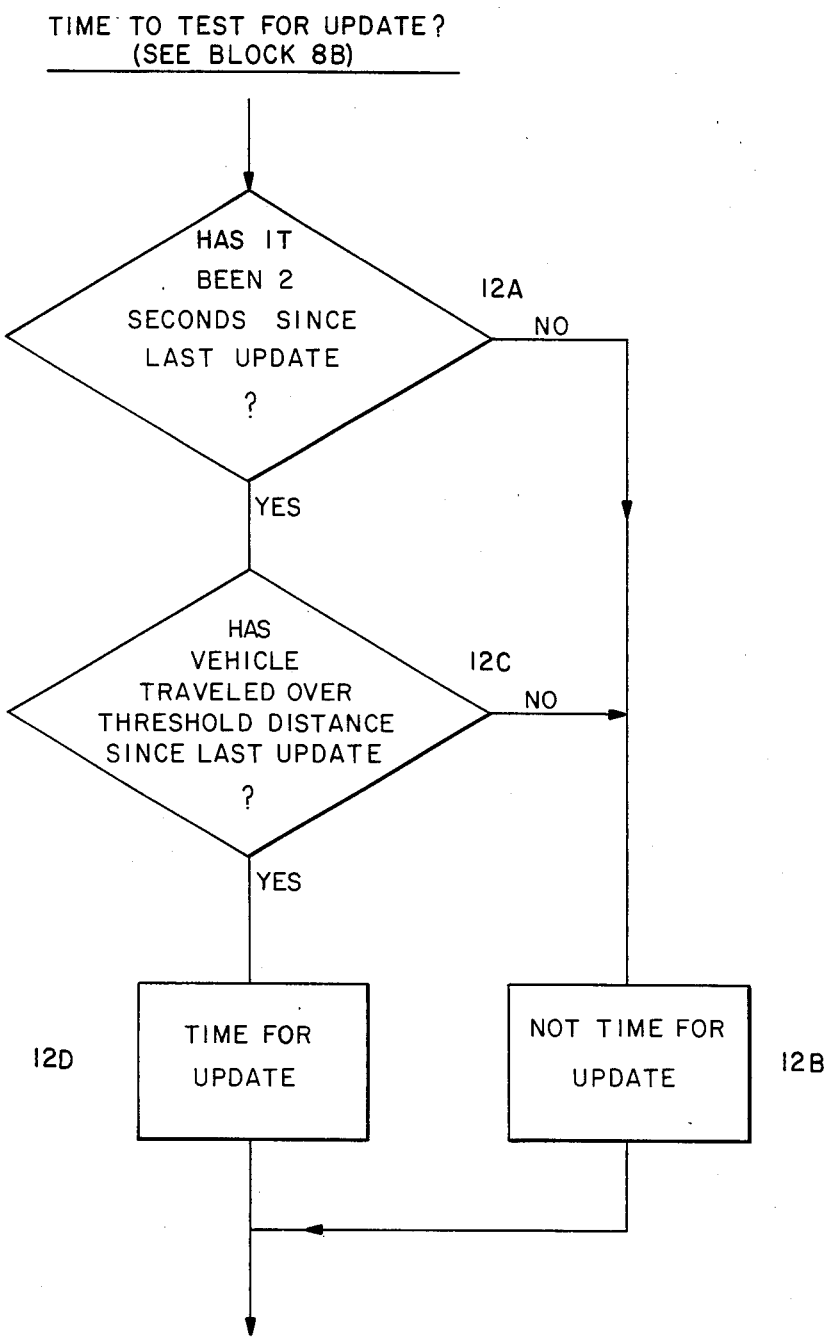
FIG.— 12

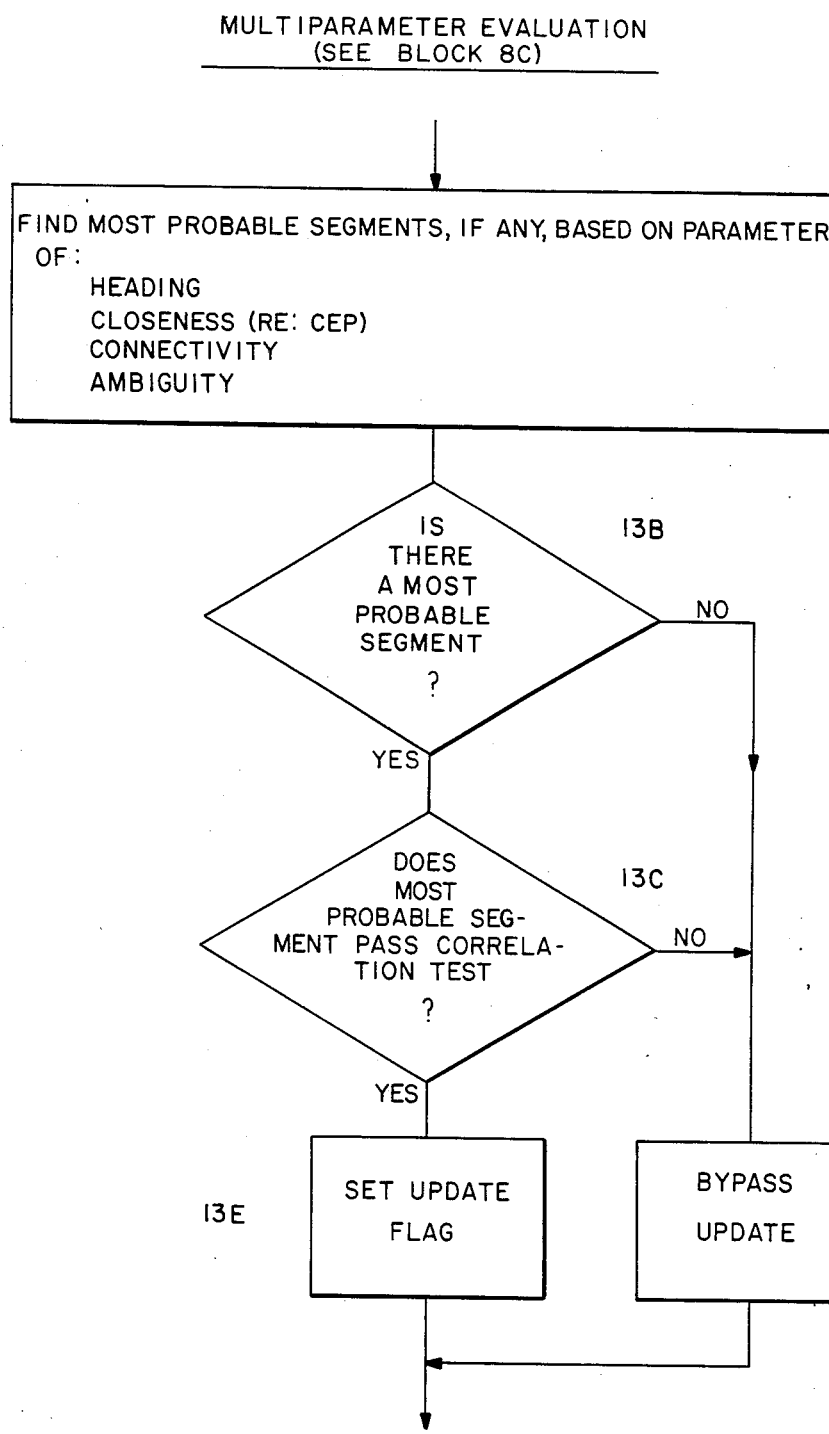
FIG.—13

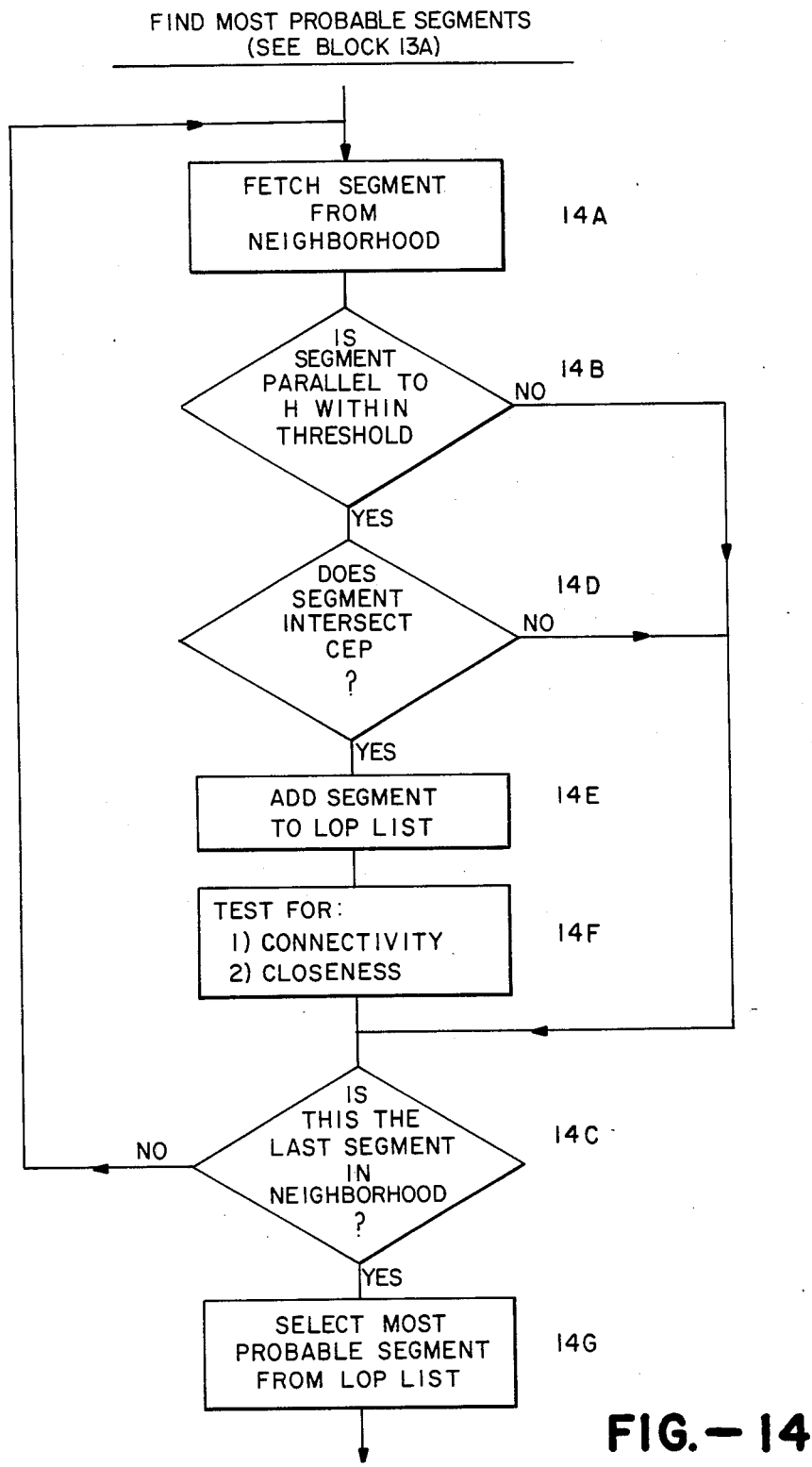
FIG.—14

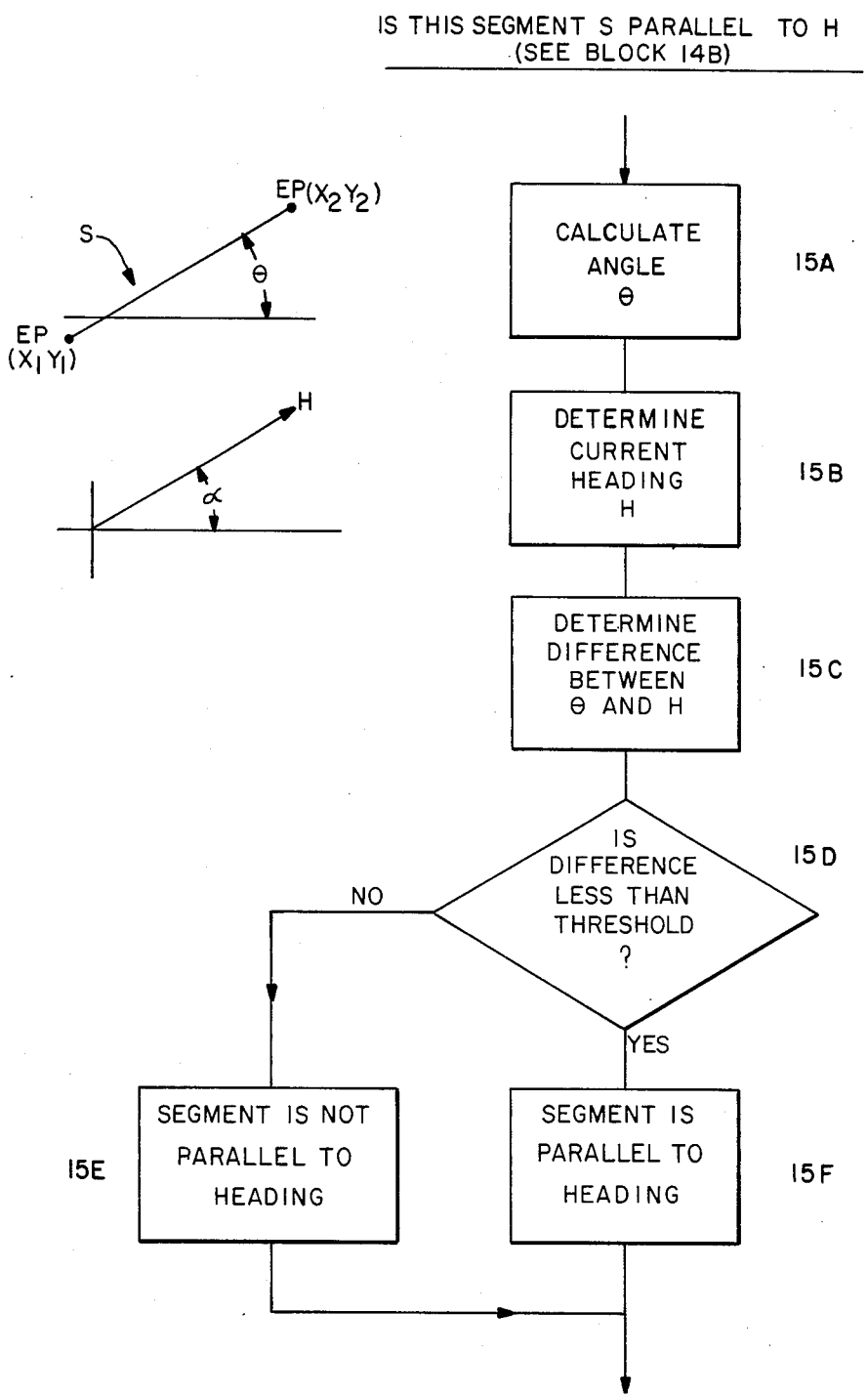
FIG.—15

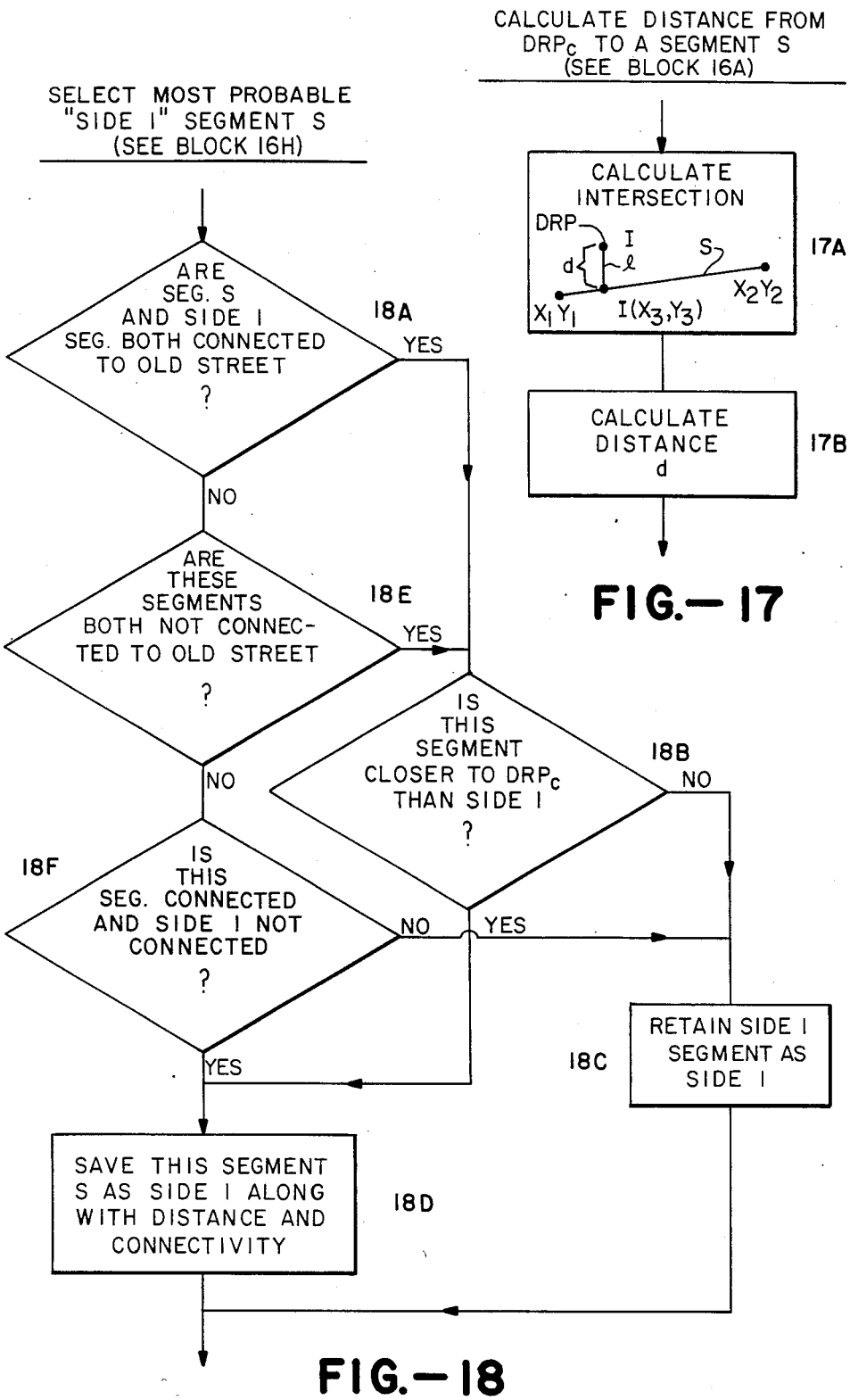
FIG.—17
FIG.—18

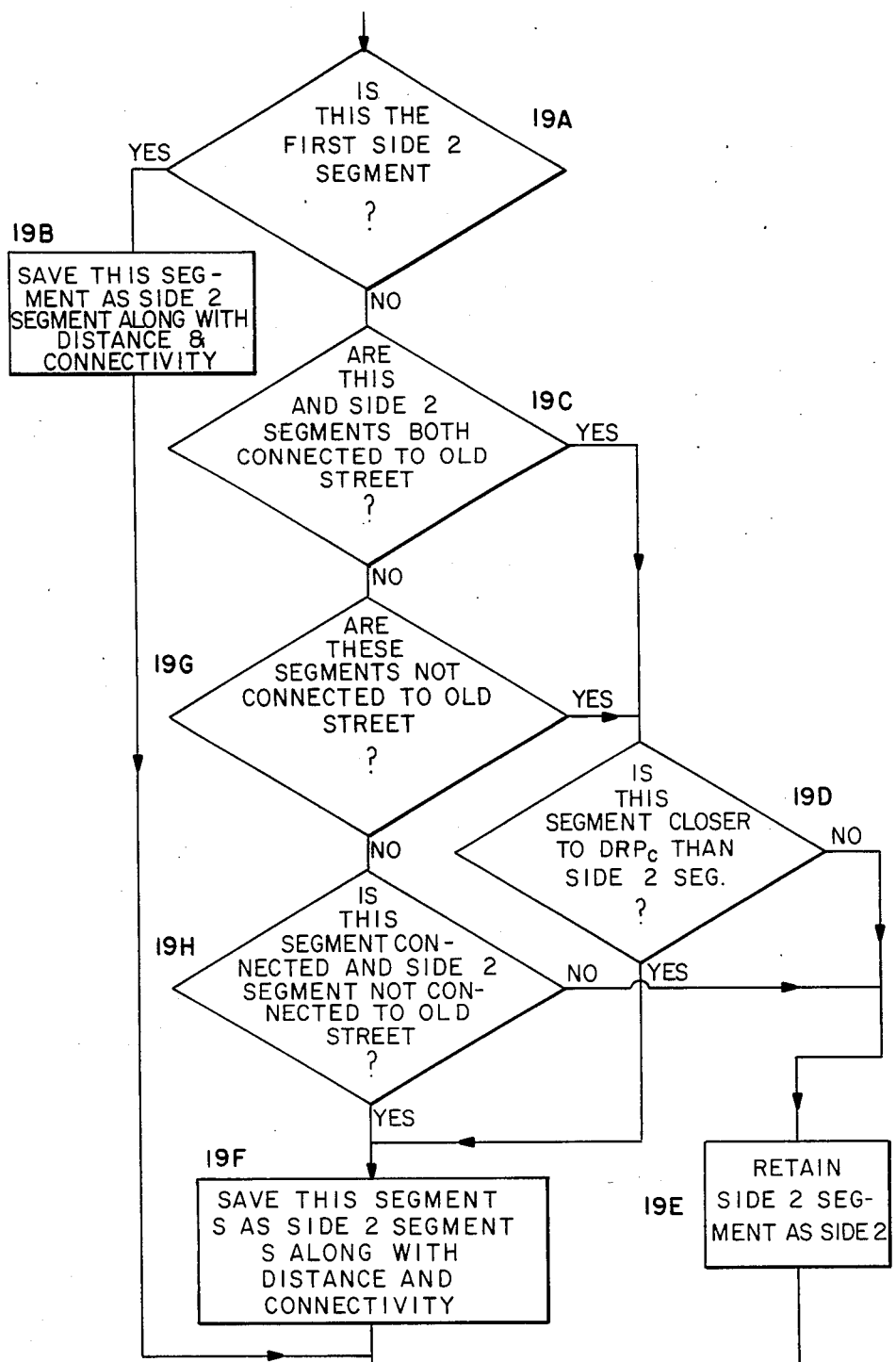
FIG.—19

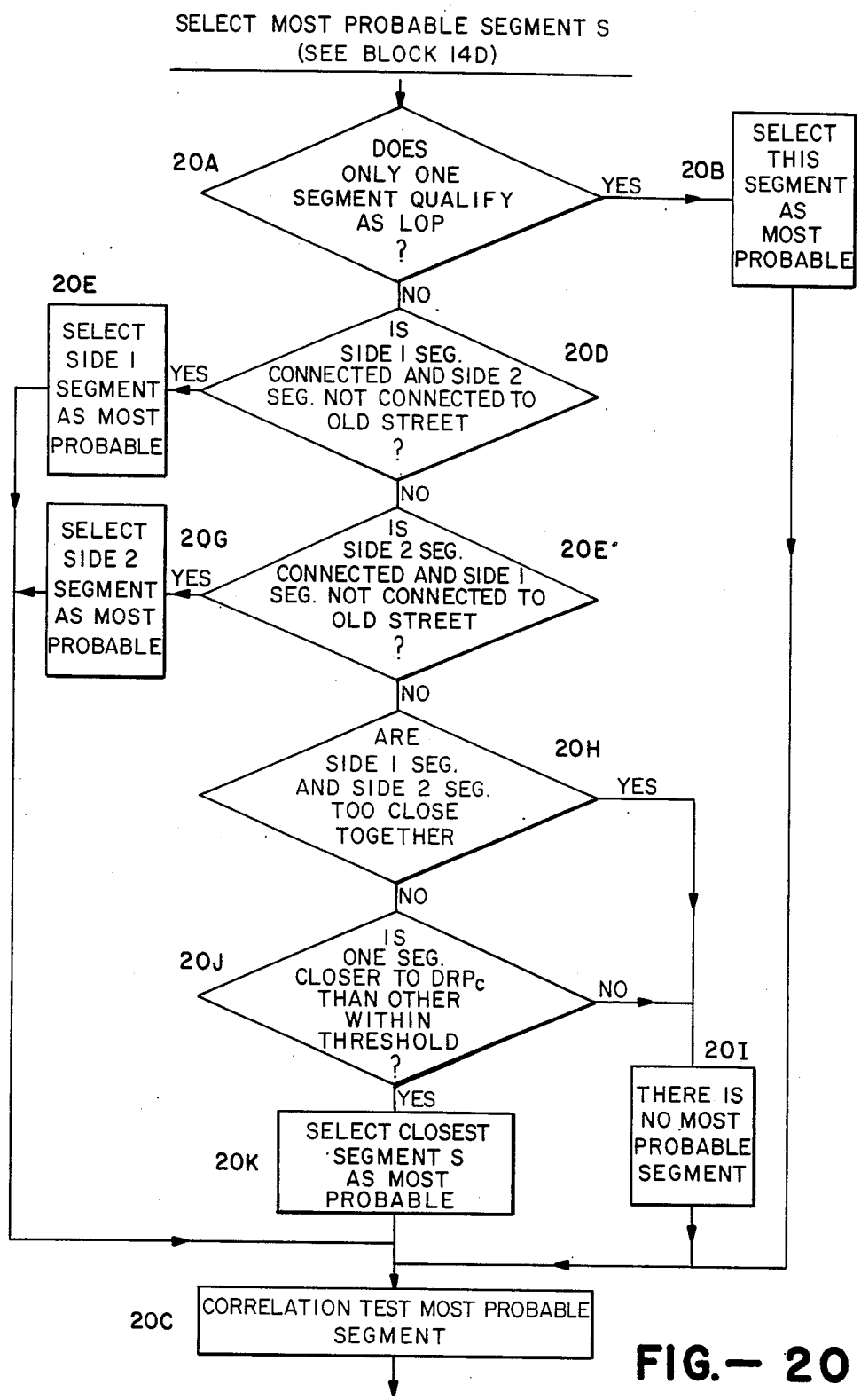
FIG.— 20

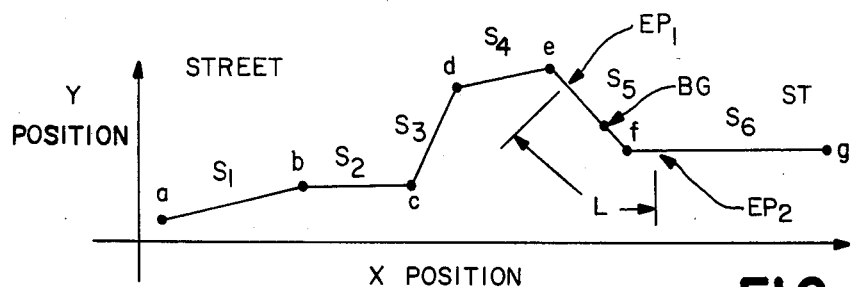
FIG.—24A
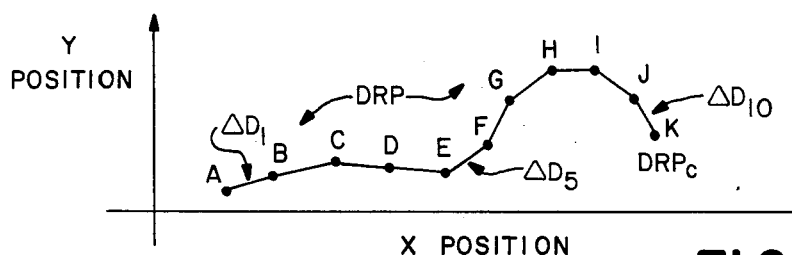
FIG.—24B
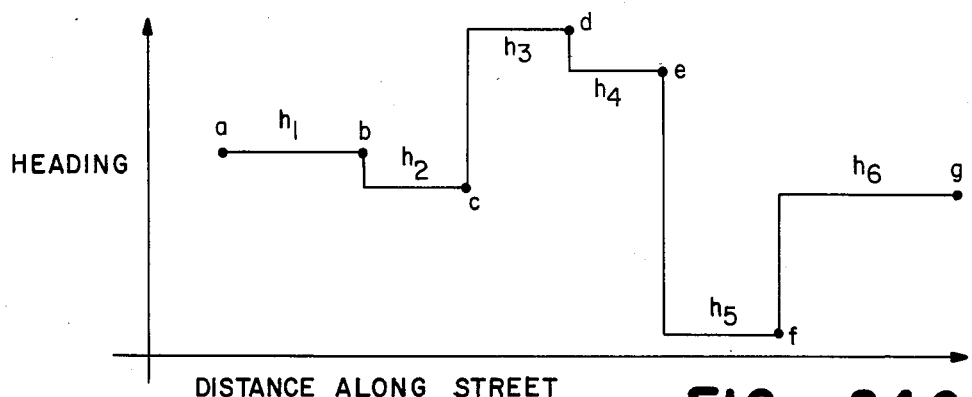
FIG.—24C
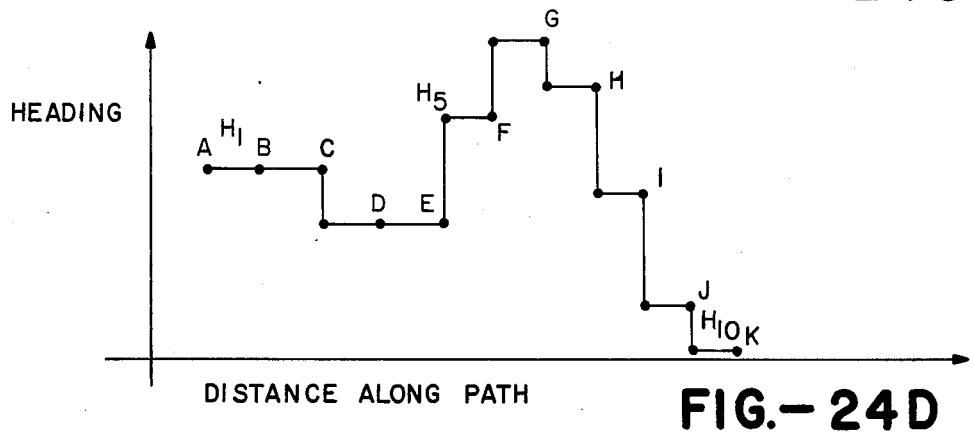
FIG.—24D

UPDATE TO MOST PROBALE POINT ON SEGMENT
(SEE BLOCK 30G)

UPDATE ESTIMATE OF DRP ACCURACY
(SEE BLOCK 28B)

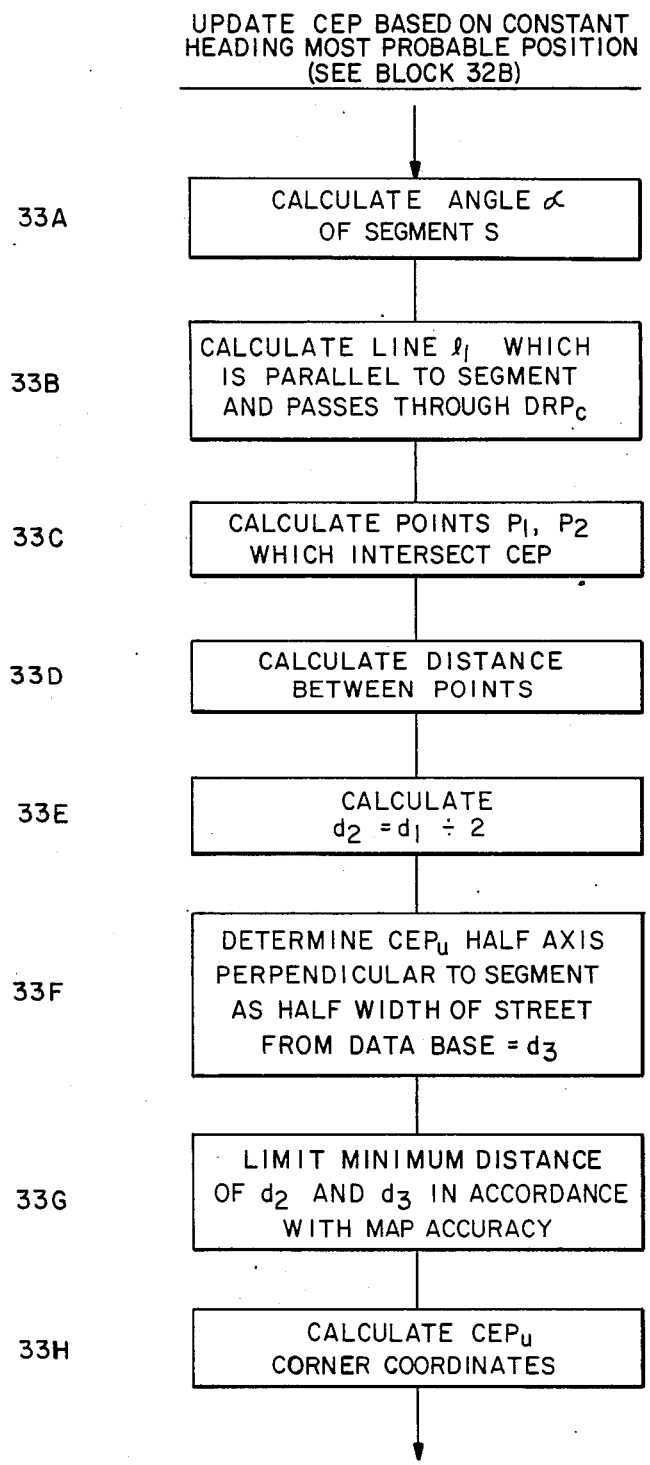
FIG.—33

UPDATE CEP BASED ON OUTCOME OF CORRELATION
(SEE BLOCK 32C)

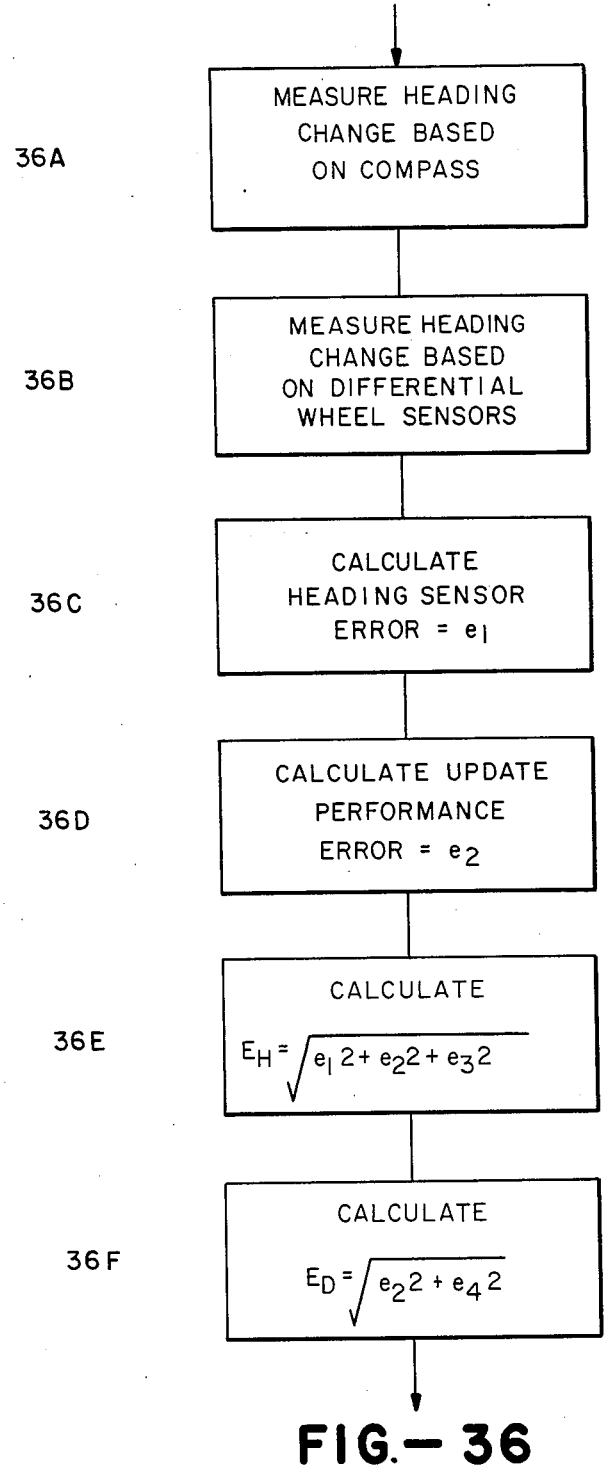
FIG.—36

VEHICLE NAVIGATIONAL SYSTEM AND METHOD

FIELD OF THE INVENTION

The present invention relates generally to an apparatus and method for providing information to improve the accuracy of tracking vehicles movable primarily over streets, as well as to an automatic vehicle navigational system and method for tracking the vehicles as they move over the streets.

A portion of the disclosure of this patent document contains materials to which a claim of copyright protection is made. The copyright owner has no objection to the facsimile reproduction by anyone of the patent document or the patent disclosure, as it appears in the Patent and Trademark Office patent file or records, but reserves all other rights whatsoever.

BACKGROUND OF THE INVENTION

A variety of automatic vehicle navigational systems has been developed and used to provide information about the actual location of a vehicle as it moves over streets. A common purpose of the vehicle navigational systems is to maintain automatically knowledge of the actual location of the vehicle at all times as it traverses the streets (i.e., track the vehicle). A given navigational system may be utilized in the vehicle to provide the vehicle operator with knowledge of the location of the vehicle and/or at a central monitoring station that may monitor the location of one or more vehicles.

For example, one general approach to such vehicle navigational systems is known as "dead reckoning", in which the vehicle is tracked by advancing a "dead reckoned position" from measured distances and courses or headings. A system based upon dead reckoning principles may, for example, detect the distance traveled and heading of the vehicle using distance and heading sensors on the vehicle. These distance and heading data are then processed by, for example, a computer using known equations to calculate periodically a dead reckoned position DRP of the vehicle. As the vehicle moves along a street, an old dead reckoned position $DRP_o$ is advanced to a new or current dead reckoned position $DRP_c$ in response to the distance and heading data being provided by the sensors.

One problem with prior systems using dead reckoning is the accumulation of error that occurs as the dead reckoned positions are advanced. This error occurs, in part, as a result of inherent limitations on the achievable accuracy of the distance and heading sensors, which thus provide data that do not precisely identify the distance traveled nor the heading of the vehicle. Unless compensation for this error is made, the dead reckoned positions will become increasingly imprecise or inaccurate.

Prior dead reckoning vehicle navigational systems have been developed and have attempted to solve this problem of the accumulation of error by providing additional information to the dead reckoned positions. Generally, the additional information may be a map corresponding to the streets of a given area over which the vehicle may be moving. The map is stored in memory as a map data base and is accessed by the computer to process this stored information in relation to the dead reckoned positions.

U.S. Pat. No. 3,789,198, issued Jan. 29, 1974, discloses a vehicle location monitoring system using dead reckoning for tracking motor vehicles, including a technique for compensating for accumulated errors in the dead reckoned positions. In this system, a computer accesses a stored map data base, which is a table or array having a 2-dimensional, orthogonal grid of entries of coordinates $X_{st} Y_{st}$ that may or may not correspond to driveable surfaces, such as streets St. Storage locations in the array that correspond to streets are indicated by a logic 1, while all other storage locations are filled with a logic 0.

In accordance with a vehicle navigational algorithm of the patent, a dead reckoned position DRP of the vehicle is periodically calculated, which position DRP is identified and temporarily stored in the computer as coordinates $X_{old} Y_{old}$. Then, to compensate for the accumulated error, the array is interrogated at a location corresponding to the coordinates $X_{old} Y_{old}$. If a logic 1 is found, the vehicle is defined as corresponding to a known driveable surface and no correction is made. If a logic 0 is found, representing no driveable surface, adjacent entries in the array are interrogated, as specifically described in the patent. If a logic 1 is then found at one of these adjacent entries, coordinates $X_{old} Y_{old}$ are corrected or updated to coordinates $X_{st} Y_{st}$ corresponding to the logic 1 that was found, and these latter coordinates then become $X_{old} Y_{old}$ to advance the dead reckoned position. If no logic 1 is found after such interrogations, then no change is made to the original $X_{old} Y_{old}$ and the corresponding dead reckoned position DRP is advanced.

Another example of an automatic vehicle navigational system that uses a map data base to correct for the accumulation of errors in tracking a vehicle is disclosed in a publication entitled "Landfall: A High Resolution Vehicle-Location System", by D. King, GEC Journal of Science and Technology, Vol. 45, No. 1, 1978, pages 34–44. As described in the publication, the term Landfall is an acronym for Links and Nodes Database For Automatic Landvehicle Location, in which a stored map data base comprises roads (links) that are interconnected by junctions (nodes) having inlet/outlet ports. Thus, any mapped area is regarded merely as a network of nodes, each containing a number of inlet/outlet ports, and interconnected links.

The publication describes the basic vehicle navigational algorithm used under the Landfall principle by assuming that a vehicle is on a road or link moving toward a node which it will enter by an input port. As the vehicle moves forward, the motion is detected by a distance encoder and the "distance-to-go", i.e., the distance to go to the next node, is decremented until it becomes zero, corresponding to the entry point of the input port of such a node. Then, as the vehicle exits one of several output ports of the node, a change of heading of the vehicle at the exit point with respect to the entry point is measured. Then, the map data base for that node is scanned for an exit port matching the measured change in heading and, once identified, this exit port leads to the entry point of another node and the distance-to-go to that other node. Landfall attempts to compensate for the accumulation of error resulting from the achievable accuracy of the distance encoder by cancelling the error when the vehicle encounters a node and turns onto an exit port. More details of this vehicle navigational algorithm are disclosed in the publication.

A common problem with the above-mentioned systems is the use of limited information to compensate for the accumulation of error, so as to accurately track a vehicle. For example, in the vehicle navigational system of the patent, this limited information is a coarse and simplistic representation of streets by logic 1 and logic 0 data of the map data base. In the Landfall system, a relatively simplistic assumption is made that vehicles are always on a street of the map.

Furthermore, in addition to using limited information to correct for the accumulation of error, the vehicle navigational algorithms of the patent and Landfall do not develop an estimate of correct location accuracy and use this information in dependence with the map data base to determine if the vehicle is on a street or not. Systems that do not maintain this estimate are more likely to update the position incorrectly or to fail to update the position when it should be.

SUMMARY OF THE INVENTION

It is an object of the present invention to provide a novel apparatus and method for improving the accuracy of tracking a vehicle as it moves over streets.

It is another object of the present invention to provide a novel apparatus and method for compensating for the accumulation of error in the vehicle navigational system usable by a vehicle as it moves over streets.

It is still another object of the present invention to accurately keep track of the vehicle should the vehicle move on and off the streets.

The above and other objects are obtained in one aspect of the present invention which is an apparatus for providing information to improve the accuracy of tracking a vehicle movable over streets in a given area, including first means for providing data identifying respective positions of the vehicle, each position having an accuracy relative to an actual location of the vehicle and one of the positions being a current position, second means for providing a map data base of the streets, and means for deriving any of a plurality of parameters in dependence on one or more respective positions of the vehicle and the streets of the map data base to determine if a more probable current position exists.

In a related aspect, the invention is a method for providing information to improve the accuracy of tracking a vehicle movable over streets in a given area, including the steps of providing data identifying respective positions of the vehicle, each position having an accuracy relative to an actual location of the vehicle and one of the positions being a current position, providing a map data base of the streets, and deriving any of a plurality of parameters in dependence on one or more respective positions of the vehicle and the streets of the map data base to determine if a more probable current position exists.

Thus, in these apparatus and method aspects of the present invention, a significant amount of information in the form of the plurality of parameters may be derived from the positions of the vehicle and the map data base. Furthermore, and as will be described more fully below, this information may be used not necessarily to correct or update the current position of the vehicle, but at least to determine if a more probable current position exists.

In another aspect, the present invention is an apparatus for automatically tracking a vehicle movable about streets of an overall given area, including first means for providing first data identifying respective positions of the vehicle as the vehicle moves about the streets, each position having a certain accuracy and one of the positions being a current position, second means for providing second data being an estimate of the accuracy of the respective positions of the vehicle, the estimate changing as the vehicle moves about the streets to reflect the accuracy of the respective positions, third means for providing a map data base of the streets of the given area, and means for determining if a more probable position than the current position exists in response to the first data, the second data and the map data base.

In a related aspect, the present invention is a method for automatically tracking a vehicle movable about streets of an overall given area including providing first data identifying respective positions of the vehicle as the vehicle moves about the streets, each position having a certain accuracy and one of the positions being a current position, providing second data being an estimate of the accuracy of the respective positions of the vehicle, the estimate changing as the vehicle moves about the streets to reflect the accuracy of the respective positions, providing a map data base of the streets of the given area, and determining if a more probable position than the current position exists in response to the first data, the second data and the map data base.

With these apparatus and method aspects of the present invention, the vehicle is tracked by determining if a more probable position than the current position exists. If a more probable current position is determined, then the current position is corrected (updated), but if a more probable position cannot be found, the current position is not updated. This determination is made in response to the data about the positions of the vehicle, the data which are an estimate of the accuracy of the respective positions of the vehicle and the map data base.

BRIEF DESCRIPTION OF THE DRAWINGS

FIG. 1A-FIG. 1C are diagrams used to explain the principles of dead reckoning.

FIG. 2 is a block diagram of an automatic vehicle navigational system of the present invention.

FIG. 3 illustrates pictorially a map of a given area over which a vehicle may move.

FIGS. 4A-4B are illustrations used to explain certain information of the map data base.

FIGS. 5A-5C-2 are pictorial illustrations used to explain various embodiments of an estimate of the accuracy of the positions of a vehicle.

FIGS. 6A-6E are illustrations used to explain certain derived parameters of the present invention.

FIGS. 7A-7C show the structure of an overall computer program of the present invention.

FIG. 8 is a flow chart of the overall vehicle navigational algorithm of the present invention.

FIGS. 9-36 are more detailed flow diagrams and other illustrations used to explain the vehicle navigational algorithm of the present invention.

DETAILED DESCRIPTION OF THE INVENTION

I. Introduction

Figure 11:
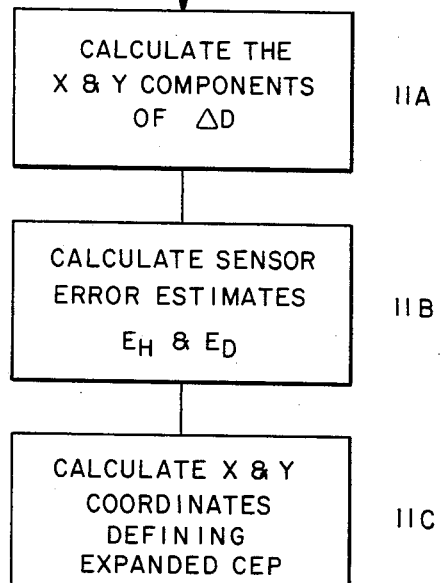

The present invention will be discussed specifically in relation to automatic vehicle location system using dead reckoning, which is one approach to tracking a vehicle movable over streets. However, the present invention may have application to other approaches to the problem of automatic vehicle location for tracking vehicles moving over streets, including, for example, "proximity detection" systems which use signposts that typically are, for example, low power radio transmitters located on streets to sense and transmit information identifying the location of a passing vehicle, as well as to Landfall-type systems previously described. The present invention also may have application in conjunction with yet other systems of providing information of the location of a vehicle movable over streets, such as land-based radio and/or satellite location systems. Still furthermore, the vehicle that will be discussed may be a motor vehicle, such as a car, a recreational vehicle (RV), a motorcycle, a bus or other such type of vehicle primarily movable over streets.

FIGS. 1A–1C are used to explain the basic principles of dead reckoning for tracking a moving vehicle V. Accordingly, FIG. 1A shows an XY coordinate system in which a vehicle V is moving over an actual street St from an arbitrary first or old location $L_o$ at coordinates $X_oY_o$ to a new or current location $L_c$ at coordinates $X_cY_c$.

Assume that an old dead reckoned position $DRP_o$ has been calculated, as described below, which coincides with the actual location $L_o$ of the vehicle V, thereby also having coordinates $X_oY_o$. Assume also that a new or current dead reckoned position $DRP_c$ is to be calculated when the vehicle V is at its new or current location $L_c$. The old dead reckoned position $DRP_o$ is advanced to the current dead reckoned position $DRP_c$ by a calculation using well-known equations as follows:

$$X_c = X_0 + \Delta D \cdot \cos(H) \quad (1)$$

$$Y_c = Y_0 + \Delta D \cdot \sin(H) \quad (2)$$

where $X_cY_c$ are the coordinates of $DRP_c$, $\Delta D$ is a measured distance traveled by the vehicle V between $L_o$ and $L_c$, and H is a measured heading of the vehicle V.

The illustration and discussion of FIG. 1A assumes that there has been no error in calculating the current dead reckoned position $DRP_c$. That is, the current dead reckoned position $DRP_c$ is shown to coincide exactly with the actual location $L_c$ of the vehicle V, whereby $L_c$ and $DRP_c$ have the identical coordinates $X_cY_c$.

FIG. 1B illustrates the more general situation in which errors are introduced into the calculation of the current dead reckoned position $DRP_c$. As a result, the current dead reckoned position $DRP_c$ will differ from the actual location $L_c$ of the vehicle V by an error E. This error E can arise due to a number of reasons. For example, the measurements of the distance $\Delta D$ and the heading H obtained with distance and heading sensors (not shown in FIGS. 1A–1C) on the vehicle V may be inaccurate. Also, equations (1) and (2) are valid only if the vehicle V travels over distance $\Delta D$ at a constant heading H. Whenever the heading H is not constant, error is introduced into the calculation.

Moreover, the error E, unless compensated, will on average accumulate as the vehicle V continues to move over the street St since $X_cY_c$ becomes $X_oY_o$ for each new calculation of the dead reckoned position $DRP_c$ in accordance with equations (1) and (2). This is indicated in FIG. 1B by showing the vehicle V at a subsequent new location $L'_c$, together with a subsequent current dead reckoned position $DRP'_c$ and an accumulated error $E' > E$. Thus, any given $DRP_c$ has a certain inaccuracy associated with it corresponding to the error E.

FIG. 1C is used to explain generally the manner in which the error E associated with a given current dead reckoned position $DRP_c$ is compensated. FIG. 1C shows the vehicle V at location $L_c$, together with a current dead reckoned position $DRP_c$ and an error E, as similarly illustrated in FIG. 1B. In accordance with the present invention, a determination will be made if a more probable position than the current dead reckoned position $DRP_c$ exists. If it is determined that a more probable position does exist, then the current dead reckoned position $DRP_c$ is changed or updated to a certain XY coordinate corresponding to a point on the street St, identified as an updated current dead reckoned position $DRP_{cu}$. The $DRP_{cu}$ may or may not coincide with the actual location $L_c$ of the vehicle (shown in FIG. 1C as not coinciding), but has been determined to be the most probable position at the time of updating. Alternatively, at this time it may be determined that no more probable position than the current dead reckoned position $DRP_c$ can be found, resulting in no changing or updating of the current dead reckoned position $DRP_c$. If the updating does occur, then the XY coordinates of the $DRP_{cu}$ become $X_oY_o$ in equations (1) and (2) for the next advance, whereas if no updating occurs at this time, then the XY coordinates of the $DRP_c$ become $X_oY_o$.

II. Exemplary System Hardware

Figure 35:
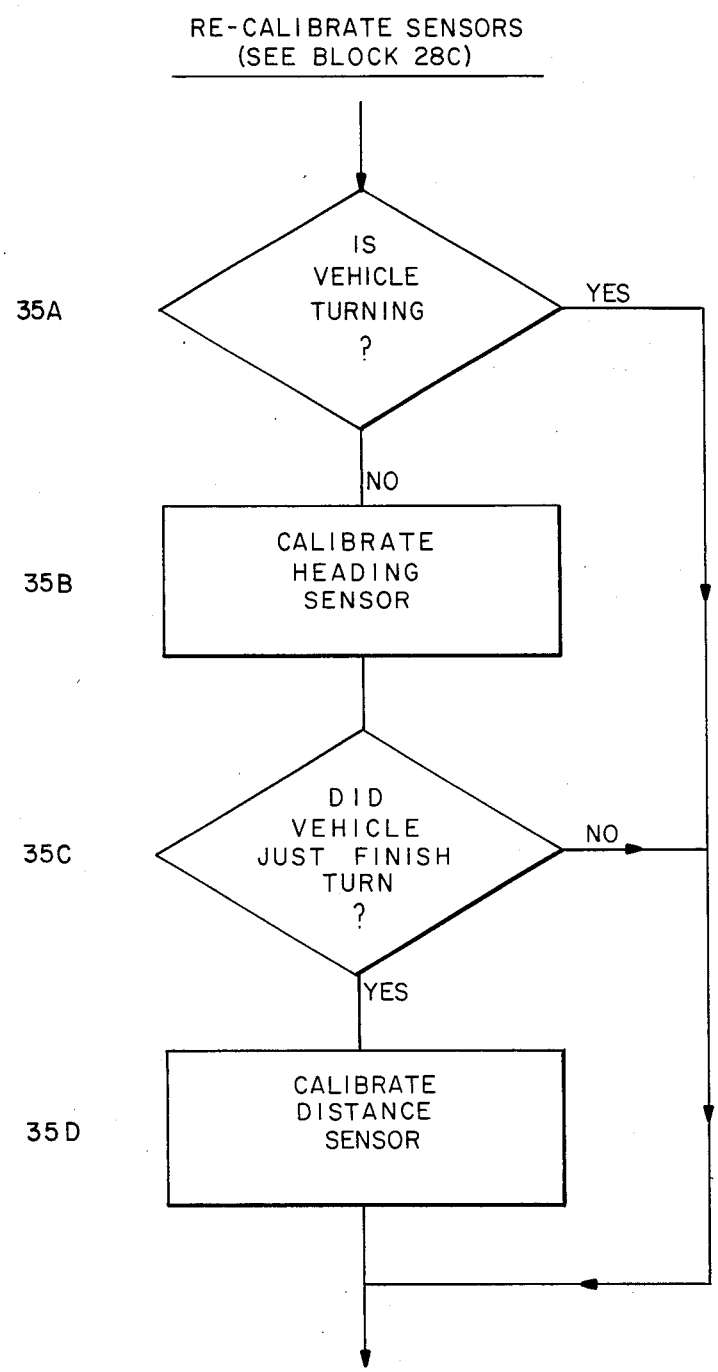
Figures 1, 35:
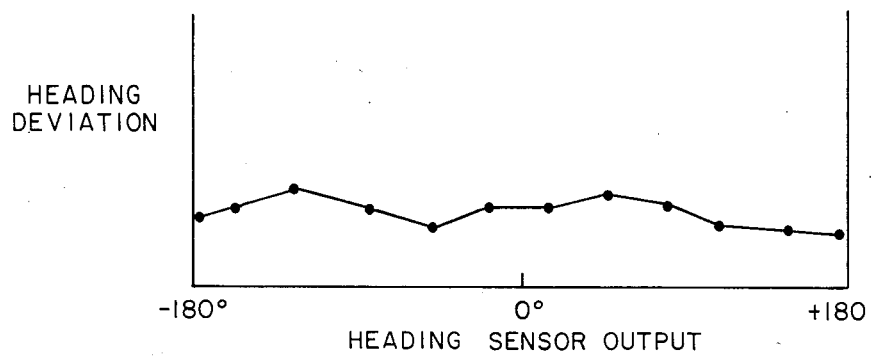
Figures 2, 35:
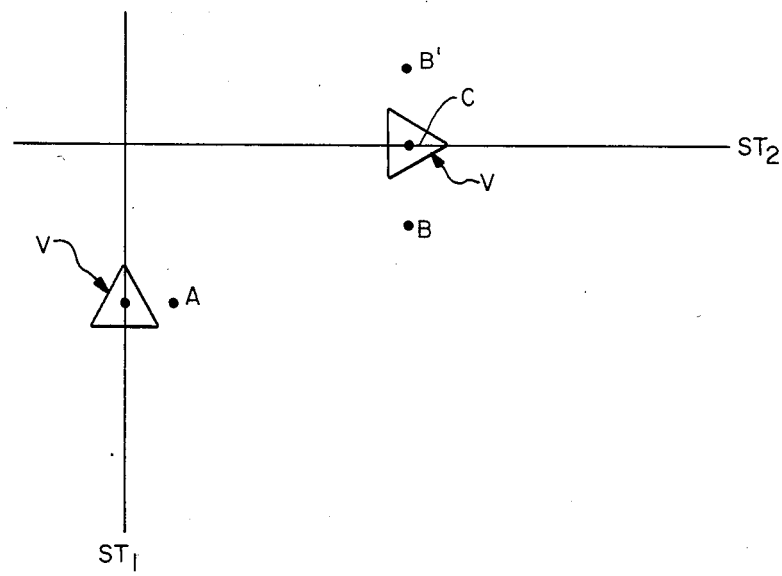

FIG. 2 illustrates one embodiment of an automatic vehicle navigational system 10 of the present invention. A computer 12 accesses a data storage medium 14, such as a tape cassette or floppy or hard disk, which stores data and software for processing the data in accordance with a vehicle navigational algorithm, as will be described below. For example, the computer 12 can be an IBM Personal Computer (PC) currently and widely available in the marketplace, that executes program instructions disclosed below.

System 10 also includes means 16 for sensing distances $\Delta D$ traveled by the vehicle V. For example, the means 16 can constitute one or more wheel sensors 18 which sense the rotation of the non-driven wheels (not shown) respectively of the vehicle V and generate analog distance data over lines 20. An analog circuit 22 receives and conditions the analog distance data on lines 20 in a conventional manner, and then outputs the processed data over a line 24.

System 10 also includes means 26 for sensing the heading H of the vehicle V. For example, means 26 can constitute a conventional flux gate compass 28 which generates heading data over a line 30 for determining the heading H. The previously described wheel sensors 18 also can be differential wheel sensors 18 for generating heading data as a part of overall means 26. An advantage of possibly using both the flux gate compass 28 and the differential wheel sensors 18 to provide heading data to the computer 12 will be discussed below.

The computer 12 has installed in it an interface card 32 which receives the analog distance data from means 16 over line 24 and the analog heading data from means 26. Circuitry 34 on the card 32 converts and conditions these analog data to digital data identifying, respectively, the distance $\Delta D$ traveled by the vehicle V and heading H of the vehicle V shown in FIGS. 1A–1C. For example, the interface card 32 may be the commercially available Tecmar Lab Tender Part No. 20028, manufactured by Tecmar, Solon, (Cleveland), Ohio.

The system 10 also includes a display means 36, such as a CRT display or XYZ monitor 38, for displaying a map M of a set of streets {St} and a symbol $S_v$ of the vehicle V, which are shown more fully in FIG. 3. Another computer interface card 40 is installed in the computer 12 and is coupled to and controls the display means 36 over lines 42, so as to display the map M, the symbol $S_v$ and relative movement of the symbol $S_v$ over the map M as the vehicle V moves over the set of streets {St}. The card 40 responds to data processed and provided by the card 32 and the overall computer 12 in accordance with the vehicle navigational algorithm of the present invention to display such relative movement. As another example, the display means 36 and the circuitry of card 40 may be one unit sold commercially by the Hewlett-Packard Company, Palo Alto, California as model 1345A (instrumentation digital display).

The system 10 also includes an operator control console means 44 having buttons 46 by which the vehicle operator may enter command data to the system 10. The console means 44 communicates over a line 48 with the means 32 to input the data to the computer 12. For example, the command data may be the initial XY coordinate data for the initial DRP when the system 10 is first used. Thereafter, as will be described, this command data need not be entered since the system 10 accurately tracks the vehicle V.

The system 10 may be installed in a car. For example, the monitor 38 may be positioned in the interior of the car near the dashboard for viewing by the driver or front passenger. The driver will see on the monitor 38 the map M and the symbol $S_v$ of the vehicle V. Pursuant to the vehicle navigational algorithm described below, the computer 12 processes a substantial amount of data to compensate for the accumulation of error E in the dead reckoned positions DRP, and then controls the relative movement of the symbol $S_v$ and the map M. Therefore, the driver need only look at the monitor 38 to see where the vehicle V is in relation to the set of streets {St} of the map M.

Moreover, a number of different maps M may be stored on the storage medium 14 as a map data base for use when driving throughout a given geographical area, such as the San Francisco Bay Area. As the vehicle V is driven from one given area to another, the appropriate map M may be called by the driver by depressing one of the buttons 46, or be automatically called by the computer 12, and displayed on the monitor 38. System 10 will perform its navigational functions in relation to the map data base, using a part of the map data base defined as the navigation neighborhood of the vehicle. The map M which currently is being displayed on the monitor 38 may or may not correspond precisely to the navigation neighborhood.

III. Information Used to Improve the Accuracy of Tracking the Vehicle V (The Map M; The DRP; The Estimate of the Accuracy of the DRP)

A. The Map M

1. The Map M Generally

FIG. 3 shows the map M of a given area (part of the map data base) or navigation neighborhood having a set of streets {St} over which the vehicle V may move. For example, the street identified as "Lawrence Expressway" may correspond to a street $St_1$, the street identified as "Tasman Drive" may correspond to a street $St_2$ and the street identified as "Stanton Avenue" may correspond to a street $St_3$. Also shown is the vehicle symbol $S_v$ which is displayed on the monitor 38. Thus, the vehicle V may move along Lawrence Expressway, then make a left turn onto Tasman Drive and then bear right onto Stanton Avenue, and this track will be seen by the vehicle operator via the relative movement of the symbol $S_v$ and map M.

2. The Map Data Base

(a) Introduction

The map M is stored on the storage medium 14 as part of the map data base which is accessed by the computer 12. This map data base includes, as will be further described, data identifying (1) a set of line segments {S} defining the set of streets {St}, (2) street widths W, (3) vertical slopes of the line segments S, (4) magnetic variation of the geographical area identified by the map M, (5) map accuracy estimates, and (6) street names and street addresses.

(b) Set of Line Segments {S}

FIG. 4A is used to explain the data stored on medium 14 that identify a set of line segments {S} defining the set of streets {St}. Each such street St is stored on the medium 14 as as algebraic representation of the street St. Generally, each street St is stored as one or more arc segments, or, more particularly, as one or more straight line segments S. As shown in FIG. 4A, each line segment S has two end points $EP_1$ and $EP_2$ which are defined by coordinates $X_1Y_1$ and $X_2Y_2$, respectively, and it is these XY coordinate data that are stored on the medium 14. The course (heading) of the segment S can be determined from the end points.

(c) Street Width W

The streets St of any given map M may be of different widths W, such as a six-lane street like Lawrence Expressway, a four-lane street like Stanton Avenue and a two-lane street like Tasman Drive, all illustrated in the map M of FIG. 3. Data identifying the respective widths W of each street St are stored on the medium 14 as part of the map data base. The width W of the street St is used as part of an update calculation described more fully below.

(d) Vertical Slope of a Line Segment S

Figure 26:
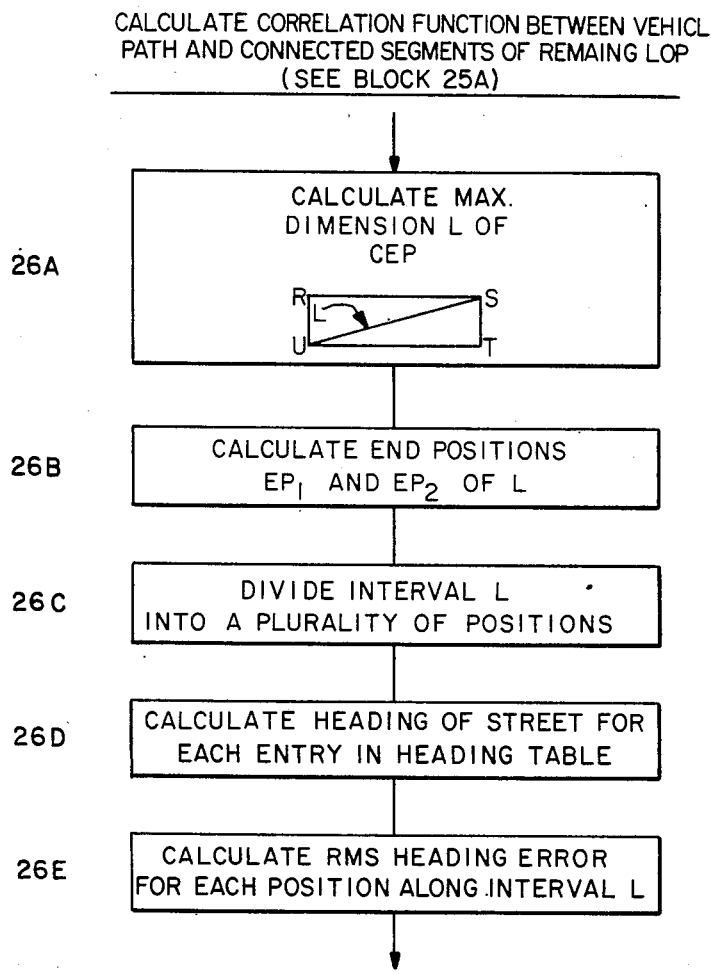
Figures 1, 26:
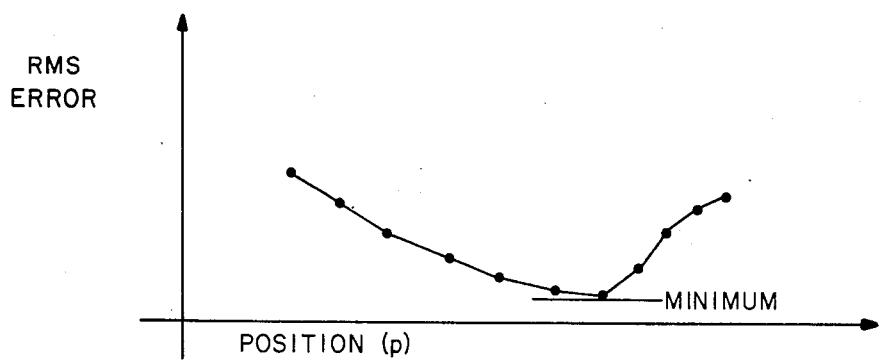

FIG. 4B is used to explain correction data relating to the vertical slope of a given street St and which are part of the map data base stored on medium 14. FIG. 4B-1 shows a profile of the actual height of a street St which extends over a hill. The height profile of the actual street St is divided into line parts $P_1$-$R_5$ for ease of explanation, with each part $P_1$-$P_5$ having a true length $l_1$-$l_5$. FIG. 4B-2 shows the same parts $P_1$-$P_5$ as they are depicted on a flat map M as line segments $S_1$-$S_5$. Parts $P_1$, $P_3$ and $P_5$ shown in FIG. 4B-1 are flat and, therefore, their true lengths $l_1$, $l_3$ and $l_5$ are accurately represented on the map M, as shown in FIG. 4B-2. However, the true length $l_2$ and $l_4$ of sloping parts $P_2$ and $P_4$ shown in FIG. 4B-1 are foreshortened in FIG. 4B-2 from $l_2$ and $l_4$ to $l'_2$ and $l'_4$. This constitutes map foreshortening errors which are proportional to the cos $\alpha$ and the cos $\beta$, respectively, these angles $\alpha$ and $\beta$ being shown in FIG. 4B-1. Such foreshortening errors always occur whenever a 3-dimensional surface is depicted on a 2-dimensional or flat map M. Consequently, the XY coordinates of the respective end points EP of line segments $S_2$ and $S_4$ shown in FIG. 4B-2 do not reflect the actual lengths $l_2$ and $l_4$ of the actual street St. Therefore, the map data base can store vertical slope correction data for these segments $S_2$ and $S_4$ to compensate for the foreshortening errors. The correction data may be stored in the form of a code defining several levels of slope. For example, in some places these slope data may be coded at each segment S. In other areas these slope data are not encoded in the segment S but may be coded to reflect overall map accuracy, as described below.

Furthermore, FIG. 4B-3 is a plot of the heading H measured by the means 26 for each segment $S_1$–$S_5$ as the vehicle V traverses the street St having the height profile shown in FIG. 4B-1. Any segment S having a vertical slope, such as corresponding parts $P_2$ and $P_4$ of the actual street St, may introduce through "magnetic dip angles", errors in the compass heading readout of the flux gate compass 28 of the means 26 as the vehicle V moves over parts $P_2$ and $P_4$. Where the map data base contains correction data for a segment S having a vertical slope, the compass heading errors also may be corrected.

Thus, when foreshortening errors are coded on each segment S, and if the position (DRP) of the vehicle V has been recently updated to a segment S, as further described below, and has not since turned or otherwise been detected as leaving that segment S, then the dead reckoning equations (1) and (2) can be modified to equations (1') and (2'):

$$X_c = X_o + C_F \cdot \Delta D \cdot \cos(H') \tag{1'}$$

$$Y_c = Y_o + C_F \cdot \Delta D \cdot \sin(H') \tag{2'}$$

Here the foreshortening coefficients $C_F$ are calculated from foreshortening and other data coded for the selected segment S, as is the corrected heading H'.

(e) Magnetic Variation of the Geographic Area

The map data base may contain correction data to relate magnetic north to true north and magnetic dip angles to determine heading errors due to the vertical slope of streets St, thereby accounting for the actual magnetic variation of a given geographic area. Because these are continuous and slowly varying correction factors only a few factors need be stored for the entire map data base.

(f) Map Accuracy Estimate

The map M is subject to a variety of other errors including survey errors and photographic errors which may occur when surveying and photographing a given geographic area to make the map M, errors of outdated data such as a new street St that was paved subsequent to the making of the map M, and, as indicated above, a general class of errors encountered when describing a 3-dimensional earth surface as a 2-dimensional flat surface. Consequently, the map data base may contain data estimating the accuracy for the entire map M, for a subarea of the map M or for specific line segments S. The navigational algorithm described below may use these map accuracy data to set a minimum size of an estimate of the accuracy of the updated dead reckoned position $DRP_{cu}$ also as described more fully below. Additionally, some streets St in the map M are known to be generalizations of the actual locations (e.g., some trailer park roads). The map accuracy data may be coded in such a way as to identify these streets St and disallow the navigational algorithm from updating to these generalized streets St.

B. The Dead Reckoned Position DRP

The present invention provides information on the current dead reckoned position $DRP_c$ of the vehicle V by using certain sensor data about wheel sensors 18 and compass 28 and the computations of equations (1) and (2) or (1') and (2'). In addition, sensor calibration information derived in the process of advancing and updating the dead reckoned positions DRP, as will be described below, is used to improve the accuracy of such sensor data and, hence, the dead reckoned position accuracy.

c. The Estimate of the Accuracy of the DRP

1. The Estimate—Generally

The present invention provides and maintains or carries forward as the vehicle V moves, an estimate of the accuracy of any given dead reckoned position DRP. Every time the dead reckoned position DRP is changed, i.e., either advanced from the old dead reckoned position $DRP_o$ to the current dead reckoned position $DRP_c$ or updated from the $DRP_c$ to the updated current dead reckoned position $DRP_{cu}$, the estimate is changed to reflect the change in the accuracy of the DRP. The estimate embodies the concept that the actual location of the vehicle V is never precisely known, so that the estimate covers an area that the vehicle V is likely to be within. As will be described below, the estimate of the accuracy of a given dead reckoned position DRP can be implemented in a variety of forms and is used to determine the probability of potential update positions of a given $DRP_c$ to a $DRP_{cu}$.

2. The Estimate as a Probability Density Function or as a Contour of Equal Probability (CEP)

FIG. 5A generally is a replot of FIG. 1B on an XYZ coordinate system, where the Z axis depicts graphically a probability density function PDF of the actual location of the vehicle V. Thus, FIG. 5A shows along the XY plane the street St, together with the locations $L_o$ and $L_c$ and the current dead reckoned position $DRP_c$ previously described in connection with FIG. 1B. As shown in FIG. 5A, the peak P of the probability density function PDF is situated directly above the $DRP_c$.

The probability density function PDF is shown as having a number of contours each generated by a horizontal of XY plane slicing through the PDF function at some level. These contours represent contours of equal probability CEP, with each enclosing a percentage of the probability density, such as 50% or 90%, as shown.

FIG. 5B is a projection of the contours CEP of FIG. 5A onto the XY coordinates of the map M. A given contour CEP encloses an area A having a certain probability of including the actual location of the vehicle V. Thus, for example, the 90% contour CEP encloses an area A which has a 0.9 probability of including the actual location of the vehicle V. As will be further described, as the old dead reckoned position $DRP_o$ is advanced to the current dead reckoned position $DRP_c$ and the error E accumulates, as was described in relation to FIG. 1B, the area A of the CEP will become proportionately larger to reflect the accumulation of the error E and the resulting reduction in the accuracy of the $DRP_c$; however, when the $DRP_c$ is updated to the $DRP_{cu}$, as was described in connection with FIG. 1C, then the area A of the CEP will be proportionately reduced to reflect the resulting increase in the accuracy of the $DRP_{cu}$. Whether expanded or reduced in size, the CEP still represents a constant probability of including the actual location of the vehicle V. As will be described, the CEP has a rate of growth or expansion which will change, accordingly, as certain measurements and other estimates change.

FIG. 5C is similar to FIG. 5B, except that it shows one example of a specific implementation of the CEP that is used in accordance with the present invention, as will be further described. For this implementation, a contour CEP is approximated by a rectangle having corners RSTU. The CEP is stored and processed by the computer 12 as XY coordinate data defining the corners RSTU, respectively.

In other words, the CEP, whether stored and used in an elliptical, rectangular or other such shape, may be considered to constitute a plurality of points, each identified by XY coordinate data, defining a shape enclosing an area A having a probability of including the actual location of the vehicle V.

FIG. 5C-1 shows graphically the expansion or enlargement of the CEP as the vehicle V moves over a street St and as an old dead reckoned position $DRP_o$ is advanced to a current dead reckoned position $DRP_c$. In FIG. 5C-1, a given $DRP_o$ is shown as not necessarily coinciding with an actual location $L_o$ of the vehicle V, i.e., there is an accumulation error E. Surrounding the $DRP_o$ is the CEP having an area A that is shown as containing the actual location $L_o$ of the vehicle V. Upon the advancement of the $DRP_o$ to the $DRP_c$, when the vehicle V has moved to the location $L_c$, the CEP will have been expanded from the area A defined by corners RSTU to the area A' defined by corners R'S'T'U'. More specifically, as the vehicle V moves from the location $L_o$ to the location $L_c$, the computer 12 processes certain data so that the CEP may grow from area A to area A' at a varying rate, as will be described below. Also, the manner in which the XY coordinate data of the corners RSTU are changed to define corners R'S'T'U' will be described below.

FIG. 5C-2 shows graphically the reduction in size of the CEP. FIG. 5C-2 indicates that at the time of the vehicle V is at the location $L_c$, the vehicle navigational algorithm of the present invention has determined that a more probable current position than the $DRP_c$ exists, so that the latter has been updated to the $DRP_{cu}$, as explained in FIG. 1C. Consequently, the expanded CEP having corners R'S'T'U' is also updated to a $CEP_u$ having an area A'' with corners R''S''T''U'' to reflect the increased certainty in the accuracy of the $DRP_{cu}$. Again, the $CEP_u$ having the area A'' surrounds the $DRP_{cu}$ with a probability of including the actual location of the vehicle V. The detailed manner in which the CEP is updated to the $CEP_u$ by the computer 12 will be described more fully below.

While area A, area A' and area A'' of the respective CEPs have been described above and shown to include the actual location of the vehicle V, since the CEP is a probability function, it does not necessarily have to contain the actual location of the vehicle V. The vehicle navigational algorithm described below still uses the CEP to determine if a more probable current dead reckoned position DRP exists.

3. Other Embodiments of the Estimate and its Growth

The estimate of the accuracy of a given dead reckoned position DRP, which has a probability of containing the actual location of the vehicle V, may be implemented in embodiments other than the CEP. For example, the estimate may be a set of mathematical equations defining the PDF. Equation A is an example of a PDF of a DRP advancement assuming independent zero mean normal distributions of errors in heading and distance, and to first order approximation, independence of errors in the orthogonal directions parallel and perpendicular to the true heading direction.

$$PDF(D,P) = \frac{1}{2\pi\sigma_D\sigma_P} \cdot e^{-\frac{1}{2}\left[\left(\frac{D/\Delta D_T}{\sigma_D}\right)^2 + \left(\frac{P/\Delta D_T}{\sigma_P}\right)^2\right]} \quad (A)$$

where $$P = \Delta D_T \sin H_\epsilon$$

and

D≡distance parellel to true heading direction
$\Delta D_T$≡true distance of DRP advance
$\sigma_D$≡standard deviation of distance sensor error (a percentage)
$H_\epsilon$≡heading error
P≡distance perpendicular to true heading direction
$\sigma_P$≡standard deviation of position error perpendicular to true heading direction (a percentage) which is a function of $\sigma_H$ and $\Delta D_T$
$\sigma_H$≡standard deviation of heading sensor error Equation B is an example of a similar PDF of the accumulated error. Its axes, $\theta$ and $\phi$, have an arbitrary relation to D and P depending upon the vehicle's past track.

$$PDF(\theta,\phi) = \frac{1}{2\pi\sigma_\theta\sigma_\phi} e^{-\frac{1}{2}\left[\left(\frac{\theta}{\sigma_\theta}\right)^2 + \left(\frac{\phi}{\sigma_\phi}\right)^2\right]} \quad (B)$$

where $\theta$≡major axis
$\phi$≡minor axis perpendicular to $\theta$
$\sigma_\theta$≡standard deviation of errors accumulated in $\theta$ direction
$\sigma_\phi$≡standard deviation of errors accumulated in $\phi$ direction Assuming independence of errors, the vehicle position probability density function PDF after an advance can be calculated by two dimension convolution of the old PDF (equation B) and the current PDF (equation A) and their respective headings. A new PDF of the form of equation B could then be approximated with, in general, a rotation of axis $\theta$ to some new axis $\theta'$ and $\phi$ and $\phi'$ and an adjustment of $\sigma_\theta$ and $\sigma_\phi$. The computer 12 can then calculate the probability of potential update positions in accordance with these mathematical PDF equations thus providing information similar to that of the CEP as the vehicle V moves.

Alternatively, the computer 12 can store in memory a table of values defining in two dimensions the probability distribution. The table can be processed to find similar information to that contained in the CEP, as described more fully below.

In addition, the rate of growth of the CEP can be embodied in different ways. Besides the method described below, the rate of growth could be embodied by a variety of linear filtering techniques including Kalman filtering.

IV. Parameters Derived by the Computer to Improve the Accuracy of Tracking the Vehicle V

A. Parameters—Generally

Computer 12 will derive and evaluate from the above-described information one or more parameters that may be used to determine if a more probable position than the current dead reckoned position $DRP_c$ exists. These "multi-parameters", any one or more of which may be used in the determination, include (1) the calculated heading H of the vehicle V in comparison to the headings of the line segments S, (2) the closeness of the current dead reckoned position $DRP_c$ to the line segments S in dependence on the estimate of the accuracy of the $DRP_c$, such as the CEP in the specific example described above, (3) the connectivity of the line segments S to the line segment S corresponding to a preceding $DRP_{cu}$, (4) the closeness of the line segments S to one another (also discussed below as "ambiguity"), and (5) the correlation of the characteristics of a given street St, particularly the headings or path of the line segments S of the given street St, with the calculated headings H which represent the path of the vehicle V. FIGS. 6A–6D show graphically and are used to explain the parameters (1)–(4) derived by the computer 12. More details of these and other parameters will be discussed below in relation to the details of the vehicle navigational algorithm.

B. Parameters—Specifically

1. Heading H

FIG. 6A shows in illustration I the measured heading H of the vehicle V. FIG. 6A also shows in respective illustrations II–IV a plurality of line segments S, for example line segments $S_1$–$S_3$, stored in the map data base. These segments $S_1$–$S_3$ may have, as shown, different headings $h_1$–$h_3$, as may be calculated from the XY coordinate data of their respective end points EP. The heading H of the vehicle V is compared to the respective headings h of each segment S in the map data base corresponding to the navigation neighborhood currently used by the navigation algorithm, such as segments $S_1$–$S_3$. Depending on this heading comparison, computer 12 determines if one or more of these segments S qualifies as a "line-of-position" or L-O-P in determining if a more probable current dead reckoned position $DRP_c$ exists. Such segments S qualifying as L-O-Ps are candidates for further consideration to determine if a $DRP_c$ is to be updated to $DRP_{cu}$.

2. Closeness of $DRP_c$ Related to Estimate

FIG. 6B is used to explain one example of the closeness parameter with respect to the estimate of the accuracy of the DRP. Specifically, one criterion that is considered is whether a given line segment S intersects or is within the CEP. Segments S intersecting the CEP are more likely to correspond to the actual location of the vehicle V than segments S not intersecting the CEP. A given line segment S doesn't intersect the CEP if, for example, all four corners RSTU (or R'S'T'U') are on one side of the CEP. As shown in FIG. 6B, which illustrates eight representative line segments $S_1$–$S_8$, segments $S_2$–$S_4$ and $S_6$–$S_7$ ($S_6$ and $S_7$ correspond to one given street St) do not intersect the CEP and, therefore, are not considered further. Segments $S_1$, $S_5$ and $S_8$ do intersect the CEP and, therefore, qualify as L-O-Ps or candidates for further consideration in determining if a more probable current dead reckoned position $DRP_c$ exists, as will be described below. FIG. 6B happens to show that the actual location of the vehicle V at this time is on a street St corresponding to segment $S_8$.

As an alternative, assume that the embodiment of the estimate being used is the table of entries of values of the probability density function PDF described above. The computer 12 may determine the distance and heading between a given line segment s and the $DRP_c$. From this and the table of PDF's the computer 12 can determine the most probable position along the segment S and the probability associated with that position. Any probability less than a threshold will result in the given line segment S not being close enough to the current dead reckoned position $DRP_c$ to be a likely street St on which the vehicle V may be moving, whereas any probability greater than the threshold may constitute such a likely street St. In addition, these probability values can be used to rank the relative closeness of candidate segments S.

3. Connectivity of the Line Segments S

It is more probable that a given line segment S corresponds to a street St on which the vehicle V is moving if it is connected to a line segment S previously determined to contain the updated current dead reckoned position $DRP_{cu}$. FIG. 6C graphically illustrates several possible ways in which two line segments $S_1$ and $S_2$ are deemed connected. As shown in Example I of FIG. 6C, any two line segments $S_1$ and $S_2$ are connected if an intersection i of these two segments $S_1$ and $S_2$ is within a threshold distance of the end points EP of the two segments, $S_1$, and $S_2$, respectively. Alternatively, two line segments $S_1$ and $S_2$ are interconnected if the intersection i is inclusive of the end points EP, as shown by Example II and Example III in FIG. 6C.

To test for connectivity, for example, and with reference to Examples I–III of FIG. 6C, the line segment $S_1$ may be the segment S corresponding to the preceding updated current dead reckoned position $DRP_{cu}$ while line segment $S_2$ may be a segment S being presently evaluated in connection with updating the current dead reckoned position $DRP_c$. Computer 12 will compute from segment data contained in the navigation neighborhood of the map data base, the connectivity to determine if this segments $S_2$ qualifies under this connectivity test. That is, the present invention considers that the vehicle V more likely will move about interconnected streets St and line segments S of a given street St, rather than about unconnected streets St or unconnected line segments S of a given street St. Other segments S may or may not so qualify under this connectivity parameter. Since the present invention also allows for the vehicle V to move off and on the set of streets {S} of the map data base, this connectivity test is not absolute but is one of the parameters used in the updating process more fully described later.

4. Closeness of Line Segments S to One Another (Ambiguity)

FIG. 6D shows two line segments $S_1$ and $S_2$ on opposite sides of the current dead reckoned position $DRP_c$. As will be further described, the computer 12 ultimately may determine that these two line segments $S_1$ and $S_2$ are the only two remaining line segments S that may likely correspond to the actual street St on which the vehicle V is moving. However, if the computer 12 determines that these two segments $S_1$ and $S_2$ are too close together, or that the distance between $S_1$ and $DRP_c$ is insignificantly different than the distance between $S_2$ and $DFP_c$, then one segment $S_1$ or $S_2$ may be as likely as the other segment $S_1$ or $S_2$ to correspond to the street St on which the vehicle V is actually moving. In this ambiguous event, neither segment $S_1$ nor $S_2$ is selected as a more probable segment and the current dead reckoned position $DRP_c$ is not updated at this time.

5. Correlation

(a) Generally

The correlation parameter generally described the closeness of fit of a recent portion of the path taken by the vehicle V to the path defined by segments S in the navigation neighborhood. The correlation parameter is computed differently depending upon whether the vehicle V is turning or not. If the vehilce V is not turning a simple path matching is calculated, as described below in section 5(b). If the vehicle V is turning a correlation function is calculated, as described below in section 5(c).

(b) Path Matching Between the Sequence of Previous Vehicle Headings and the Sequence of Connected Segment Headings As will be shown by the two examples I and II of FIG. 6E, and described more fully below, path matching is used when the vehicle V has been determined not to be turning. In each example I and II, the solid lines having the current dead reckoned position $DRP_c$ show a recent dead reckoned path used for matching and the dashed lines show an older dead reckoned path not used for matching. The other solid lines of examples I and II show respective sequences of connected line segments S. After computer 12 determines, for example, line segment $S_2$ to be the most likely to correspond to the street St on which the vehicle V is probably moving, then this path match parameter will compare the dead reckoned path of the vehicle V with the path of the segment $S_2$ and connected segments (if needed), such as segment $S_1$, to determine if the respective paths match. Example I of FIG. 6E shows paths that do match, whereby segment $S_2$ would be used for updating the current dead reckoned position $DRP_c$ to the $DRP_{cu}$. Example II shows paths that do not match, so that segment $S_2$ would not be used for updating the currrent dead reckoned position $DRP_c$.

(c) Correlation Function Between the Sequence of Previous Vehicle Headings and the Sequence of Connected Segment Headings A correlation function, described more fully below, is used when it has been determined that the vehicle V has been turning. After computer 12 determines a given line segment S to be the most likely to correspond to the street St on which the vehicle V is probably moving, the correlation function is derived to determine if the segment S is sufficiently correlated to warrant updating the current dead reckoned position $DRP_c$. The computer 12 does this by calculating the best point BP of the correlation function and testing its value as well as certain shape factors. If it passes these tests, this best point BP is stored for later use in updating the $DRP_c$ to $DRP_{cu}$.

V. Use of the Parameters Derived by the Computer 12 to Improve the Accuracy of Tracking the Vehicle V

A. Parameter Use—Generally

In the present invention, the parameters of Section IV. discussed above are used as logical tests in conjunction with other processing and logical tests to determine if a point along a selected segment S, i.e., the most probable segment, is a more probable position of the vehicle V than the current dead reckoned position $DRP_c$. If such a most probable segment S is selected, then an update of the $DRP_c$ to that point (the $DRP_{cu}$) will be made as outlined in Section VI. below and detailed more fully in Section IX.

The parameters are generally used to sequentially test and eliminate the set of segments {S} in the navigation neighborhood from further consideration as candidate segments S for the most probable segment S. As will be described in detail in Section IX., the navigation algorithm uses these parameters and other processing and logic to eliminate all but one or two segments S as candidate segments. The algorithm then makes a final determination if one segment S fully qualifies as having the highest probability of representing the street St where the vehicle V is moving and that the probability is sufficiently high to qualify for updating the current dead reckoned position $DRP_c$ to the $DRP_{cu}$ as the above-mentioned point on such one segment S.

B. Parameter Use—Other Embodiments

The use of these parameters for determining if and how to update the current dead reckoned position $DRP_c$ can take other embodiments. For example, rather than a logical sequence of eliminating segments S, they may be used in a weighted score algorithm. In such an algorithm the parameters described in Section IV. above may be numerically computed for each segment S in the navigation neighborhood. Each parameter could be weighted by numerical values representing the average error bounds estimated for that parameter and representing the significance assigned to that parameter. In this way a weighted sum of scores could be computed for each segment S and the segment S with the best weighted sum determined. If that sum was sufficiently good the decision would be made to update.

In another embodiment a combination of the elimination method of the present invention and the scoring method discussed above, could be used.

VI. Update of the $DRP_c$, the CEP and Sensor Calibration Data to Improve the Accuracy of Tracking the Vehicle V

A. Update—Generally

Once a segment S, i.e., the most probable segment S, has been determined to be sufficiently probable of containing the actual location of the vehicle V to justify updating the current dead reckoned position $DRP_c$, the computer 12 processes the segment, parameter and $DRP_c$ data to determine the most probable $DRP_{cu}$, the updated $CEP_u$ and, if appropriate, updated distance and heading sensor calibration coefficients. The method of calculating $DRP_{cu}$ depends on whether the computer 12 determines that the vehicle V has been turning or has been moving in a straight line.

As will be described in detail later, if the vehicle V has been moving in a straight line, $DRP_{cu}$ is computed directly using the selected segment S, the $DRP_c$, the angle and distance between them and the CEP. If the vehicle V is turning, the $DRP_{cu}$ is determined by calculating a correlation function obtained by comparing the sequence of recent vehicle headings to the segment S (and if necessary connected segments S). The best point BP of the correlation computation becomes the selected $DRP_{cu}$ if it passes certain quality tests.

The CEP is updated to $CEP_u$ differently in accordance with the two methods of updating the $DRP_c$. Also, when the update is judged to provide added information about the calibration of the sensors 18 and 28, the calibration coefficients are updated.

B. Update—Other Embodiments

The method of updating $DRP_c$ to $DRP_{cu}$ can take other embodiments. For example, the past DRP positions, the most probable position along the selected segment S, the score of the segment S if a score was computed, as well as other parameter information could be input into a linear filter (not shown) for computing an optimum or least mean square position based on some assignment of values of the different inputs. The optimum or most probable position may or may not fall on a segment S.

VII. Summary

Thus far, there has been described a variety of information that is inputted to, stored and processed by the computer 12 to improve the accuracy of tracking the vehicle V. This information includes, for example, the distance and heading data inputted to the computer 12, the map data base stored on medium 14 and the estimate of the accuracy of the dead reckoned positions DRP. As was also described, the computer 12 may use this information to derive one or more parameters, each of which and all of which, are useful for determining if a most probable segment S exists and if such segment S contains a more probable current dead reckoned position $DRP_{cu}$ than the current $DRP_c$. If it is determined that such a segment S exists, the computer 12 computes a more probable position and then updates the $DRP_c$ to a $DRP_{cu}$, the estimate of the accuracy of the DRP and the calibration coefficients. The computer 12 may selectively process the information described and other information to be described, and derive the parameters, and perform the updates in accordance with a vehicle navigational algorithm of the present invention, one embodiment of which will now be described.

VIII. Overall Computer Program Structure

FIGS. 7A-7C show three block diagrams which, together, constitute an overall computer program structure that is utilized by the system 10. FIG. 7A references a main program, with FIGS. 7B-7C referencing interrupt programs. The interrupt program of FIG. 7B is used to refresh the monitor 38 and to provide an operator interface via the console means 46. The interrupt program of FIG. 7C is the program performing the vehicle navigational algorithm of the present invention.

Generally, in the operation of the overall computer program structure, in response to all information that is processed by the computer 12, as described above and as will be further described below, the main program computes and formats data necessary to select and display the selected map M and the vehicle symbol $S_v$ shown on the monitor 38 and provide the segments S in the navigation neighborhood for the vehicle navigational algorithm. The execution of this main program can be interrupted by the two additional programs of FIG. 7B and FIG. 7C. The refresh display program of FIG. 7B resets the commands necessary to maintain the visual images shown on the monitor 38 and reads in any operator command data via the console means 44 needed for the main program to select and format the display presentation. The interrupt program of FIG. 7B can interrupt either the main program of FIG. 7A or the navigational program of FIG. 7C. The latter can only interrupt the main program and does so approximately every 1 second, as will be further described.

IX. The Vehicle Navigational Program and Algorithm

FIG. 8 is a flow chart illustrating an embodiment of the overall vehicle navigational algorithm of the present invention performed by the computer 12. As previously mentioned, every second the vehicle navigational program interrupts the main program. First, the computer 12 advances an old dead reckoned position $DRP_o$ to a current dead reckoned position $DRP_c$ by dead reckoning (see also FIG. 1B) and expands an estimate of the accuracy of the $DRP_c$ (see also FIG. 5C-1) and (block 8A), as described further below in relation to FIG. 9. Next, a decision is made if it is time to test for an update of the $DRP_c$, the estimate and other information (block 8B), as described below in relation to FIG. 12. If not, the remaining program is bypassed and control is returned to the main program.

If it is time to test for an update (block 8B), then a multi-parameter evaluation is performed by computer 12 to determine if a segment S in the navigation neighborhood contains a point which is more likely than the current dead reckoned position $DRP_c$ (block 8C), as will be described in relation to FIG. 13. If the multi-parameter evaluation does not result in the determination of such a segment S (block 8D), then the remaining program is bypassed and control is passed to the main program. If the multi-parameter evaluation indicates that such a more likely segment S does exist, then a position along this segment S is determined and an update is performed (block 8E), as will be described in connection with FIG. 28, and thereafter control is returned to the main program. This update not only includes an update of the current dead reckoned position $DRP_c$ to the $DRP_{cu}$ (see FIG. 1C), and an update of the estimate (see FIG. 5C-2), but also, if appropriate, an update of calibration data relating to the distance sensor means 16 and the heading sensor means 26 (see FIG. 2).

FIG. 9 shows a flow chart of the subroutine for advancing the $DRP_o$ to $DRP_c$ and expanding the estimate of the accuracy of the $DRP_c$ (see block 8A). First, the $DRP_o$ is advanced by dead reckoning to the $DRP_c$ (block 9A), as will be described in relation to FIG. 10. Next, the estimate of the accuracy of the $DRP_c$ is enlarged or expanded (block 9B), as will be described in connection with FIG. 11.

FIG. 10 illustrates the flow chart of the subroutine for advancing a given $DRP_o$ to the $DRP_c$ (see block 9A). Reference will be made to the equations shown on FIG. 10. First, the heading H of the vehicle V is measured by computer 12 (block 10A), which receives the heading data from the sensor means 26. The measured heading H is then corrected for certain errors (block 10B). That is, and as will be described in relation to FIG. 35-1, the computer 12 maintains a sensor deviation table by storing heading sensor deviation vs. sensor reading, which heading deviation is added to the output of the heading sensor means 26 to arrive at a more precise magnetic bearing. Additionally, the local magnetic variation from the map data base (see Section III.A.2.e) is added to the output of the heading sensor means 26 to arrive at a more accurate heading H of the vehicle V.

Then, a distance $\Delta d$ traveled since the calculation of the $DRP_o$ is measured by the computer 12 using the distance data from sensor means 18 (block 10C). Next, the computer 12 calculates the distance $\Delta D$ (see FIG. 1B) (block 10D), in which the calibration coefficient $C_D$ is described more fully in relation to FIG. 35-2. Next, the $DRP_c$ is calculated using equations 1' and 2' (block 10E), and this subroutine is then completed.

Figure 11A:
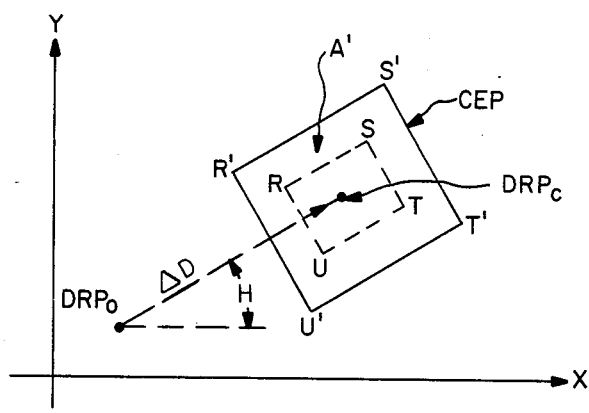

FIG. 11 discloses a flow chart of the subroutine for expanding the contour CEP (see block 9B). Reference also will be made to FIG. 11A which is a simplification of FIG. 5C-1 and which shows the enlarged CEP having area A' after the vehicle V has traveled from one location to another and the distance $\Delta D$ has been calculated.

First, the X and Y distance components of the calculated $\Delta D$ are determined by the computer 12, as follows (block 11A):

$$\Delta D_x = \Delta D \cos H \quad (3)$$

$$\Delta D_y = \Delta D \sin H \quad (4)$$

Next, the computer 12 calculates certain variable heading and distance errors $E_H$ and $E_D$, respectively, to be described in detail below. Generally, these errors $E_H$ and $E_D$ relate to sensor accuracies and overall system performance.

Thereafter, new XY coordinate data are calculated by the computer 12, for each corner R'S'T'U' of the CEP as follows (block 11C):

$$R'_x = R_x - E_D \Delta D_x - E_H \Delta D_y \quad (5)$$

$$R'_y = R_y - E_D \Delta D_y + E_H \Delta D_x \quad (6)$$

$$S'_x = S_x + E_D \Delta D_x - E_H \Delta D_y \quad (7)$$

$$S'_y = S_y + E_D \Delta D_y - E_H \Delta D_x \quad (8)$$

$$T'_x = T_x + E_D \Delta D_x + E_H \Delta D_y \quad (9)$$

$$T'_y = T_y + E_D \Delta D_y - E_H \Delta D_x \quad (10)$$

$$U'_x = U_x - E_D \Delta D_x + E_H \Delta D_y \quad (11)$$

$$U'_y = U_y - E_D \Delta D_y - E_H \Delta D_x \quad (12)$$

As indicated above, $E_H$ and $E_D$ are variables, as are $\Delta D_x$ and $\Delta D_y$ since these data depend on the distance traveled by vehicle V from one location to the other when it is time to advance the $DRP_o$ and expand the CEP. Consequently, the rate at which the CEP expands will vary. For example, the higher the values for $E_H$ or $E_D$, the faster the CEP will grow, reflecting the decreased accuracy of the $DRP_c$ and certainty of knowing the actual location of the vehicle V.

With the $DRP_o$ now being advanced to the $DRP_c$ and the CEP being expanded, FIG. 12 illustrates the flow chart of the subroutine for determining if it is time to test for an update (see block 8B). First, the computer 12 determines if 2 seconds have elapsed since a previous update was considered (not necessarily made) (block 12A). If not, it is not time for testing for an update (block 12B) and the remaining program is bypassed with control being returned to the main program.

If the 2 seconds have elapsed, computer 12 determines if the vehicle V has traveled a threshold distance since the previous update was considered (block 12C). If not, it is not time for testing for an update (block 12B). If yes, then it is time to determine if an update should be made (block 12D).

FIG. 13 is a flow chart of the subroutine for performing the multi-parameter evaluation by the computer 12 (see blocks 8C and 8D). First, the computer 12 determines a most probable line segment S, if any, based on the parameters (1)–(4) listed above (block 13A), as will be further described in relation to FIG. 14. If a most probable line segment S has been found (block 13B), then a determination is made (block 13C) as to whether this most probable segment S passes the correlation tests of the correlation parameter, as will be described in relation to FIG. 23. If not, a flag is set to bypass the update subroutine (block 13D). If yes, a flag is set (block 13E), so that control proceeds to the update subroutines.

FIG. 14 shows the flow chart of the subroutine for determining the most probable line segment S and if this line segment S is sufficiently probable to proceed with the update subroutines (see block 13A). First, the XY coordinate data of a line segment S are fetched by computer 12 from the navigation neighborhood of the map data base stored on medium 14 (block 14A). Then, the computer 12 determines if this line segment S is parallel to the heading H of the vehicle within a threshold (see the heading parameter, Section IV B1.) (block 14B), as will be described in relation to FIG. 15. If not, then the computer 12 determines if this line segment S is the last segment S in the navigation neighborhood to fetch (block 14C). If not, then the subroutine returns to block 14A, whereby the computer 12 fetches another segment S.

If the line segment S that is fetched is parallel to the heading H of the vehicle V within a threshold (block 14B), then the computer 12 determines if this line segment S intersects the CEP (block 14D) (see the closeness parameter relative to the estimate of the accuracy of the $DRP_c$; Section IV B2). An example of a procedure for determining whether a line segment S intersects the CEP is disclosed in a book entitled, "Algorithms for Graphics and Image Processing," by Theodosios Pavlidis, Computer Science Press, Inc., 1982 at §15.2 entitled, "Clipping a Line Segment by a Convex Polygon", and §15.3 entitled, "Clipping a Line Segment by a Regular Rectangle". If this line segment S does not intersect the CEP (block 14D), and if this line segment S is not the last segment S in the navigation neighborhood that is fetched (block 14C), then the subroutine returns to block 14A, whereby the computer 12 fetches another line segment S. If this line segment S does intersect the CEP (block 14D), then this line segment S is added by the computer 12 to a list stored in memory of lines-of-position L-O-P (block 14E) which qualify as probable segments S for further consideration.

Figure 16:
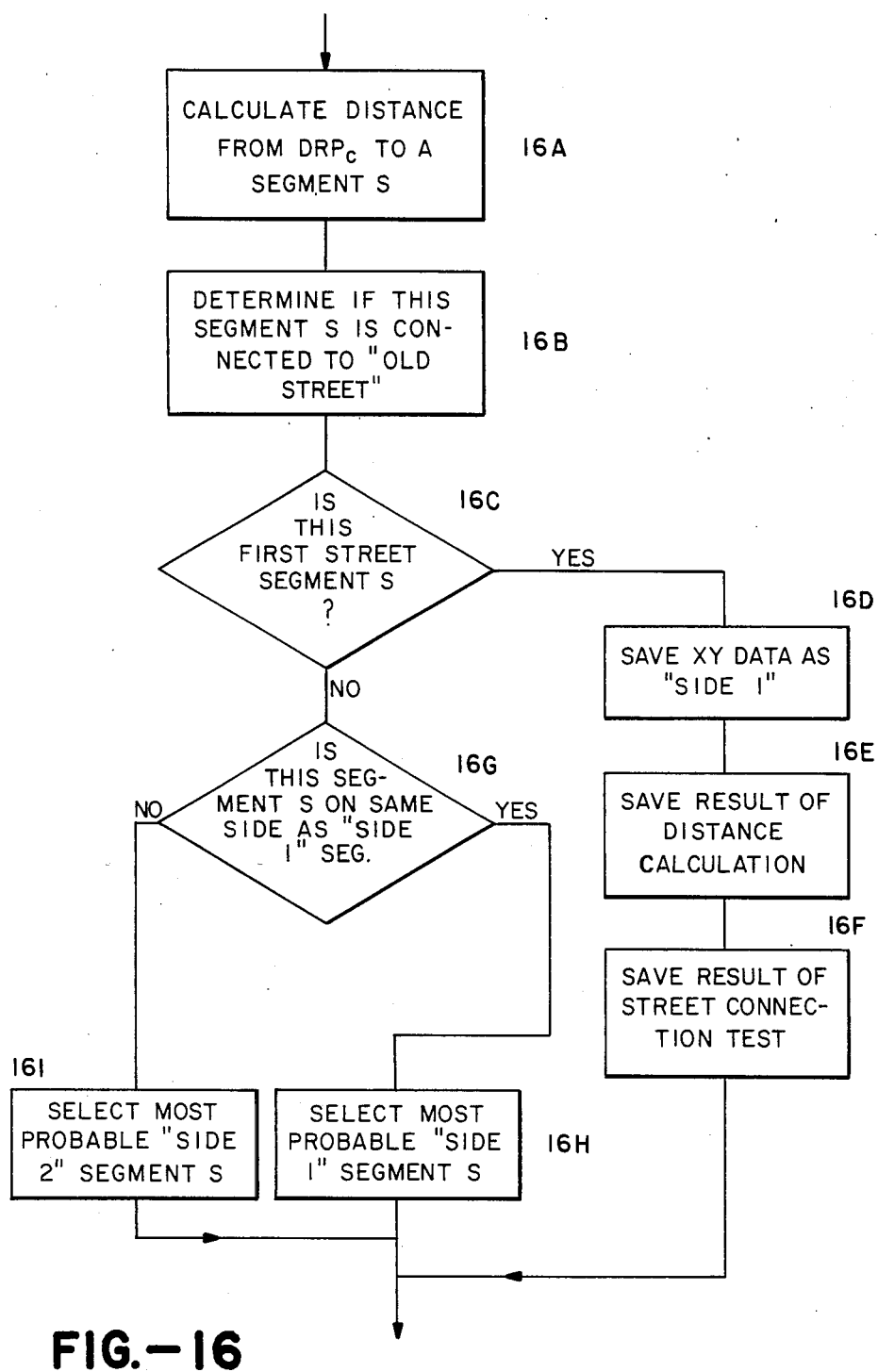

Next, the computer 12 tests this line segment S which was added to the list for the parameters of connectivity (see Section IV B3) and the closeness of two line segments S (see Section IV B4) (block 14F), as will be further described in relation to FIG. 16. If this line segment S fails a particular combination of these two tests, it is removed from the L-O-P list. The subroutine then continues to block 14C.

When the segment test of block 14C passes, then a most probable line segment S, if any, is selected by the computer 12 from the remaining entries in the L-O-P list (block 14G), as will be further described in relation to FIG. 20. It is this selected most probable line segment S which is the segment to which the $DRP_c$ is updated to the $DRP_{cu}$ if it passes the tests of the correlation parameter.

FIG. 15 shows the flow chart of the subroutine for determining if a segment S is parallel to the heading H of the vehicle V, i.e., the heading parameter (see block 14B). Initially, an angle $\theta$ of the line segment S is calculated (block 15A) in accordance with the following equation:

$$\theta = \text{arc tangent } \{(Y_2-Y_1)/(X_2-X_1)\} \quad (13)$$

where $X_1, X_2, Y_1, Y_2$ are the XY coordinate data of the end points EP of the line segment S currently being processed by the computer 12.

Then, the current heading H of the vehicle V is determined, i.e., the angle $\alpha$ (block 15B) from the heading data received from the sensor means 26. Next, the computer 12 determines if $|\theta-\alpha|$ or $|\theta-\alpha+180°|$ is less than a threshold number of degrees (block 15C). If this difference is not less than the threshold (block 15D), then the computer 12 determines that this line segment S is not parallel to the heading H of the vehicle (block 15E). If this difference is less than the threshold (block 15D), then the computer 12 determines that this segment S is parallel to the heading H of the vehicle V (block 15F).

FIG. 16 shows the flow chart of the subroutine for testing for the parameters of connectivity and closeness of two line segment S (see block 14F). First, the computer 12 calculates the distance from the current dead reckoned position $DRP_c$ to the line segment S (now a line-of-position L-O-P via block 14E) being processed (block 16A), as will be described further in relation to FIG. 17. Then, the computer 12 accesses the navigation neighborhood of the map data base to compute if this line segment S is connected to the "old street", which, as previously mentioned, corresponds to the line segment S to which the next preceding $DRP_{cu}$ was calculated to be on (block 16B). This line segment S and the old street segment S are or are not connected, as was described previously in relation to FIG. 6C.

Then, if this is the first line segment S being processed (block 16C), the XY coordinate data of this segment S are saved as "side 1" (block 16D). This "side 1" means that this line segment S is on one side of the $DRP_c$, as mentioned above in relation to FIG. 6D. Also, the result of the distance calculation (block 16A) is saved (block 16E), as well as the result of the segment connection calculation (block 16B) (block 16F).

If this line segment S currently being processed is not the first segment S (block 16C), then the computer 12 determines if this segment S is on the same side of the $DRP_c$ as the side 1 segment S (block 16G). If it is on the same side as the side 1 segment S, then the computer 12 selects the most probable segment S on side 1 (block 16H), as will be described in relation to the subroutine of FIG. 18.

If this line segment S is not on side 1 (block 16G), then it is on "side 2", i.e., the other side of the $DRP_c$. Accordingly, the most probable segment S on side 2 is selected (block 16I), as will be described for the subroutine of FIG. 19. Thus, at the end of this subroutine of FIG. 16, a most probable line segment S if any on side 1 and a most probable line segment S if any on side 2 of the $DRP_c$ have been selected, and these will be further tested for closeness or ambiguity, as will be described in relation to FIG. 20. All other L-O-P's on the list (see block 14E) have been eliminated from further consideration.

FIG. 17 is a flow chart showing the subroutine for calculating a distance d from the $DRP_c$ to a line segment S (see block 16A). First, using the coordinate data $X_2Y_2$ and $X_1Y_1$, which define the segment S, and the XY coordinate data of the $DRP_c$, the intersection I of a line 1, perpendicular to the segment S, and the segment S is calculated by the computer 12 (block 17A). The reason for the perpendicularity of the line 1 is that this will provide the closest intersection I to the $DRP_c$. This intersection I is identified by coordinate data $X_3Y_3$. Then, the distance d between the $DRP_c$ and the intersection I is calculated using the XY coordinate data of the $DRP_c$ and $X_3Y_3$ (block 17B).

FIG. 18 illustrates the flow chart of the subroutine for selecting the most probable line segment S on side 1 of the current dead reckoned position $DRP_c$ (see block 16H). First, the computer 12 determines if this line segment S being processed and the side 1 line segment S are both connected to the old street segment S (block 18A). If so connected, then the computer 12, having saved the result of the distance calculation (block 16E), determines if this line segment S is closer to the current dead reckoned position $DRP_c$ than the side 1 line segment S (block 18B). If not, the side 1 segment S is retained as the side 1 segment S (block 18C). If closer, then this line segment S is saved as the new side 1 segment S along with its distance and connectivity data (block 18D).

If this line segment S and the side 1 segment S are not both connected to the old street segment S (block 18A), then the computer 12 determines if this line segment S and the side 1 segment S are not both connected to the old street segment S (block 18E). If the answer is yes, then the subroutine proceeds via block 18B as above. If the answer is no, then the computer 12 determines if this line segment S is connected to the old street segment S and if the side 1 segment S is not so connected (block 18F). If the answer is no, then the side 1 segment S is retained as the side 1 segment S (block 18C). Otherwise, this line segment S becomes the side 1 segment S (block 18D). Thus, at the end of this subroutine, only one line segment S on one side of the current dead reckoned position $DRP_c$ is saved as the side 1 segment S.

FIG. 19 shows the flow chart of the subroutine for selecting the most probable line segment S on side 2, i.e., the other side from side 1 of the current dead reckoned position $DRP_c$ (see block 16I). If this is the first line segment S on side 2 being considered by the computer 12 (block 19A), then this line segment S is saved as the "side 2" segment S along with its distance and connectivity data (block 19B). If not, then the computer 12, having saved the results of the street connection tests (block 16F), decides if this line segment S and the side 2 segment S are both connected to the old street segment S (block 19C). If yes, then the computer 12, having saved the results of the distance calculation (block 16E), decides if this line segment S is closer to the current dead reckoned position $DRP_c$ than the side 2 segment S (block 19D). If not, the side 2 segment S is retained as the side 2 segment S (block 19E). If it is closer, then this line segment S is now saved as the side 2 segment S along with its distance and connectivity data (block 19F).

If this line segment S and the side 2 segment S are not both connected to the old street segment S (block 19C), then the computer 12 determines if this line segment S and the side 2 segment S are both not connected to the old street segment S (block 19G). If the answer is yes, then the subroutine proceeds through block 19D. If not, then a decision is made by the computer 12 if this line segment S is connected to the old street segment S and the side 2 segment S is not connected to the old street segment S (block 19H). If not, then the side 2 segment S is retained as the side 2 segment S (block 19E). If yes, then this line segment S is retained as the new side 2 segment S along with its distance and connectivity data (block 19F).

FIG. 20 shows the flow chart of the subroutine for selecting the most probable segment S of the remaining segments S (see block 14G). First, the computer 12, having made a list of segments S qualifying as a line-of-position L-O-P (block 14E) and eliminating all but no more than two, determines if only one segment S has qualified as such a line-of-position L-O-P (block 20A). If there is only one, then this line segment S is selected as the most probable segment S in the navigation neighborhood at this time (block 20B). The computer 12 then determines if this most probable segment S passes the tests of the correlation parameter (block 20C), as will be described in connection with the subroutine of FIG. 23. If this segment S does not pass these tests, no update will occur. If this segment S passes the correlation tests, then the subroutine continues accordingly towards determining the point on this line segment S to which the $DRP_{cu}$ should be positioned i.e., towards an update of $DRP_c$ to $DRP_{cu}$.

If more than one remaining line segment S qualifies as a line-of-position L-O-P (block 20A), then there is a side 1 segment S and a side 2 segment S, and the computer 12 determines if the side 1 segment S is connected to the old street segment S and if the side 2 segment S is not connected to the old street segment S (block 20D). If the answer is yes, then the side 1 segment is selected as the most probable segment S in the navigation neighborhood (block 20E), and the subroutine continues directly to block 20C.

If the answer is no (block 20D), then the computer 12 determines if the side 2 segment S is connected to the old street segment S and the side 1 segment S is not connected to the old street segment S (block 20F). If the answer is yes, then the side 2 segment S is selected as the most probable segment S in the navigation neighborhood (block 20G), and the subroutine continues directly to block 20C. If the answer is no, then the computer 12 determines if the side 1 segment S and the side 2 segment S are too close together (block 20H) (see the ambiguity parameter; Section IV B4), as will be described more fully in relation to the flow chart of FIG. 21. If the side 1 segment S and the side 2 segment S are too close together, then the computer 12 determines that no most probable segment S exists at this time (block 20I) and no update will be made at this time.

If these two line segments S are not too close together (block 20H), then the computer 12 determines if one segment S is closer to the $DRP_c$ than the other segment S within a threshold (block 20J), as will be further described in connection with the subroutine of FIG. 22. If not, then the computer 12 determines that no most probable segment S occurs at this time (block 20I); consequently, no update will be made at this time. If yes, then the one segment S is selected as the most probable segment S (block 20K) and the subroutine continues to block 20C. Thus, at the completion of this subroutine, either no most probable segment S exists at this time or a most probable segment S exists if it passes the test of the correlation parameter (see Section IV.B.5 above).

Figure 21:
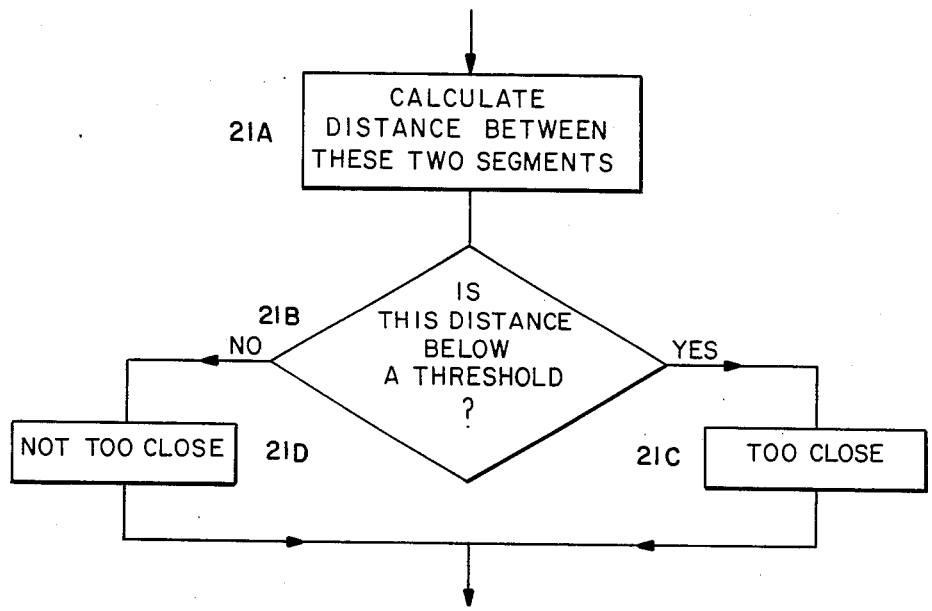

FIG. 21 shows the flow chart of the subroutine for determining if the side 1 and side 2 segments S are too close together (see block 20H). First, the distance between the two segments S is calculated by the computer 12 (block 21A). Then, the computer 12 determines if this distance is below a threshold distance (block 21B). If yes, then the two segments S are too close together, representing an ambiguous condition (block 21C), thereby resulting in no updating at this time. If not, the segments S are determined to be not too close together (block 21D) and an update possibly may occur.

Figure 22:
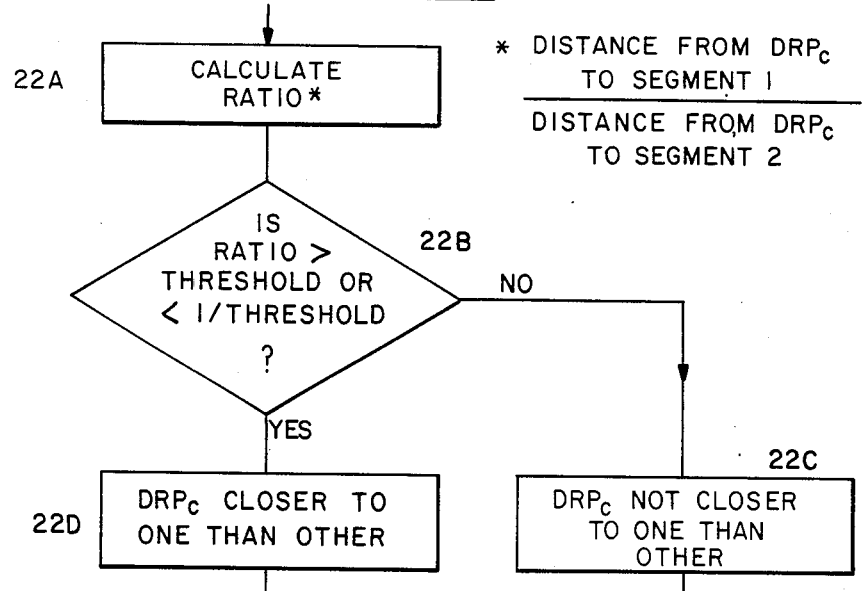

FIG. 22 illustrates the flow chart of the subroutine for determining if the side 1 segment S or the side 2 segment S is significantly closer to the $DRP_c$ than the other (see block 20J). First, the computer 12 calculates the ratio of the distance from the $DRP_c$ to the side 1 segment S to the distance from the $DRP_c$ to the side 2 segment S (block 22A). Then, the computer 12 determines if this ratio is greater than a threshold or less than 1/threshold, (block 22B). If not, then the $DRP_c$ is determined to be not closer to one segment S than the other segment S (block 22C), thereby resulting in no updating at this time. If yes, then the $DRP_c$ is determined to be closer to the one segment S than the other (block 22D) and an update possibly may occur.

Figure 23:
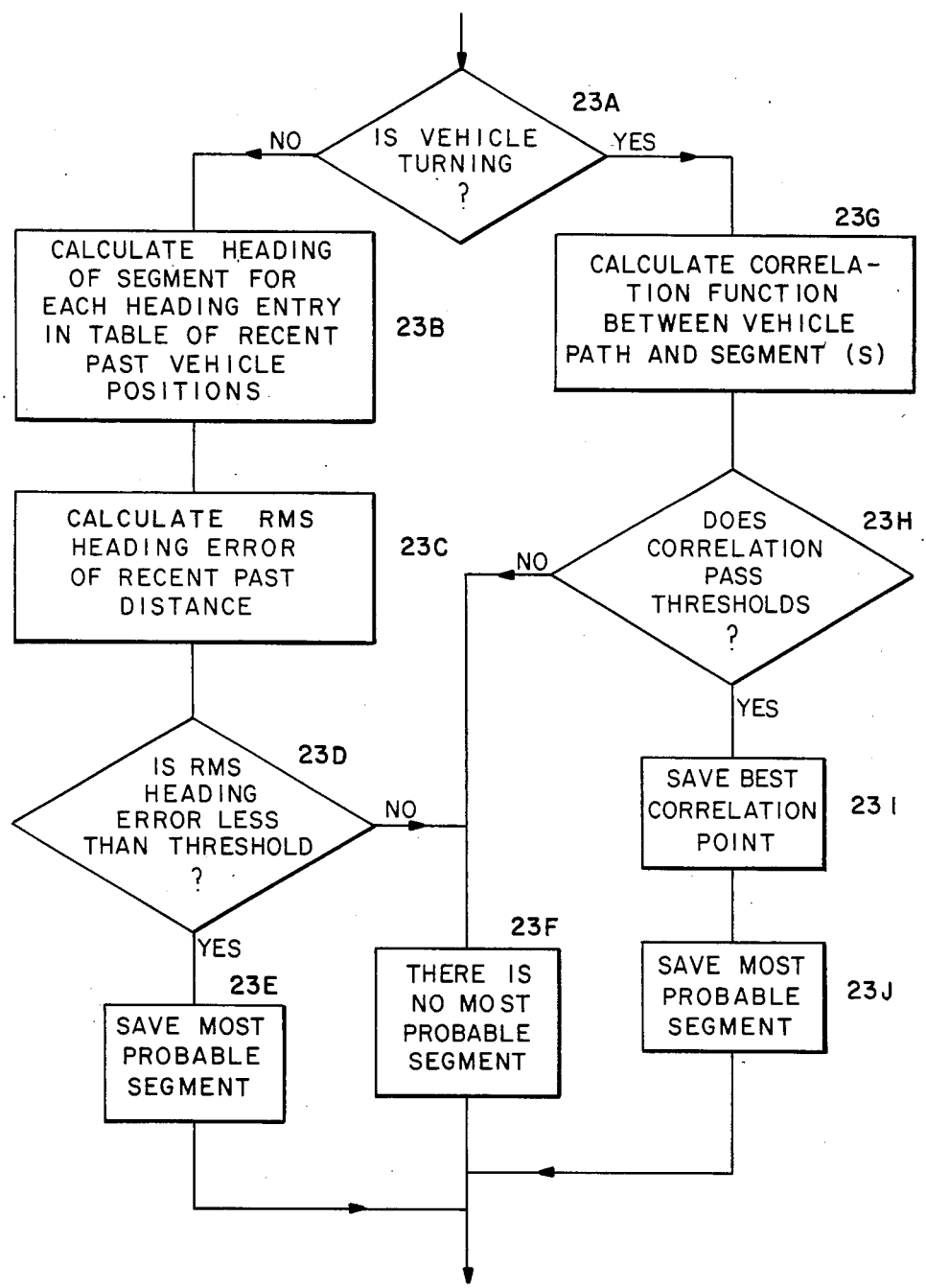

FIG. 23 shows the subroutine for performing the correlation tests with respect to the most probable segment S (see block 20C). As was discussed in relation to the subroutine of FIG. 13, once the most probable segment S has been determined to exist, a determination is made by the computer 12 as to whether or not the vehicle has been turning, as will be described further in relation to FIG. 25. If the computer 12 determines that the vehicle V has not been turning (block 23A), it performs the correlation test by a simple path matching computation (blocks 23B-23F), as will be described in conjunction with FIGS. 24A-24D (see also Section IV.B.5b above). Otherwise, it performs the correlation test by calculating and testing a correlation function (blocks 23G-23J) (see also Section IV.B.5c above).

FIG. 24A to FIG. 24D are illustrations of plots of various data used by the computer 12 in determining if the simple path match exists. FIG. 24A is a plot of XY positions of a plurality of segments S of the street St on which the vehicle V may be actually moving, in which this street St has six line segments $S_1$-$S_6$ defined by end points a-g, as shown, and one of which corresponds to the most probable segment S. FIG. 24B is a plot of the XY positions of a plurality of dead reckoned positions DRP previously calculated in accordance with the present invention and equations (1) or (1') and (2) or (2'), as shown at points A-K, including the current dead reckoned position $DRP_c$ at point K. FIG. 24B shows these dead reckoned positions DRP over a total calculated distance D traveled by the vehicle V, which is the sum of $\Delta D_1$-$\Delta D_{10}$. FIG. 24C shows the headings $h_1$-$h_6$ corresponding to the line segments $S_1$-$S_6$, respectively, as a function of distance along the street St of FIG. 24A (as distinct from the X position). As previously mentioned, the map data base has end point data identifying the line segments $S_1$-$S_6$ of a given street St shown in FIG. 24A, but the heading data of FIG. 24C are calculated by the computer 12, as needed in accordance with the discussion below. FIG. 24D shows the corresponding measured headings $H_1-H_{10}$ of the vehicle V for $\Delta D_1-\Delta D_{10}$, respectively, of FIG. 24B.

The $\Delta D$ distance data and the heading data $H_1-H_{10}$ shown in FIG. 24B and FIG. 24D are calculated by and temporarily stored in the computer 12 as a heading table of entries. FIG. 24D is a plot of this table. Specifically, as the vehicle V travels, every second the distance traveled and heading of the vehicle V are measured. An entry is made into the heading table if the vehicle V has traveled more than a threshold distance since the preceding entry of the table was made.

With reference again to FIG. 23, the computer 12 calculates the heading h of the street St for each entry in the heading table for a past threshold distance traveled by the vehicle V (block 23B). That is, this heading h of the street St is calculated for a threshold distance traveled by the vehicle V preceding the current dead reckoned position $DRP_c$ indicated in FIG. 24B. For example, this threshold distance may be approximately 300 ft.

Then, the computer 12 calculates the RMS (root mean square) heading error over this threshold distance (block 23C). The RMS heading error calculation is performed in accordance with the following equation:

$$\text{RMS error } (p) = \sqrt{\frac{1}{n} \sum_{i=o}^{n} (\text{street heading } (i,p) - \text{heading}(i))^2} \quad (14)$$

where:
  n = number of entries in heading table
  heading (i) = heading of vehicle V at $i^{th}$ entry in heading table
  street heading (i,p) = street heading for $i^{th}$ entry in heading table assuming the vehicle V is at a position p.

The computer 12 then determines if this RMS heading error (calculated for one position p— the $DRP_c$) is less than a threshold (block 23D). If it is, then the computer 12 determines that the measured dead reckoning path of the vehicle V does match this most probable element S and the latter is saved (block 23E). If not, then the computer 12 determines that the measured dead reckoning path of the vehicle V does not match this most probable segment, so that there is no most probable segment S (block 23F). Thus, if the match exists, there is a most probable segment S to which the current dead reckoned position $DRP_c$ can be updated; otherwise, no update is performed at this time.

If the computer 12 determines that the vehicle V has been turning (block 23A), then it performs the correlation test by computation of a correlation function (blocks 23G–23J). First, the computer 12 calculates a correlation function between the measured path of the vehicle V and the headings of certain line segments S including the most probable segment S and line segments S connected to it (block 23G), as will be described further in relation to FIG. 26. The computer 12 then determines if the results from this correlation function passes certain threshold tests (block 23H), as will be described in relation to FIG. 27. If not, then no most probable segment is found (block 23F). If the correlation function does pass the threshold tests (block 23H), then XY data of a "most probable point", i.e., the best point BP previously mentioned, on the correlation function is saved corresponding to a position along the segment S with the best correlation (block 23I). Then, this segment S is saved as the most probable segment.

Figure 25:
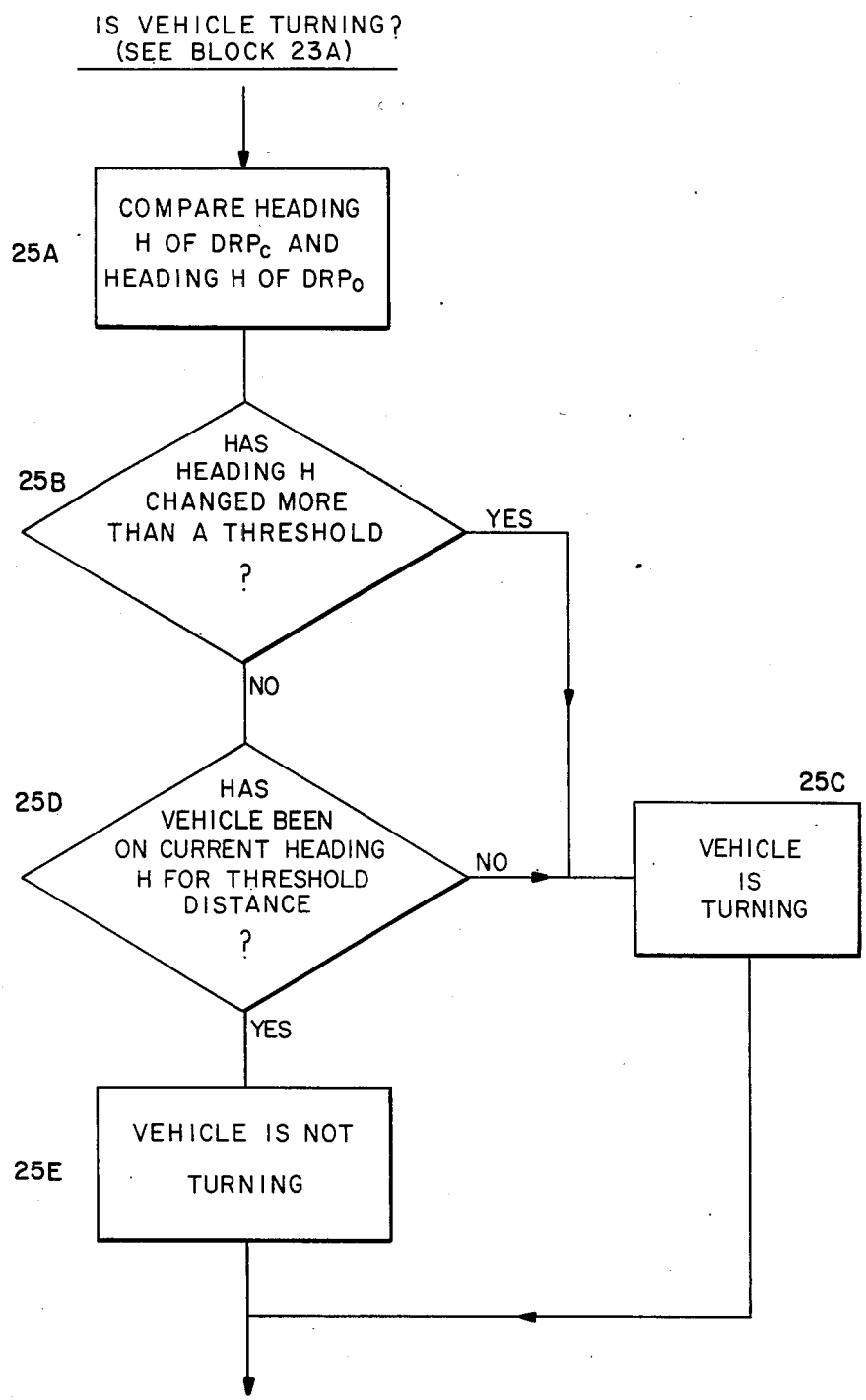

FIG. 25 shows the subroutine for determining if the vehicle V is turning (see block 23A). The computer 12 begins by comparing the data identifying the heading H associated with the current dead reckoned position $DRP_c$ and the data identifying the preceding heading H associated with the old dead reckoned position $DRP_o$ (block 25A). If the current heading data indicate that the current heading H has changed more than a threshold number of degrees (block 25B), then the computer 12 decides that the vehicle V has been turning (block 25C).

If the current heading H has not changed more than a threshold number of degrees (block 25B), then the computer 12 determines if the vehicle V has been on the current heading H for a threshold distance (block 25D). If not, the vehicle V is determined to be turning (block 25C); however, if the vehicle V has been on the current heading H for a threshold distance (block 25D), then a decision is made by the computer 12 that the vehicle V is not turning (block 25E).

FIG. 26 illustrates the flow chart of the subroutine for calculating the correlation function between the path of the vehicle V and the selected line segments S mentioned above (see block 23G), while FIG. 26-1 illustrates the calculated correlation function. The correlation function is calculated by first calculating a maximum dimension L of the CEP associated with the $DRP_c$ (block 26A). Then, with reference again to FIG. 24A and FIG. 24C, which are also used to explain this correlation test, the two end points $EP_1$, $EP_2$ of the interval L which are plus or minus L/2 respectively from a best guess (BC) position or the $DRP_{cu}$ are calculated by the computer 12 (block 26B). Next, the computer 12 divides this interval L into a plurality of positions which are, for example 40 feet apart (block 26C). Next, for each such position, the heading h of the street St is calculated for each $\Delta D$ distance entry in the above-mentioned heading table (block 26D). Thereafter, the RMS heading error for each position (p) along the interval L is calculated by the computer 12, using equation (14) (block 26E).

Figure 27:
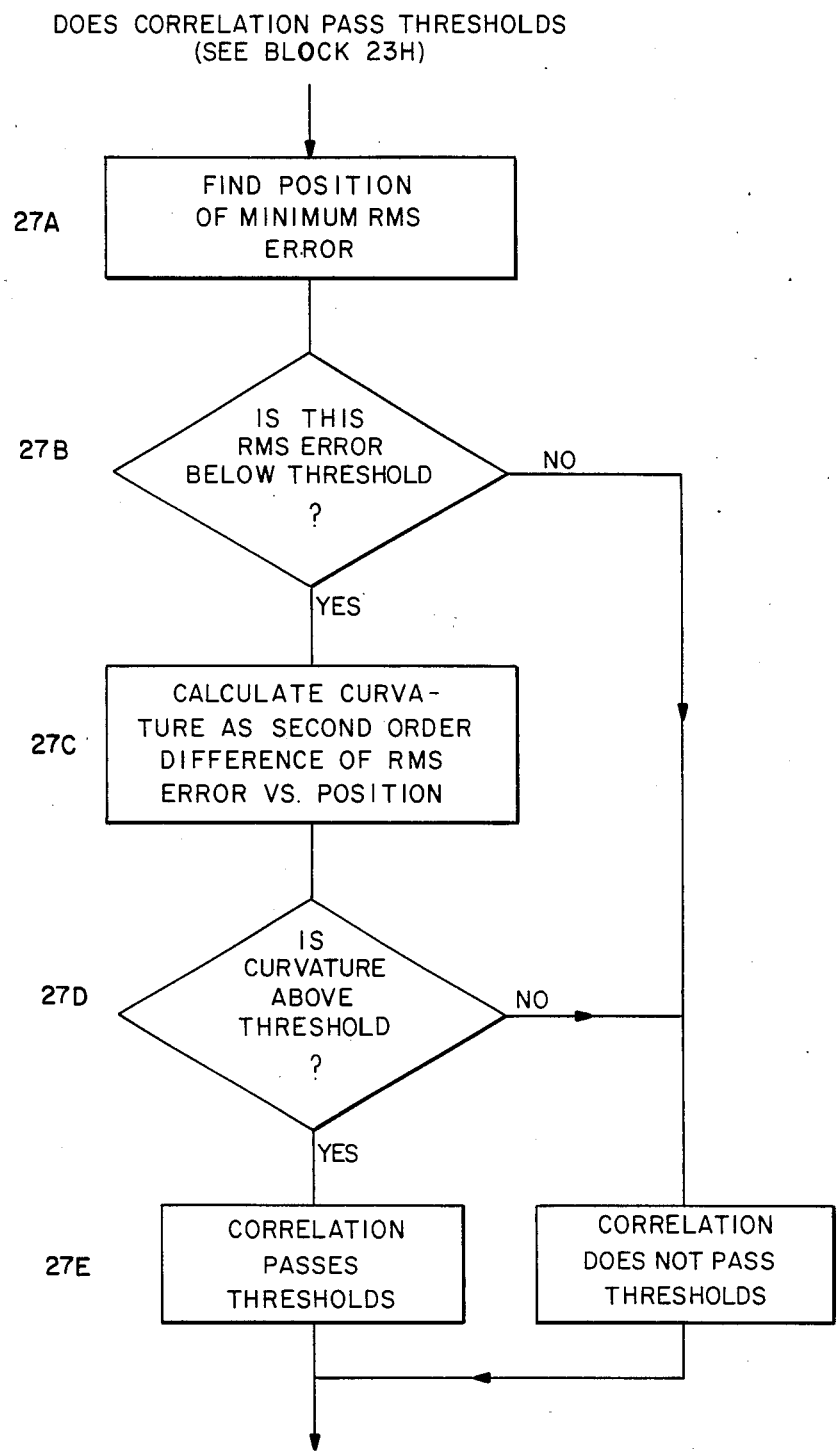

FIG. 27 illustrates the flow chart of the subroutine for determining if the correlation function passes certain thresholds (see block 23H). First, the computer 12 finds the position of minimum RMS error (block 27A), which is shown in FIG. 26-1. Then, the computer 12 determines if this RMS error is below a threshold (block 27B). If not, the remaining subroutine is bypassed and no most probable segment S is found (returning to block 23F). If the RMS error is below a threshold, then the curvature of the correlation function at the minimum position is calculated by taking a second order difference of the RMS error vs. position (block 27C). If this curvature is not above a threshold (block 27D), then the correlation test fails and the remaining subroutine is bypassed (block 27F). If this curvature is above the threshold (block 27D), then the computer 12 determines that the correlation calculation passes the test of all thresholds (block 27E), whereby the position of the RMS minimum error is the best point BP (see block 23I) that becomes $DRP_{cu}$. If the curvature is above the threshold, then this assures that the correlation parameter has peaked enough. For example, if the line segments S for the distances covered by the heading table are straight, then the second order difference would be zero and the correlation parameter would not contain any position information for the $DRP_{cu}$.

Figure 28:
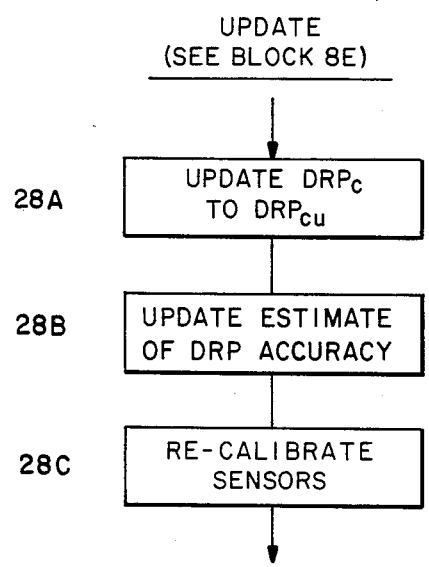

Consequently, and with reference again to FIG. 8, assume now that as a result of the multiparameter evaluation (block 8C), that a more likely position for the $DRP_c$ can be determined (block 8D), in that there is a line segment S to which the $DRP_c$ may be updated. Therefore, FIG. 28 is a flow chart showing generally the subroutine for the update (see block 8E). Thus, first the computer 12 updates the current dead reckoned position $DRP_c$ to the current updated dead reckoned position $DRP_{cu}$ (block 28A), as will be further described in relation to FIG. 29. Next, the computer 12 updates the estimate of the accuracy of the $DRP_c$ (block 28B), as will be described in relation to FIG. 32. Next, the sensor means 16 and sensor means 26 are recalibrated (block 28C), as will be described in relation to FIG. 35.

Figure 29:
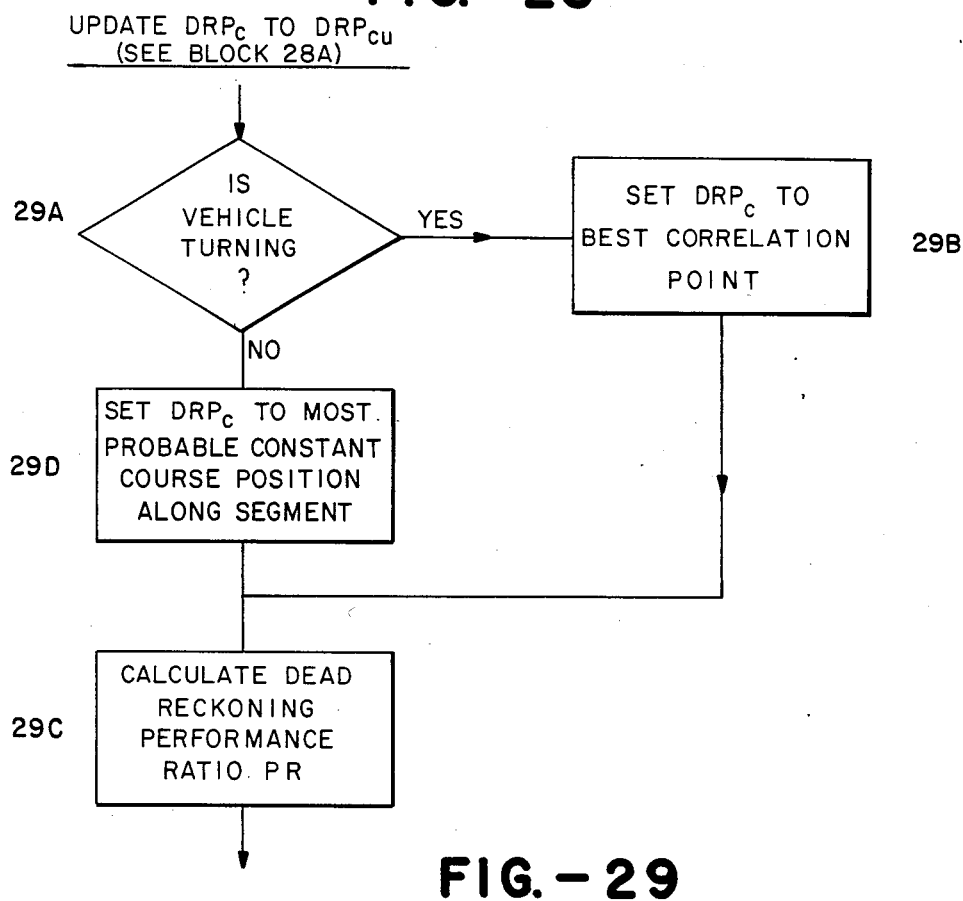

FIG. 29 illustrates the flow chart of the subroutine for updating the $DRP_c$ to the $DRP_{cu}$. If the vehicle has been turning (block 29A), then the XY coordinate data of the $DRP_c$ are set to the XY coordinate data of the best correlation point BP previously calculated (see block 23I), thereby updating the $DRP_c$ to the $DRP_{cu}$ (block 29B). Then, a dead reckoning performance ratio PR is calculated (block 29C), which, for example, is equal to the distance between the $DRP_c$ and the $DRP_{cu}$ divided by the calculated distance $\Delta D$ the vehicle V has traveled since the last update of a $DRP_c$ to a $DRP_{cu}$. This performance ratio PR is used to calculate a certain error in the system 10 that, as previously mentioned and as will be further described, is used for determining the varying rate or rate of growth of the CEP. If the vehicle V has not been turning (block 29A), then the $DRP_c$ is set to the most probable constant course position (block 29D), as will be described in relation to FIG. 30, followed by the calculation of the dead reckoning performance ratio PR (block 29C).

Figure 30:
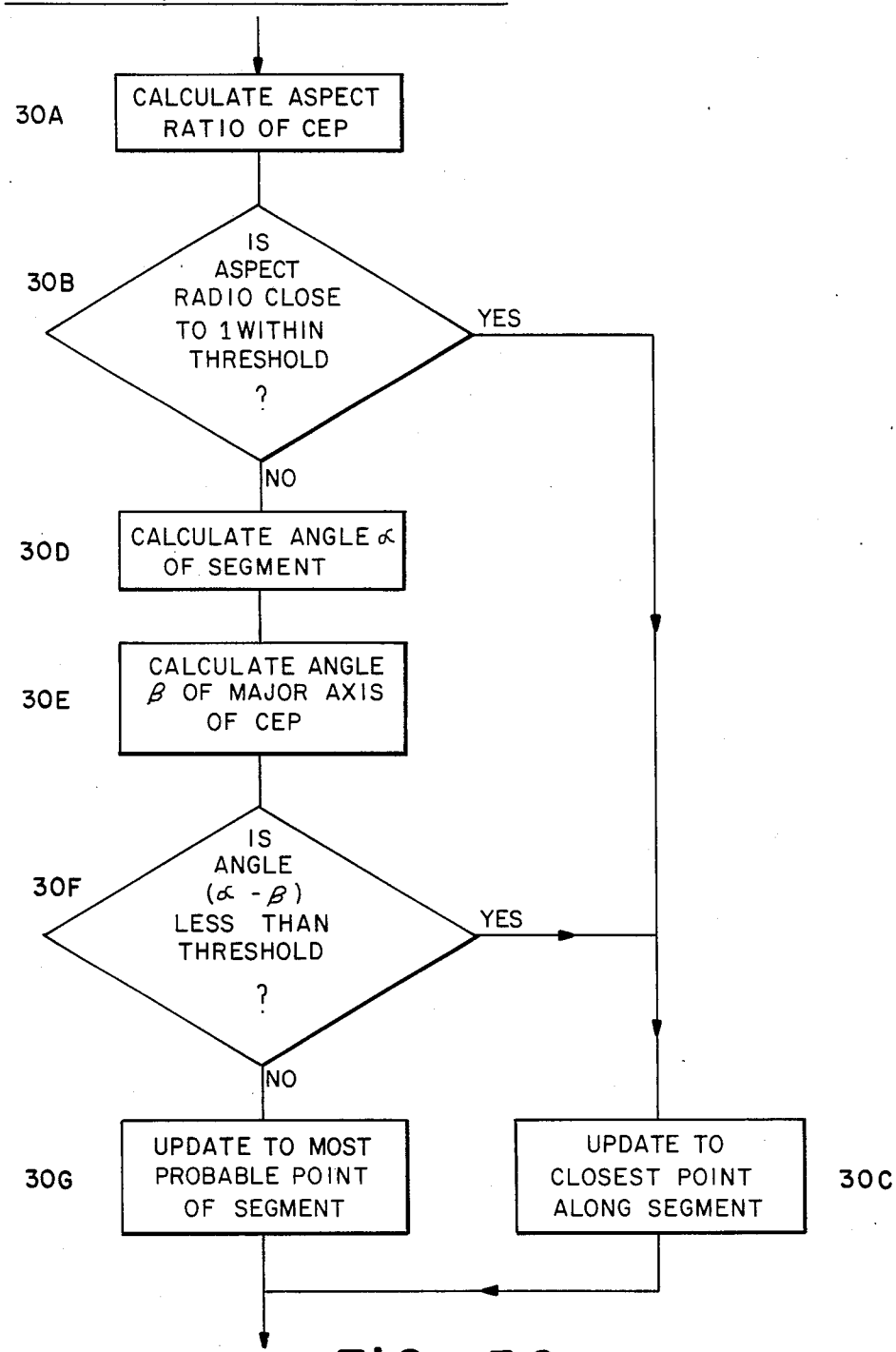
Figures 1, 30:
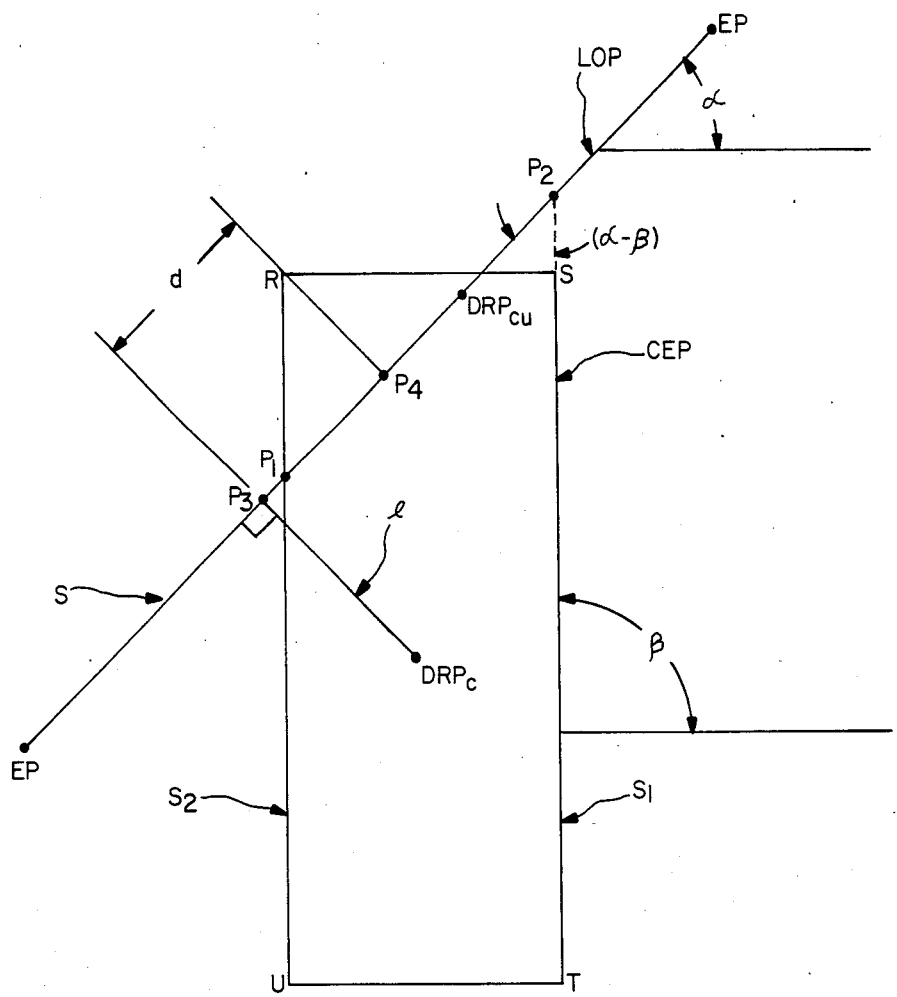

FIG. 30 illustrates the flow chart of the subroutine for updating a given $DRP_c$ to a given $DRP_{cu}$ when the vehicle V is on a constant heading H (see block 29D). FIG. 30-1 also will be used to describe the updating of the $DRP_c$ to the $DRP_{cu}$ and shows the $DRP_c$, a given CEP associated with the $DRP_c$ and the most probable line segment S.

Thus, first the computer 12 calculates the aspect ratio AR of the CEP, which equals $|\overline{RS}| \div |\overline{ST}|$ (block 30A). Then, the computer 12 determines if this aspect ratio AR is close to 1 within a threshold (block 30B). If it is, then the update of the $DRP_c$ is made to the closest point along the most probable segment S (block 30C). As shown in FIG. 30-1, the closest point is point $P_3$ which is the point at which a line l, drawn through the $DRP_c$ and perpendicular to the segment $S_1$, intersects the latter.

If the aspect ratio AR is not close to 1 within the threshold (block 30B), then the computer 12 calculates an angle $\alpha$ of the segment S shown in FIG. 30-1 (block 30D). Then, the computer 12 calculates an angle $\beta$ of the major axis of the CEP, as shown in FIG. 30-1, (block 30E). Next, the computer 12 determines if the angle ($\alpha$-$\beta$) is less than a threshold (block 30F). If it is, then the subroutine proceeds to block 30C. If not, the $DRP_c$ is updated to a most probable point (approximately the most probable point) on the segment S (block 30G), as will now be described in relation to FIG. 31.

Figure 31:
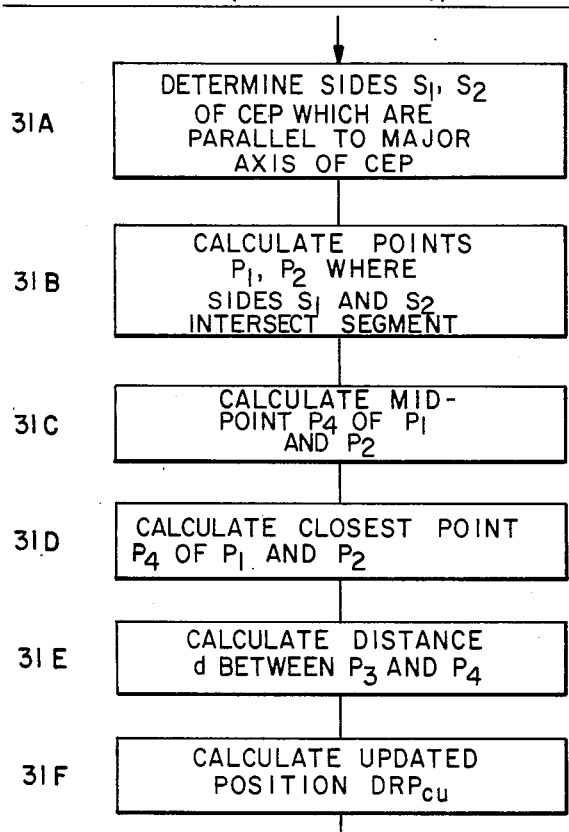

FIG. 31 shows the flow chart of the subroutine for updating the $DRP_c$ to a most probable point on the most probable segment S (see block 30G). Reference again will also be made to FIG. 30-1. First, the computer 12 determines the sides which are parallel to the major axis of the CEP, i.e., sides $S_1$ and $S_2$ in the example shown in FIG. 30-1, (block 31A). Next, the computer 12 calculates the points $P_1$ and $P_2$ where the sides $S_1$ and $S_2$ intersect the most probable segment S (block 31B). Next, the computer 12 calculates the mid-point $P_4$ between point $P_1$ and $P_2$ (block 31C). Then, the computer 12 calculates the closest point $P_3$ (block 31D) in the manner previously described. Next, a distance d between point $P_3$ and point $P_4$ is calculated by the computer 12 (block 31E). Finally, the computer 12 calculates the XY coordinate data of the $DRP_{cu}$ (block 31F) in accordance with the following equations:

$$DRP_{cu}(x) = P_3(x) + d \cos(\alpha - \beta) \cos \alpha \qquad (15)$$

$$DRP_{cu}(y) = P_3(y) + d \cos(\alpha - \beta) \sin \alpha \qquad (16)$$

Figure 32:
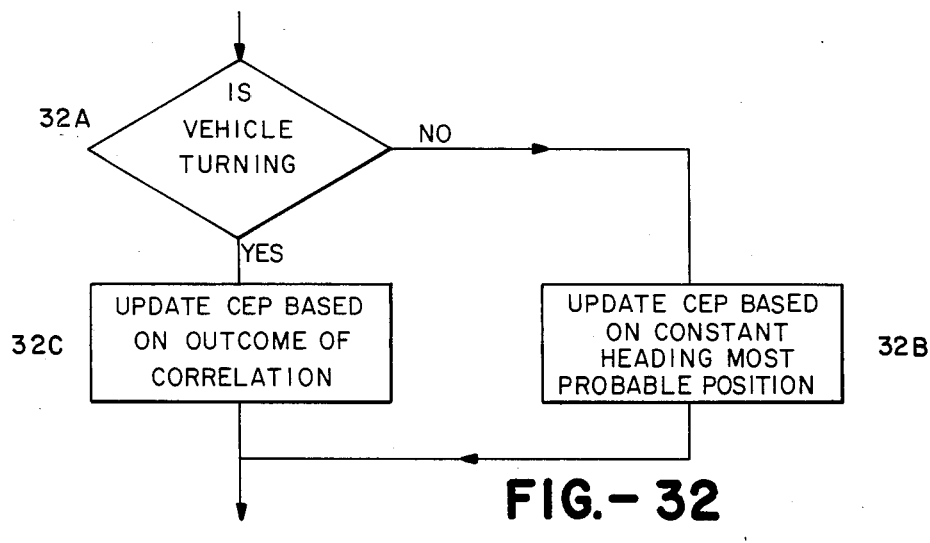

Having now updated the $DRP_c$ to the $DRP_{cu}$, the computer 12 performs the subroutine shown in FIG. 32 for updating the CEP associated with the $DRP_c$ to an updated $CEP_u$ associated with the $DRP_{cu}$ (see block 28B). If the vehicle has not been turning (block 32A), then the CEP is updated based on the constant heading most probable position (block 32B), as will be described in FIG. 33. If the vehicle has been turning, the CEP will be updated based on the calculation of the correlation function (block 32C), as will be described in FIG. 34.

Figures 1, 33:
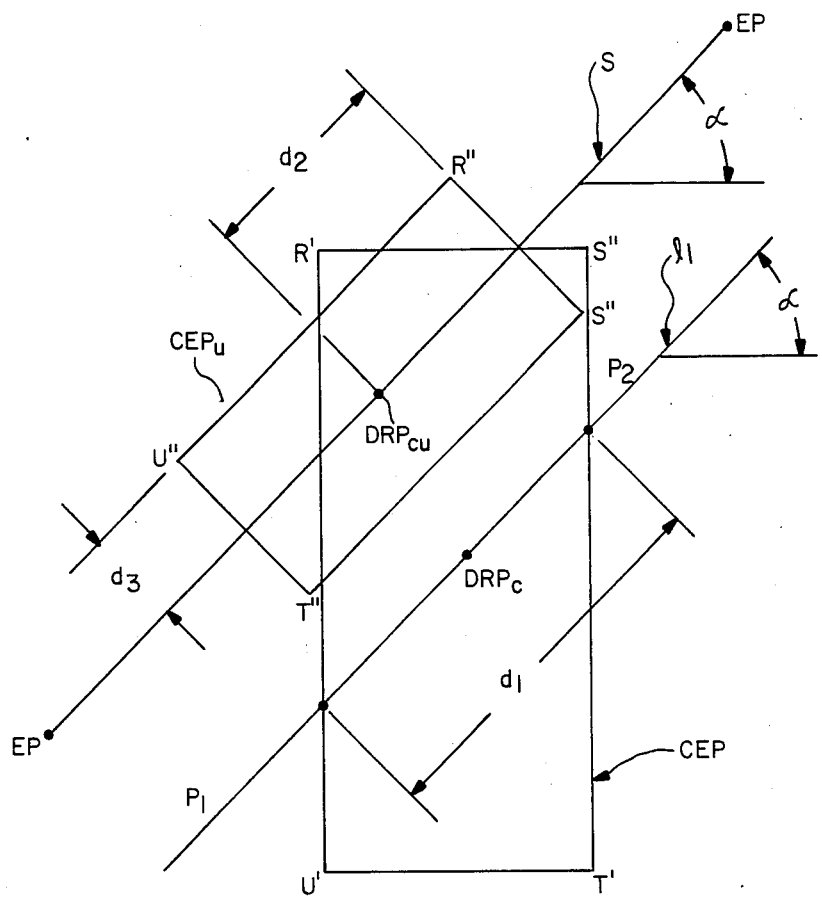

FIG. 33 shows the flow chart of the subroutine for updating the CEP to the $CEP_u$ based on the constant heading most probable position (see block 32B). Also, reference will be made to FIG. 33-1 which is used to explain the flow chart of FIG. 33, in which FIG. 33-1 shows a given CEP, the associated $DRP_c$, the $DRP_{cu}$ and the resulting $CEP_u$. First, assume that the computer 12 has calculated the $DRP_{cu}$ as described previously in relation to FIG. 30. Then, an angle $\alpha$ of the most probable segment S is calculated (block 33A). Then, the computer 12 calculates a line $l_1$ which is parallel to the most probable segment S and passes through the $DRP_c$ (block 33B), i.e., line $l_1$ also has the angle $\alpha$. Next, points $P_1$ and $P_2$ along the line $l_1$ which intersect the CEP are calculated (block 33C). Next, the computer 12 calculates the distance $d_1$ between the points $P_1$ and $P_2$ (block 33D). Next, for the major or longitudinal axis of the $CEP_u$, the distance $d_2 = d_1/2$ is calculated (block 33E). Then, the computer 12 determines the half axis or distance $d_3$ for the $CEP_u$ perpendicular to the most probable segment S, in which $d_3$ is equal to the half-width of the width W of the street St that is fetched from the navigation neighborhood of the map data base (block 33F). The calculated distances, $d_2$ and $d_3$, are compared to threshold minimum distances according to the map accuracy data fetched from the map data base (block 33G) to set the minimum size of the $CEP_u$ (see Section III.A.2.f). Finally, the XY coordinate data of the corners R''S''T''U'' of the $CEP_u$ are calculated as follows (block 33H):

$$R''(x) = DRP_{cu}(x) + d_2 \cos \alpha - d_3 \sin \alpha \qquad (17)$$

$$R''(y) = DRP_{cu}(y) + d_2 \sin \alpha + d_3 \cos \alpha \qquad (18)$$

$$S''(x) = DRP_{cu}(x) + d_2 \cos \alpha - d_3 \sin \alpha \qquad (19)$$

$$S''(y) = DRP_{cu}(y) + d_2 \sin \alpha - d_3 \cos \alpha \quad (20)$$

$$T''(x) = DRP_{cu}(x) - d_2 \cos \alpha + d_3 \sin \alpha \quad (21)$$

$$T''(y) = DRP_{cu}(y) - d_2 \sin \alpha - d_3 \cos \alpha \quad (22)$$

$$U''(x) = DRP_{cu}(x) - d_2 \cos \alpha - d_3 \sin \alpha \quad (23)$$

$$U''(y) = DRP_{cu}(y) - d_2 \sin \alpha + d_3 \cos \alpha \quad (24)$$

Figure 34:
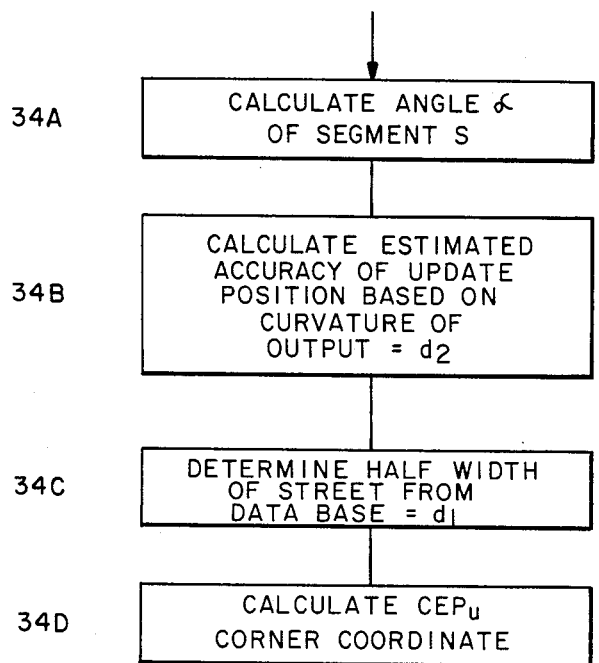
Figures 1, 34:
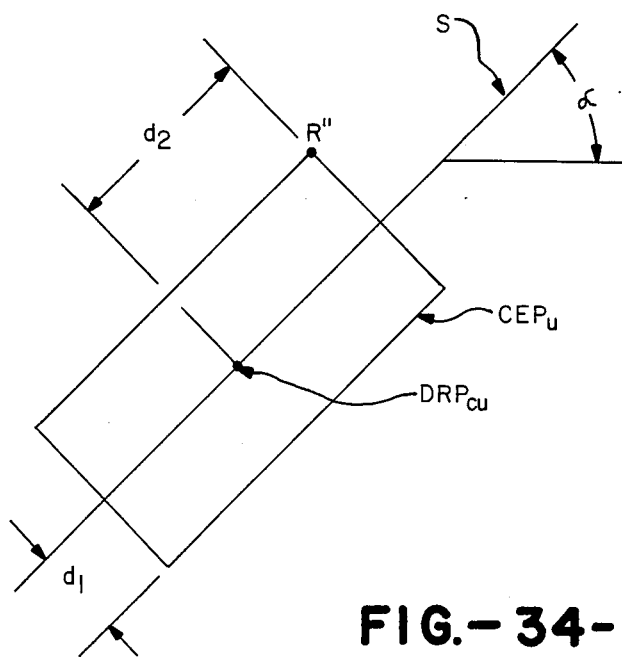

FIG. 34 shows the flow chart of the subroutine for updating the CEP to the $CEP_u$ based on the outcome of correlation function (see block 32C). FIG. 34-1, which shows the most probable segment S, the $DRP_{cu}$ and the resulting $CEP_u$, will also be used to describe the flow chart of FIG. 34. Thus, first, the computer 12 calculates an angle $\alpha$ (block 34A). Then, an estimated uncertainty of the position of the $DRP_{cu}$ based on the curvature of the correlation function is calculated, i.e., the distance $d_2$ (block 34B). Next, the computer 12 determines the half-width, $d_1$, of the street St based on its width W which is fetched from the navigation neighborhood of the map data base (block 34C). As similarly described above, the calculated distances, $d_1$ and $d_2$, are compared to threshold minimum distances according to the map accuracy data fetched from the map data base to set the minimum size of the $CEP_u$; (see Section III.A.2f). Next, the updated $CEP_u$ is calculated using similar equations as shown for R'', as follows (block 34D):

$$R''(x) = DRP_{cu}(x) - d_1 \sin \alpha + d_2 \cos \alpha \quad (25)$$

$$R''(y) = DRP_{cu}(y) + d_1 \cos \alpha + d_2 \sin \alpha \quad (26)$$

With the $DRP_{cu}$ being determined (see block 28A), and the $CEP_u$ being determined (see block 28B), FIG. 35 now shows the flow chart of the subroutine for recalibrating the sensor means 16 and 26 (see block 28C). If the vehicle V is turning (block 35A), as may be determined in a manner previously described, then the remaining subroutine is bypassed and the sensor means 16 and 26 are not recalibrated at this time. If the vehicle V is not turning, then the heading sensor means 26 is recalibrated (block 35B), as will be described more fully below in relation to FIG. 35-1. Next, if the vehicle V did not just finish a turn, then the remaining subroutine is bypassed (block 35C). If the vehicle V did just finish a turn, then the distance sensor means 16 is recalibrated (block 35D), as will be described more fully below in relation to FIG. 35-2.

FIG. 35-1 shows a plot of the deviation of the heading sensor means 26 as a function of the output of the heading sensor means 26. This plot is stored on medium 14 as a heading deviation table mentioned previously. Upon updating the $DRP_c$ to the $DRP_{cu}$, the measured heading H of the vehicle V and the actual heading h of the street St corresponding to the $DRP_{cu}$ are then known, as previously described. Consequently, with this heading data being available, any error or deviation between the measured heading H and the actual heading h of the street St is known. Therefore, the computer 12 can now make an appropriate correction in the heading deviation table corresponding to a particular output of the heading sensor means 26 to correct a corresponding calibration coefficient stored on medium 14 and, thereby, provide the more accurate advancement of a given $DRP_o$ to a given $DRP_c$.

With reference to FIG. 35-2, assume that the vehicle V is traveling on a street $St_1$ and makes a right turn onto the street $St_2$. Assume also that after the turn onto the street $St_2$, the calculation of the $DRP_c$ places the vehicle V from position A to either position B, which is short of the street $St_2$, or to position B' which is beyond the street $St_2$. Also assume that as a result of the vehicle navigational algorithm, the $DRP_c$ at position B or position B' is updated to position C which happens to coincide with the actual location of the vehicle V.

The calibration of the distance sensor means 16 is checked after the vehicle V makes the turn onto the street $St_2$. When the vehicle navigational algorithm updates the $DRP_c$ to the $DRP_{cu}$ for the first time to position C after the turn is made, the calibration coefficient $C_D$ (see FIG. 10) of the distance sensor means 16 is increased or decreased, as follows. If the $DRP_c$ placed on the position of the vehicle V short of the street $St_2$ within a threshold, as shown at point B, the calibration coefficient $C_D$ is too low and, therefore, increased. If, however, the $DRP_c$ placed the vehicle V beyond the street $St_2$ within a threshold, as shown at B', the calibration coefficient $C_D$ is too high and, therefore, is decreased. As with other calibration data, the distance calibration coefficient $C_D$ is stored on the medium 14 and processed by the computer 12 to provide a more accurate DRP.

As was mentioned in relation to FIG. 5C-1, and discussed in relation to equations (5)-(12), the CEP may be enlarged at a varying rate as the $DRP_o$ is advanced to the $DRP_c$ as a function of the error variables $E_H$ and $E_D$. FIG. 36 is a flow chart of a subroutine for determining $E_H$ and $E_D$. First, the computer 12 calculates a change in heading from information received from the flux gate compass 28 shown in FIG. 2 (block 36A), as a $DRP_o$ is advanced to a $DRP_c$. Then, the computer 12 calculates the change in heading from information received from the differential wheel sensors 18 of FIG. 2 (block 36B) as the $DRP_o$ is advanced to the $DRP_c$.

Next, the computer 12 calculates an error $e_1$ based on the above calculations (block 36C), as will now be described in detail. As already indicated, heading measurements are obtained from two sources, one being the flux gate compass 28 and the other being the differential wheel sensors 18. The flux gate compass 28 measures the horizontal component of the terrestrial magnetic field and indicates the orientation of the vehicle V relative to magnetic north. The differential wheel sensors 18 measure the rotation of opposing wheels on the same axis of the vehicle V from which an angle A of turning may be calculated, as follows:

$$A = (D_R - D_L)/T \quad (27)$$

where $D_4$ is the distance traveled by the right wheel, $D_L$ is the distance traveled by the left wheel, and T is the track or distance between the right and left wheels. Equation 27 holds true for rear wheels and should be modified for front wheels.

Both sensor 28 and differential wheel sensors 18 are subject to measurement errors. The flux gate compass 28 will incorrectly indicate the orientation of the vehicle V if the terrestrial magnetic field is distorted (e.g., near large steel structures). Additionally, if the vehicle V is not on a level surface (e.g., driving on a hill), and the compass 28 is not gimbled, the compass 28 will incorrectly read due to magnetic dip error. If the compass 28 is gimbled, it will read incorrectly when the vehicle V accelerates and decelerates, again due to magnetic dip error. For these reasons, the compass 28 is not absolutely accurate.

The differential wheel sensors 18 are subject to errors because of wheel slip. If the vehicle V accelerates or decelerates too quickly, one or both of the wheels will slip and the measured distance will be incorrect, whereby the angle A will be incorrectly calculated. Additionally, if the vehicle V turns sharply or fast enough, the wheels will slip due to lateral acceleration and, thereby, incorrectly indicate the distance each wheel traveled. Finally, the point of contact of each wheel with the streets can change, making the track T different and, hence, introducing error.

Consequently, the computer 12 makes comparisons between the heading information from the compass 28 and from the differential wheel sensors 18 to determine how accurate the overall heading measurement is, i.e., to determine $e_1$. If both agree, i.e., $e_1=0$, the rate of growth of the CEP will not be affected by this factor. If, however, they disagree, i.e., $e_1>0$, then the CEP will grow at an increased rate, reflecting the apparently decreased accuracy of the heading measurement and, hence, of the knowledge of the actual location of the vehicle V.

With reference again to FIG. 36, having calculated $e_1$ (block 36C), the computer 12 now calculates an update performance error $e_2$, as follows (block 36D):

$$e_2 = K \cdot DR \text{ Performance Ratio} \qquad (28)$$

where K=constant, and the DR Performance Ratio (PR) is that described above (see block 29C).

Next, the computer 12 calculates $E_H$, as follows (block 36E):

$$E_H = \sqrt{e_1^2 + e_2^2 + e_3^2} \qquad (29)$$

where $e_1$ and $e_2$ are as defined above, and $e_3$ is a basic sensor accuracy of the flux gate compass 28, e.g., sin 4° 0.07.

Then, the computer 12 calculates $E_D$, as follows (block 36F):

$$E_D = \sqrt{e_2^2 + e_4^2} \qquad (30)$$

where $e_2$ is as defined above, and $e_4$ is the basic accuracy of the distance sensor means 16, e.g., 0.01.

Thus, the rate of growth of the CEP is dependent on one or more factors, including (1) the characteristics of the heading sensor data that indicate the quality of the sensor data, i.e., $e_1$, (2) the quality of the previous dead reckoning performance, i.e., $e_2$, (3) the basic sensor accuracy, i.e., $e_3$ and $e_4$, and (4) the distance $\Delta D$ traveled by the vehicle V, pursuant to equations (5)-(12).

X. Summary of the Vehicle Navigational Algorithm

As the vehicle V moves over streets St identified by the map M, a given DRP will be advanced and updated, and a given estimate of the accuracy of the DRP will change accordingly. As this updating occurs, the vehicle symbol $S_v$ on the monitor 38 will be moved relative to the displayed map M, so that the driver may see the current location of the vehicle V on or near a street St. Accordingly, the driver will then be able to navigate the vehicle V over the streets St to reach a desired destination. If, for example, the vehicle V were a police car or taxi cab, a communications network (not shown) also could be employed to send the position data of the vehicle V from the vehicle V to a central station for monitoring the current position of the vehicle V and other similar vehicles V coupled within such a network.

The present invention provides a technique that allows a vehicle V to be reliably and accurately navigated. This is accomplished through the maintenance, use and derivation of a significant amount of information, including the position of the vehicle V, the map data base, the estimate of the accuracy of the position of the vehicle V and the updating of the calibration data.

As a result, the present invention makes reasonable decisions as to whether to update a given $DRP_c$. For example, the present invention will not update to a street St that is so far away from a $DRP_c$ that it is not more probable that the vehicle V is on that street than off all the streets in the navigation neighborhood of the map data base. Conversely, an update will occur to a distant street St if it is computed to be more probable that the vehicle V is on that street. Furthermore, the vehicle M may move on and off streets St shown in the map M, such as onto driveways, parking lots and new streets St (paved or unpaved) that have not been included in the map M; yet, the vehicle navigational algorithm will accurately track the vehicle V due, in part, to the updating only to positions which are more probable.

XI. Program Code Listings

Assembly language code listings of significant aspects of the vehicle navigation algorithm, which may be executed on the IBM PC mentioned above, are included as part of this specification in the form of computer printout sheets. The title, operation and general content of these assembly language code listings are as follows:

1. NAV—This is the main navigation function which is called to test for and do the update.

2. DR—This calculates the dead reckoned positions and calls QEP CALC.

3. QEP CALC—This expands the contour of equal probability CEP (or QEP).

4. STRSRCH—This searches the map data base for streets and performs part of the multiparameter evaluation—particularly, this evaluates the heading parameter, called INQEP (see below), calls SFCONNECT (see below) and evaluates the closeness of two line segments S.

5. INQEP—This determines the intersection of a line segment S with the CEP.

6. SFCONNECT—This determines if two streets St are connected.

7. BCORCALC—This performs a binary search correlation calculation to evaluate the correlation parameter, including calling NPAM; MCBUF AND CORRELATE (see below)—if the vehicle V is turning, this also calculates $DRP_{cu}$.

8. NPAM—This finds a point on a segment S that is a specified distance away from a given point on some segment S where distance is measured along a specified sequence of segments S.

9. MCBUF—This performs map course buffering; particularly this calculates the DR heading and compares it with the street heading.

10. CORRELATE—This calculates the RMS error at the particular point determined by NPAM.

11. IPTDIST—This calculates the intersection of a line (extending from a point) perpendicular to another line and the distance from the intersection to the point.

12. QEPMOD—This updates CEP to $CEP_u$, and determines $DRP_{cu}$ if the vehicle is not turning.

13. UPDSTCAL—This updates the calibration coefficients for the distance sensor means 16.

14. DEVCORR—This updates the calibration coefficients for the heading sensor means 26.

While the invention has been particularly shown and described with reference to preferred embodiments thereof, it will be understood by those skilled in the art that the foregoing and other changes in form and detail may be made therein without departing from the spirit and scope of the invention.

```
@BIGMODEL        EQU       0
                 include   prologue.h
@CODE            ENDS
@DATAI           SEGMENT
                 dw        1
@DATAI           ENDS
@CODE            SEGMENT   BYTE PUBLIC 'CODE'
@CODE            ENDS
@DATAU           SEGMENT
                 db        16 DUP (?)

public    NAV
@DATAU           ENDS
@DATAB           SEGMENT
                 extrn     IDRPX:word extrn     IDRPY:word extrn     COMPASS:word extrn     DELTA:word extrn     ICOURSE:word extrn     TURN:word extrn     SIGHTDST:word extrn     MAPCOUR:word extrn     ONSTRTF:word extrn     NORM:word extrn     DISTCAL:word @DATAB           ENDS
@CODE            SEGMENT   BYTE PUBLIC 'CODE'
@CODE            ENDS
                 extrn     STRSRCH:near extrn     UPNORM:near extrn     BCORCALC:near extrn     QEP_MOD:near extrn     IATAN2:near extrn     UPDSTCAL:near extrn     DEVUPDT:near extrn     ROTUPDT:near extrn     CNTRUPDT:near @CODE            SEGMENT   BYTE PUBLIC 'CODE'
NAV              PROC      NEAR
.00:                                    ;35
                 push      BP
        mov      BP,SP
        sub      SP,14
        mov      AX,@IW or        AX,AX
                 je        .048
                 mov       AX,COMPASS
                 mov       @UW+4,AX
                 mov       AX,COMPASS
                 mov       @UW+8,AX
                 mov       AX,DELTA
                 mov       @UW+6,AX
                 mov       AX,DELTA
                 mov       @UW+10,AX
                 mov       AX,0
                 mov       @IW,AX
                 mov       @UW+12,AX
                 mov       @UW+14,AX
                 mov       DX,0
                 mov       @UW,AX
                 mov       @UW+2,DX
.048:                                   ;60
                 mov       AX,0
                 mov       -12[BP],AX
                 mov       ONSTRTF,AX
                 mov       AX,TURN
                 or        AX,AX
                 je        .0A4
                 cmp       WORD PTR @UW+12,0
                 jne       .087
                 mov       AX,1
                 mov       @UW+12,AX
                 push      WORD PTR @UW+2
                 push      WORD PTR @UW
                 push      WORD PTR @UW+8
                 push      WORD PTR @UW+10
                 push      WORD PTR @UW+4
                 push      WORD PTR @UW+6
                 call      UPNORM
                 add       SP,12
.087:                                   ;91
                 mov       AX,1
                 push      AX
                 call      STRSRCH
                 add       SP,2
                 cmp       AX,0
                 je        .099
                 call      BCORCALC
.099:                                   ;94
                 mov       AX,1
                 mov       @UW+14,AX
                 mov       SP,BP
                 pop       BP
                 ret
.0A4:                                   ;97
                 mov       AX,@UW+12
                 or        AX,AX
                 je        .0C8
                 mov       AX,1
                 mov       -12[BP],AX
                 mov       AL,0
                 mov       @UW+12,AX
                 mov       AX,DELTA
                 mov       @UW+10,AX
                 mov       AX,COMPASS
                 mov       @UW+8,AX
.0C8:                                   ;104
```

```
            mov     AX,0                                mov     AX,-10[BP]
            push    AX                                  sub     AX,ICOURSE
            call    STRSRCH                             cmp     AX,-16384
            add     SP,2                                jge     .01B4
            mov     -14[BP],AX                          jmp     SHORT .01C1
            cmp     AX,0                    5  .01B4:                       ;128
            jne     .0104
            mov     AX,0                                mov     AX,-10[BP]
            mov     -12[BP],AX                          sub     AX,ICOURSE
            mov     AX,DELTA                            cmp     AX,16384
            mov     @UW+6,AX                10 .01C1:   jle     .01CE
            mov     AX,COMPASS                                                  ;128
            mov     @UW+4,AX                            mov     AX,-10[BP]
            mov     AX,STGHTDST                         cwd
            mov     DX,STGHTDST+2                       add     AX,-32768
            mov     @UW,AX                              adc     DX,0
            mov     @UW+2,DX                            jmp     SHORT .01D2
            mov     SP,BP                   15 .01CE:                       ;128
            pop     BP                                  mov     AX,-10[BP]
            ret                                         cwd
.0104:                              ;110       .01D2:                       ;128
            mov     AX,IDRPX                            mov     MAPCOUR,AX
            mov     DX,IDRPX+2                          mov     AX,1
            mov     -8[BP],AX               20          mov     ONSTRIF,AX
            mov     -6[BP],DX                  .01DD:                       ;132
            mov     AX,IDRPY                            mov     AX,DELTA
            mov     DX,IDRPY+2                          mov     @UW+6,AX
            mov     -4[BP],AX                           mov     AX,COMPASS
            mov     -2[BP],DX               25          mov     @UW+4,AX
            push    WORD PTR -14[BP]                    mov     AX,STGHTDST
            call    QEP_MOD                             mov     DX,STGHTDST+2
            add     SP,2                                mov     @UW,AX
            or      AX,AX                               mov     @UW+2,DX
            jne     ?1                                  mov     AX,0
            jmp     .01DD                   30          mov     -12[BP],AX
?1:                                                     mov     SP,BP
            mov     SI,-14[BP]                          pop     BP
            mov     AX,+4[SI]                           ret
            mov     SI,-14[BP]                  NAV     ENDP
            sub     AX,[SI]
            push    AX                      35 @CODE   ENDS
            mov     SI,-14[BP]                  @CODE   SEGMENT BYTE PUBLIC 'CODE'
            mov     AX,+6[SI]                           include epilogue.h
            mov     SI,-14[BP]                          end
            sub     AX,+2[SI]
            push    AX                          @BIGMODEL       EQU     0
            call    IATAN2                  40          include prologue.h
            add     SP,4                        @CODE   ENDS
            mov     -10[BP],AX                  @DATAU  SEGMENT
            mov     AX,-12[BP]                          db      42 DUP (?)
            or      AX,AX
            je      .016F                   45          public  DR
            push    WORD PTR -2[BP]             @DATAU  ENDS
            push    WORD PTR -4[BP]             @DATAB  SEGMENT
            push    WORD PTR -6[BP]                     extrn   ICOURSE:word
            push    WORD PTR -8[BP]
            push    WORD PTR @UW+4          50          extrn   COMPASS:word
            call    UPDSTCAL
            add     SP,10                               extrn   IDRPX:word
.016F:                              ;120
            mov     AX,@UW+14                           extrn   IDRPY:word
            or      AX,AX
            je      .01A5                   55          extrn   IDISTX:word
            push    WORD PTR -10[BP]
            push    WORD PTR COMPASS                    extrn   IDISTY:word
            call    DEVUPDT
                                                        extrn   IDIST:word
            add     SP,4
            push    WORD PTR @[BP]                      extrn   IQEPX:word
            push    WORD PTR COMPASS        60
            call    RQTUPDT                             extrn   IQEPY:word
            add     SP,4
            push    WORD PTR -10[BP]                    extrn   PERP_ER:word
            push    WORD PTR COMPASS
            call    CNTRUPDT                            extrn   MAPCOUR:word
            add     SP,4                    65
            mov     AX,0                                extrn   ONSTRIF:word
            mov     @UW+14,AX
.01A5:                              ;126                extrn   COUR_TC:word
```

```
        extrn   DELTA:word                              lea     SI,@UW+18
                                                        mov     [SI],AX
        extrn   INITDR:word                             mov     AX,COMPASS
                                                        lea     SI,@UW+28
        extrn   TURN:word                       5       mov     [SI],AX
                                                        lea     SI,@UW+26
        extrn   STGHTDST:word                           mov     [SI],AX
                                                        lea     SI,@UW+24
        extrn   COURDIFF:word                           mov     [SI],AX
                                                        mov     AX,0
@DATAB  ENDS                                            mov     @UW+32,AX
@CODE   SEGMENT BYTE PUBLIC 'CODE'      10              mov     @UW+30,AX
@CODE   ENDS                                            mov     AX,-16[BP]
        extrn   COUR_MOD:near                           mov     @UW,AX
                                                        mov     AX,-14[BP]
        extrn   LABS:near                               mov     @UW+2,AX
                                                        mov     AX,COMPASS
        extrn   WCFLTR:near             15              mov     @UW+4,AX
                                                        mov     AX,3393
        extrn   RDSENSOR:near                           mov     DX,3
                                                        mov     @UW+36,AX
        extrn   DRCALC:near                             mov     @UW+38,DX
                                        20              mov     AX,0
        extrn   SDEV:near                               mov     DX,0
                                                        mov     STGHTDST,AX
        extrn   ICOS:near                               mov     STGHTDST+2,DX
                                                        mov     AX,COMPASS
        extrn   ISIN:near                       25      mov     @UW+40,AX
                                                        mov     AX,0
        extrn   ISORT:near                              mov     TURN,AX
                                                .0CS:                           ;114
        extrn   QEP_CALC:near                           lea     SI,IDIST
                                                        push    SI
        extrn   @ABS:near                               lea     SI,-22[BP]
                                        30              push    SI
@CODE   SEGMENT BYTE PUBLIC 'CODE'                      mov     AX,-16[BP]
DR      PROC    NEAR                                    sub     AX,@UW
@CODE   ENDS                                            push    AX
        extrn   $LRSSHIFT:near                          mov     AX,-14[BP]
                                                        sub     AX,@UW+2
        extrn   $LMUL:near              35              push    AX
                                                        call    DRCALC
        extrn   $LLSHIFT:near                           add     SP,8
                                                        mov     AX,IDIST
@CODE   SEGMENT BYTE PUBLIC 'CODE'                      mov     DX,IDIST+2
.00:                            ;48                     mov     BX,@UW+36
        push    BP                      40              mov     CX,@UW+38
        mov     BP,SP                                   add     BX,AX
        sub     SP,24                                   adc     CX,DX
        lea     SI,-14[BP]                              mov     @UW+36,BX
        push    SI                                      mov     @UW+38,CX
        lea     SI,-16[BP]              45              mov     AX,COMPASS
        push    SI                                      sub     AX,@UW+4
        lea     SI,COMPASS                              mov     -24[BP],AX
        push    SI                                      mov     AX,-22[BP]
        call    RDSENSOR                                add     @UW+6,AX
        add     SP,6                                    mov     AX,COMPASS
        mov     AX,INITDR               50              sub     AX,@UW+6
        or      AX,AX                                   mov     DELTA,AX
        jne     ?1                                      mov     AX,@UW+36
        jmp     .0CS                                    mov     DX,@UW+38
?1:                                                     cmp     DX,3
        mov     AX,COMPASS                              jge     ?2
        mov     @UW+6,AX                55              jmp     .021A
        mov     AX,0                            ?2:
        mov     DELTA,AX                                jne     .0139
        mov     @UW+8,AX                                cmp     AX,3392
        mov     INITDR,AX                               ja      ?3
        lea     SI,@UW+16                               jmp     .021A
        mov     [SI],AX                 60      ?3:
        lea     SI,@UW+14                       .0139:                          ;123
        mov     [SI],AX                                 mov     AX,0
        lea     SI,@UW+12                               mov     DX,0
        mov     [SI],AX                                 mov     @UW+36,AX
        mov     AX,@UW+6                65              mov     @UW+38,DX
        lea     SI,@UW+22                               mov     AX,3
        mov     [SI],AX                                 push    AX
        lea     SI,@UW+20                               inc     WORD PTR @UW+30
        mov     [SI],AX                                 mov     AX,@UW+30
```

```
              pop     BX                              call    $LRSSHIFT
              cwd                                     pop     AX
              idiv    BX                              pop     DX
              mov     @UW+30,DX                       mov     @UW+34,AX
              mov     AX,DELTA              .021A:                    ;149
              lea     SI,@UW+12                       push    WORD PTR @UW+34
              mov     DX,@UW+30                       push    WORD PTR @UW+8
              shl     DX,1                            push    WORD PTR DELTA
              add     SI,DX                           call    COUR_MOD
              mov     [SI],AX                         add     SP,6
              mov     AX,@UW+6                        mov     @UW+8,AX
              lea     SI,@UW+18                       mov     AX,@UW+8
              mov     DX,@UW+30                       add     AX,@UW+6
              shl     DX,1                            mov     ICOURSE,AX
              add     SI,DX                           mov     AX,ICOURSE
              mov     [SI],AX                         mov     DX,ICOURSE
              mov     AX,COMPASS                      sub     DX,@UW+10
              lea     SI,@UW+24                       mov     BX,1
              mov     DX,@UW+30                       mov     CX,BX
              shl     DX,1                            sar     DX,CL
              add     SI,DX                           sub     AX,DX
              mov     [SI],AX                         mov     -20[BP],AX
              mov     AX,@UW+32                       push    WORD PTR -20[BP]
              or      AX,AX                           call    ICOS
              je      .01A0                           add     SP,2
              dec     WORD PTR @UW+32                 mov     DX,4
              jmp     .021A                           mov     CX,DX
.01A0:                            ;135                sar     AX,CL
              lea     AX,@UW+12                       cwd
              push    AX                              push    DX
              call    SDEV                            push    AX
              add     SP,2                            mov     AX,IDIST
              cmp     AX,728                          mov     DX,IDIST+2
              jle     .01FF                           push    DX
              mov     AX,3                            push    AX
              mov     @UW+32,AX                       mov     AX,5
              lea     AX,@UW+24                       mov     DX,0
              push    AX                              push    DX
              call    SDEV                            push    AX
              add     SP,2                            call    $LRSSHIFT
              push    AX                              pop     AX
              lea     AX,@UW+18                       pop     DX
              push    AX                              push    DX
              call    SDEV                            push    AX
              add     SP,2                            call    $LMUL
              pop     DX                              pop     AX
              cmp     AX,DX                           pop     DX
              jge     .01ED                           push    DX
              mov     AX,IDIST                        push    AX
              mov     DX,IDIST+2                      mov     AX,6
              push    DX                              mov     DX,0
              push    AX                              push    DX
              mov     AX,18                           push    AX
              mov     DX,0                            call    $LRSSHIFT
              push    DX                              pop     AX
              push    AX                              pop     DX
              call    $LRSSHIFT                       mov     IDISTx,AX
              pop     AX                              mov     IDISTx+2,DX
              pop     DX                              push    WORD PTR -20[BP]
              jmp     SHORT .01F9                     call    ISIN
.01ED:                            ;140                add     SP,2
              mov     AX,COUR_TC                      mov     DX,4
              mov     DX,3                            mov     CX,DX
              mov     CX,DX                           sar     AX,CL
              shl     AX,CL                           cwd
              cwd                                     push    DX
                                                      push    AX
.01F9:                                                mov     AX,IDIST
              mov     @UW+34,AX                       mov     DX,IDIST+2
              jmp     SHORT .021A                     push    DX
.01FF:                            ;142                push    AX
              mov     AX,IDIST                        mov     AX,5
              mov     DX,IDIST+2                      mov     DX,0
              push    DX                              push    DX
              push    AX                              push    AX
              mov     AX,16                           call    $LRSSHIFT
              mov     DX,0                            pop     AX
              push    DX                              pop     DX
              push    AX                              push    DX
```

```
        push    AX
        call    $LMUL
        pop     AX
        pop     DX
        push    DX
        push    AX
        mov     AX,6
        mov     DX,0
        push    DX
        push    AX
        call    $LRSSHIFT
        pop     AX
        pop     DX
        mov     IDISTY,AX
        mov     IDISTY+2,DX
        mov     AX,IDISTX
        mov     DX,IDISTX+2
        mov     BX,IDRPX
        mov     CX,IDRPX+2
        add     BX,AX
        adc     CX,DX
        mov     IDRPX,BX
        mov     IDRPX+2,CX
        mov     AX,IDISTY
        mov     DX,IDISTY+2
        mov     BX,IDRPY
        mov     CX,IDRPY+2
        add     BX,AX
        adc     CX,DX
        mov     IDRPY,BX
        mov     IDRPY+2,CX
        mov     AX,PERP_ER
        mov     DX,PERP_ER+2
        mov     -12[BP],AX
        mov     -10[BP],DX
        push    WORD PTR IDIST+2
        push    WORD PTR IDIST
        push    WORD PTR DELTA
        call    WCFLTR
        add     SP,6
        push    DX
        push    AX
        mov     AX,16
        mov     DX,0
        push    DX
        push    AX
        call    $LRSSHIFT
        pop     AX
        pop     DX
        mov     -8[BP],AX
        mov     -6[BP],DX
        mov     AX,PERP_ER
        mov     DX,PERP_ER+2
        push    DX
        push    AX
        mov     AX,16
        mov     DX,0
        push    DX
        push    AX
        call    $LRSSHIFT
        pop     AX
        pop     DX
        mov     -4[BP],AX
        mov     -2[BP],DX
        push    WORD PTR -6[BP]
        push    WORD PTR -8[BP]
        push    WORD PTR -6[BP]
        push    WORD PTR -8[BP]
        call    $LMUL
        pop     AX
        pop     DX
        push    WORD PTR -2[BP]
        push    WORD PTR -4[BP]
        push    WORD PTR -2[BP]
        push    WORD PTR -4[BP]
        call    $LMUL
        pop     BX
        pop     CX
        add     AX,BX adc     DX,CX
        push    DX
        push    AX
        call    ISQRT
        add     SP,4
        cwd
        push    DX
        push    AX
        mov     AX,16
        mov     DX,0
        push    DX
        push    AX
        call    $LLSHIFT
        pop     AX
        pop     DX
        mov     PERP_ER,AX
        mov     PERP_ER+2,DX
        call    QEP_CALC
        mov     AX,-12[BP]
        mov     DX,-10[BP]
        mov     PERP_ER,AX
        mov     PERP_ER+2,DX
        push    WORD PTR IDIST+2
        push    WORD PTR IDIST
        call    LABS
        add     SP,4
        mov     BX,STGHTDST
        mov     CX,STGHTDST+2
        add     BX,AX
        adc     CX,DX
        mov     STGHTDST,BX
        mov     STGHTDST+2,CX
        mov     AX,ICOURSE
        sub     AX,@UW+40
        push    AX
        call    @ABS
        add     SP,2
        cmp     AX,COURDIFF
        jge     .042F
        mov     AX,20
        cwd
        push    DX
        push    AX
        mov     AX,16
        mov     DX,0
        push    DX
        push    AX
        call    $LLSHIFT
        pop     AX
        pop     DX
        cmp     DX,STGHTDST+2
        ja      .0426
        jne     .041D
        cmp     AX,STGHTDST
        jae     .0426
.041D:
                                ;172
        mov     AX,0
        mov     TURN,AX
        jmp     SHORT .042D
.0426:
                                ;172
        mov     AX,1
        mov     TURN,AX
.042D:
                                ;172
        jmp     SHORT .044C
.042F:
                                ;173
        mov     AX,ICOURSE
        mov     @UW+40,AX
        mov     AX,0
        mov     DX,0
        mov     STGHTDST,AX
        mov     STGHTDST+2,DX
        mov     AX,1
        mov     TURN,AX
.044C:
                                ;177
        mov     AX,-16[BP]
        mov     @UW,AX
        mov     AX,-14[BP]
        mov     @UW+2,AX
        mov     AX,COMPASS
```

```
            mov     @UW+4,AX
            mov     AX,ICOURSE
            mov     @UW+10,AX
            mov     SP,BP
            pop     BP
            ret
DR          ENDP @CODE       ENDS
@CODE       SEGMENT BYTE PUBLIC 'CODE'
            include epilogue.h
            end @BIGMODEL       EQU     0
            include prologue.h
@CODE       ENDS
@DATAC      SEGMENT
            db      101,114,114,111,114,32,105,110,32,102
            db      117,110,99,116,105,111,110,32,113,101,112,99,97,108,99,0 db      101,114,114,111,114,32,105,110,32,113
            db      101,112,99,97,108,99,32,32,115,119,105,116,99,104,32,0

@DATAC      ENDS
@CODE       SEGMENT BYTE PUBLIC 'CODE' public  QEPCALC
@CODE       ENDS
@DATAB      SEGMENT
            extrn   QEPX:word extrn   QEPY:word extrn   IQEPX:word extrn   IQEPY:word extrn   DRPX:word extrn   DRPY:word extrn   PERP_ER:word extrn   PARL_ER:word extrn   DISTX:word extrn   DISTY:word @DATAB      ENDS
@CODE       SEGMENT BYTE PUBLIC 'CODE'
@CODE       ENDS
            extrn   PUTS:near @CODE       SEGMENT BYTE PUBLIC 'CODE'
QEPCALC     PROC    NEAR
@CODE       ENDS
            extrn   $DLOAD:near extrn   $DCVTL:near extrn   $DCEQ:near extrn   $DMUL:near extrn   $DSUB:near extrn   $DSTORE:near @DATAI      SEGMENT
            dw      0,0,0,0
            dw      0,0,0,0
@DATAI      ENDS
            extrn   $DCGE:near
```

```
        extrn   $DCLE:near
@DATAI  SEGMENT
        dw      0,0,0,0
        dw      0,0,0,0
@DATAI  ENDS
        extrn   $DADD:near extrn   $DNEG:near extrn   $ISWITCH:near extrn   $LCVTD:near @CODE   SEGMENT BYTE PUBLIC 'CODE'
.00:                    ;16
        push    BP
        mov     BP,SP
        sub     SP,46
        lea     AX,DISTX
        push    AX
        call    $DLOAD
        mov     AX,0
        cwd
        push    DX
        push    AX
        call    $DCVTL
        call    $DCEQ
        pop     AX
        or      AX,AX
        je      .03C
        lea     AX,DISTY
        push    AX
        call    $DLOAD
        mov     AX,0
        cwd
        push    DX
        push    AX
        call    $DCVTL
        call    $DCEQ
        pop     AX
        or      AX,AX
        je      .03C
        mov     SP,BP
        pop     BP
        ret
.03C:                   ;38
        mov     AX,0
        mov     -4[BP],AX
.042:                   ;38
        cmp     WORD PTR -4[BP],4
        jge     .0A2
        lea     AX,DISTX
        push    AX
        call    $DLOAD
        lea     SI,QEPY
        mov     AX,-4[BP]
        shl     AX,1
        shl     AX,1
        shl     AX,1
        add     SI,AX
        push    SI
        call    $DLOAD
        call    $DMUL
        lea     AX,DISTY
        push    AX
        call    $DLOAD
        lea     SI,QEPX
        mov     AX,-4[BP]
        shl     AX,1
        shl     AX,1
        shl     AX,1
        add     SI,AX
        push    SI
        call    $DLOAD
        call    $DMUL
        call    $DSUB
        lea     SI,-46[BP]
        mov     AX,-4[BP]
        shl     AX,1
        shl     AX,1
        shl     AX,1
        add     SI,AX
        push    SI
        call    $DSTORE
        add     SP,8
.09D:                   ;39
        inc     WORD PTR -4[BP]
        jmp     SHORT .042
.0A2:                   ;39
        mov     AX,4
        mov     -2[BP],AX
        lea     SI,-22[BP]
        push    SI
        call    $DLOAD
        lea     AX,@IW
        push    AX
        call    $DLOAD
        call    $DCGR
        pop     AX
        or      AX,AX
        je      .0DE
        lea     SI,-46[BP]
        push    SI
        call    $DLOAD
        lea     AX,@IW+8
        push    AX
        call    $DLOAD
        call    $DCLE
        pop     AX
        or      AX,AX
        je      .0DE
        mov     AX,0
        mov     -2[BP],AX
        jmp     SHORT .0140
.0DE:                   ;43
        mov     AX,0
        mov     -4[BP],AX
.0E4:                   ;44
        cmp     WORD PTR -4[BP],3
        jge     .0140
        lea     SI,-46[BP]
        mov     AX,-4[BP]
        shl     AX,1
        shl     AX,1
        shl     AX,1
        add     SI,AX
        push    SI
        call    $DLOAD
        lea     AX,@IW+16
        push    AX
        push    AX
        call    $DLOAD
        call    $DCGR
        pop     AX
        or      AX,AX
        je      .013B
        lea     SI,-46[BP]
        mov     AX,-4[BP]
        add     AX,1
        shl     AX,1
        shl     AX,1
        shl     AX,1
        add     SI,AX
        push    SI
        call    $DLOAD
        lea     AX,@IW+24
        push    AX
        call    $DLOAD
        call    $DCLE
        pop     AX
        or      AX,AX
        je      .013B
        mov     AX,-4[BP]
        add     AX,1
        mov     -2[BP],AX
.013B:                  ;47
        inc     WORD PTR -4[BP]
        jmp     SHORT .0E4
```

```
.0140:                  ;48
        cmp     WORD PTR -2[BP],4
        jne     .0158
        mov     AX,0
        mov     -2[BP],AX
        lea     AX,@SW
        push    AX
        call    PUTS
        add     SP,2
.0158:                  ;59
        mov     AX,-2[BP]
        mov     -4[BP],AX
        mov     AX,0
        mov     -6[BP],AX
.0164:                  ;59
        cmp     WORD PTR -4[BP],4
        jge     .0182
        mov     AX,-6[BP]
        lea     SI,-14[BP]
        mov     DX,-4[BP]
        shl     DX,1
        add     SI,DX
        mov     [SI],AX
.017A:                  ;59
        inc     WORD PTR -4[BP]
        inc     WORD PTR -6[BP]
        jmp     SHORT .0164
.0182:                  ;59
        mov     AX,0
        mov     -4[BP],AX
.0188:                  ;60
        mov     AX,-4[BP]
        cmp     AX,-2[BP]
        jge     .01A7
        mov     AX,-6[BP]
        lea     SI,-14[BP]
        mov     DX,-4[BP]
        shl     DX,1
        add     SI,DX
        mov     [SI],AX
.019F:                  ;60
        inc     WORD PTR -4[BP]
        inc     WORD PTR -6[BP]
        jmp     SHORT .0188
.01A7:                  ;60
        mov     AX,0
        mov     -4[BP],AX
.01AD:                  ;65
        cmp     WORD PTR -4[BP],4
        jl      ?1
        jmp     .04A8
?1:
        lea     SI,-14[BP]
        mov     AX,-4[BP]
        shl     AX,1
        add     SI,AX
        mov     AX,[SI]
        push    AX
        jmp     .041B
.01C7:                  ;67
        lea     AX,PARL_ER
        push    AX
        call    $DLOAD
        lea     AX,DISTX
        push    AX
        call    $DLOAD
        call    $DMUL
        lea     AX,PERP_ER
        push    AX
        call    $DLOAD
        lea     AX,DISTY
        push    AX
        call    $DLOAD
        call    $DMUL
        call    $DADD
        lea     SI,QEPX
        mov     AX,-4[BP]
        shl     AX,1
        shl     AX,1
        shl     AX,1
        add     SI,AX
        push    SI
        call    $DLOAD
        call    $DADD
        push    SI
        call    $DSTORE
        add     SP,8
        lea     AX,PARL_ER
        push    AX
        call    $DLOAD
        lea     AX,DISTY
        push    AX
        call    $DLOAD
        call    $DMUL
        lea     AX,PERP_ER
        push    AX
        call    $DLOAD
        lea     AX,DISTX
        push    AX
        call    $DLOAD
        call    $DMUL
        call    $DSUB
        lea     SI,QEPY
        mov     AX,-4[BP]
        shl     AX,1
        shl     AX,1
        shl     AX,1
        add     SI,AX
        push    SI
        call    $DLOAD
        call    $DADD
        push    SI
        call    $DSTORE
        add     SP,8
        jmp     .0432
.0256:                  ;71
        lea     AX,DISTX
        push    AX
        call    $DLOAD
        lea     AX,PARL_ER
        push    AX
        call    $DLOAD
        call    $DNEG
        call    $DMUL
        lea     AX,PERP_ER
        push    AX
        call    $DLOAD
        lea     AX,DISTY
        push    AX
        call    $DLOAD
        call    $DMUL
        call    $DADD
        lea     SI,QEPX
        mov     AX,-4[BP]
        shl     AX,1
        shl     AX,1
        shl     AX,1
        add     SI,AX
        push    SI
        call    $DLOAD
        call    $DADD
        push    SI
        call    $DSTORE
        add     SP,8
        lea     AX,DISTY
        push    AX
        call    $DLOAD
        lea     AX,PARL_ER
        push    AX
        call    $DLOAD
        call    $DNEG
        call    $DMUL
        lea     AX,PERP_ER
        push    AX
        call    $DLOAD
        lea     AX,DISTX
```

```
            push    AX
            call    $DLOAD
            call    $DMUL
            call    $DSUB
            lea     SI,QEPY
            mov     AX,-4[BP]
            shl     AX,1
            shl     AX,1
            shl     AX,1
            add     SI,AX
            push    SI
            call    $DLOAD
            call    $DADD
            push    SI
            call    $DSTORE
            add     SP,8
            jmp     .0432
.02EB:                      ;75
            lea     AX,DISTX
            push    AX
            call    $DLOAD
            lea     AX,PARL_ER
            push    AX
            call    $DLOAD
            call    $DNEG
            call    $DMUL
            lea     AX,PERP_ER
            push    AX
            call    $DLOAD
            lea     AX,DISTY
            push    AX
            call    $DLOAD
            call    $DMUL
            call    $DSUB
            lea     SI,QEPX
            mov     AX,-4[BP]
            shl     AX,1
            shl     AX,1
            shl     AX,1
            add     SI,AX
            push    SI
            call    $DLOAD
            call    $DADD
            push    SI
            call    $DSTORE
            add     SP,8
            lea     AX,DISTY
            push    AX
            call    $DLOAD
            lea     AX,PARL_ER
            push    AX
            call    $DLOAD
            call    $DNEG
            call    $DMUL
            lea     AX,PERP_ER
            push    AX
            call    $DLOAD
            lea     AX,DISTX
            push    AX
            call    $DLOAD
            call    $DMUL
            call    $DADD
            lea     SI,QEPY
            mov     AX,-4[BP]
            shl     AX,1
            shl     AX,1
            shl     AX,1
            add     SI,AX
            push    SI
            call    $DLOAD
            call    $DADD
            push    SI
            call    $DSTORE
            add     SP,8
            jmp     .0432
.0380:                      ;79
            lea     AX,PARL_ER
            push    AX
            call    $DLOAD
            lea     AX,DISTX
            push    AX
            call    $DLOAD
            call    $DMUL
            lea     AX,PERP_ER
            push    AX
            call    $DLOAD
            lea     AX,DISTY
            push    AX
            call    $DLOAD
            call    $DMUL
            call    $DSUB
            lea     SI,QEPX
            mov     AX,-4[BP]
            shl     AX,1
            shl     AX,1
            shl     AX,1
            add     SI,AX
            push    SI
            call    $DLOAD
            call    $DADD
            push    SI
            call    $DSTORE
            add     SP,8
            lea     AX,PARL_ER
            push    AX
            call    $DLOAD
            lea     AX,DISTY
            push    AX
            call    $DLOAD
            call    $DMUL
            lea     AX,PERP_ER
            push    AX
            call    $DLOAD
            lea     AX,DISTX
            push    AX
            call    $DLOAD
            call    $DMUL
            call    $DADD
            lea     SI,QEPY
            mov     AX,-4[BP]
            shl     AX,1
            shl     AX,1
            shl     AX,1
            add     SI,AX
            push    SI
            call    $DLOAD
            call    $DADD
            push    SI
            call    $DSTORE
            add     SP,8
            jmp     SHORT .0432
.040E:                      ;83
            lea     AX,@SW+26
            push    AX
            call    PUTS
            add     SP,2
            jmp     SHORT .0432
.041B:                      ;85
            call    $ISWITCH
            dw      4
            dw      3
            dw      2
            dw      1
            dw      0
            dw      .040E
            dw      .0380
            dw      02FB
            dw      .0256
            dw      .01C7
.0432:                      ;85
            mov     AX,0
            mov     DX,1
            push    DX
            push    AX
            call    $DCVTL
            lea     SI,QEPX
            mov     AX,-4[BP]
```

```
            shl     AX,1
            shl     AX,1
            shl     AX,1
            add     SI,AX
            push    SI
            call    $DLOAD
            call    $DMUL
            call    $LCVTD
            pop     AX
            pop     DX
            lea     SI,IQEPX
            mov     BX,-4[BP]
            shl     BX,1
            shl     BX,1
            add     SI,BX
            mov     [SI],AX
            mov     +2[SI],DX
            mov     AX,0
            mov     DX,1
            push    DX
            push    AX
            call    $DCVTL
            lea     SI,QEPY
            mov     AX,-4[BP]
            shl     AX,1
            shl     AX,1
            shl     AX,1
            add     SI,AX
            push    SI
            call    $DLOAD
            call    $DMUL
            call    $LCVTD
            pop     AX
            pop     DX
            lea     SI,IQEPY
            mov     BX,-4[BP]
            shl     BX,1
            shl     BX,1
            add     SI,BX
            mov     [SI],AX
            mov     +2[SI],DX
.04A2:                              ;88
            inc     WORD PTR -4[BP]
            jmp     .01AD
.04A8:                              ;88
            mov     SP,BP
            pop     BP
            ret
QEPCALC     ENDP @CODE       ENDS
@CODE       SEGMENT BYTE PUBLIC 'CODE'
            include epiloque.h
            end
@BIGMODEL   EQU     0
            include proloque.h
@CODE       ENDS
@DATAI      SEGMENT
            dw      0
@DATAI      ENDS
@CODE       SEGMENT BYTE PUBLIC 'CODE'
@CODE       ENDS
@DATAU      SEGMENT
            db      16 DUP (?)

ORG     0
X_MIN       LABEL   WORD public  X_MIN
            ORG     2
X_MAX       LABEL   WORD public  X_MAX
            ORG     4
Y_MIN       LABEL   WORD public  Y_MIN
            ORG     6

Y_MAX       LABEL   WORD public  Y_MAX
            public  STRSRCH
@DATAU      ENDS
@DATAB      SEGMENT
            extrn   IQEPX:word
            extrn   IQEPY:word
            extrn   IDRPX:word
            extrn   IDRPY:word
            extrn   ICOURSE:word
            extrn   MXDEVDIR:word
            extrn   STRPTR:word
            extrn   STRDAT:word
            extrn   STRCOOR:word
            extrn   LANECOOR:word @DATAB      ENDS
@CODE       SEGMENT BYTE PUBLIC 'CODE'
@CODE       ENDS
            extrn   PRIORITY:near
            extrn   INQEP:near
            extrn   IFTDIST:near
            extrn   IATAN2:near
            extrn   DOTPROD:near
            extrn   CVSTTSF:near
            extrn   SFADD:near
            extrn   CLIP:near
            extrn   RTLANE:near
            extrn   CLOSTPT:near
            extrn   SFINCLSV:near
            extrn   SFCONECT:near
            extrn   CVSFTSI:near
@CODE       SEGMENT BYTE PUBLIC 'CODE'
STRSRCH     PROC    NEAR
@CODE       ENDS
            extrn   $LRSSHIFT:near @CODE       SEGMENT BYTE PUBLIC 'CODE'
.00:                                ;61
            push    BP
            mov     BP,SP
            sub     SP,122
            mov     AX,0
            mov     -76[BP],AX
            mov     -78[BP],AX
            mov     -80[BP],AX
            mov     AL,1
            mov     -86[BP],AX
            mov     AX,32766
            mov     -48[BP],AX
            mov     -50[BP],AX
            mov     AX,0
            mov     STRDAT,AX
            mov     STRCOOR,AX
            lea     AX,LANECOOR
```

```
        mov     -96[BP],AX
        lea     AX,-122[BP]
        mov     -106[BP],AX
        lea     AX,-114[BP]
        mov     -104[BP],AX
        mov     AX,STRPTR
        mov     -30[BP],AX
        mov     AX,32766
        mov     @UW+4,AX
        mov     @UW,AX
        mov     -64[BP],AX
        mov     -66[BP],AX
        mov     AX,-32766
        mov     @UW+6,AX
        mov     @UW+2,AX
        mov     -60[BP],AX
        mov     -62[BP],AX
        mov     AX,0
        mov     -84[BP],AX
.06D:                   ;142
        cmp     WORD PTR -84[BP],4
        jge     .0E1
        lea     SI,[@EPX
        mov     AX,-84[BP]
        shl     AX,1
        shl     AX,1
        add     SI,AX
        mov     AX,[SI]
        mov     DX,+2[SI]
        add     AX,-32768
        adc     DX,0
        push    DX
        push    AX
        mov     AX,16
        mov     DX,0
        push    DX
        push    AX
        call    $LRSSHIFT
        pop     AX
        pop     DX
        lea     SI,-28[BP]
        mov     BX,-84[BP]
        shl     BX,1
        add     SI,BX
        mov     [SI],AX
        lea     SI,[@EPY
        mov     AX,-84[BP]
        shl     AX,1
        shl     AX,1
        add     SI,AX
        mov     AX,[SI]
        mov     DX,+2[SI]
        add     AX,-32768
        adc     DX,0
        push    DX
        push    AX
        mov     AX,16
        mov     DX,0
        push    DX
        push    AX
        call    $LRSSHIFT
        pop     AX
        pop     DX
        lea     SI,-20[BP]
        mov     BX,-84[BP]
        shl     BX,1
        add     SI,BX
        mov     [SI],AX
.00C:                   ;145
        inc     WORD PTR -84[BP]
        jmp     SHORT .06D
.0E1:                   ;145
        mov     AX,IDRPX
        mov     DX,IDRPX+2
        add     AX,-32768
        adc     DX,0
        push    DX
        push    AX
        mov     AX,16
        mov     DX,0
        push    DX
        push    AX
        call    $LRSSHIFT
        pop     AX
        pop     DX
        mov     -12[BP],AX
        mov     AX,IDRPY
        mov     DX,IDRPY+2
        add     AX,-32768
        adc     DX,0
        push    DX
        push    AX
        mov     AX,16
        mov     DX,0
        push    DX
        push    AX
        call    $LRSSHIFT
        pop     AX
        pop     DX
        mov     -10[BP],AX
        mov     AX,0
        mov     -84[BP],AX
.0129:                  ;149
        cmp     WORD PTR -84[BP],4
        jl      ?1
        jmp     .01C1
?1:
        lea     SI,-28[BP]
        mov     AX,-84[BP]
        shl     AX,1
        add     SI,AX
        mov     AX,[SI]
        cmp     AX,@UW
        jge     .0155
        lea     SI,-28[BP]
        mov     AX,-84[BP]
        shl     AX,1
        add     SI,AX
        mov     AX,[SI]
        mov     @UW,AX
.0155:                  ;152
        lea     SI,-20[BP]
        mov     AX,-84[BP]
        shl     AX,1
        add     SI,AX
        mov     AX,[SI]
        cmp     AX,@UW+4
        jge     .0177
        lea     SI,-20[BP]
        mov     AX,-84[BP]
        shl     AX,1
        add     SI,AX
        mov     AX,[SI]
        mov     @UW+4,AX
.0177:                  ;154
        lea     SI,-28[BP]
        mov     AX,-84[BP]
        shl     AX,1
        add     SI,AX
        mov     AX,[SI]
        cmp     AX,@UW+2
        jle     .0199
        lea     SI,-28[BP]
        mov     AX,-84[BP]
        shl     AX,1
        add     SI,AX
        mov     AX,[SI]
        mov     @UW+2,AX
.0199:                  ;156
        lea     SI,-20[BP]
        mov     AX,-84[BP]
        shl     AX,1
        add     SI,AX
        mov     AX,[SI]
        cmp     AX,@UW+6
        jle     .01BB
```

```
            lea     SI,-20[BP]
            mov     AX,84[BP]
            shl     AX,1
            add     SI,AX
            mov     AX,[SI]
            mov     @UW+6,AX
.01BB:                      ;158
            inc     WORD PTR -84[BP]
            jmp     .0129
.01C1:                      ;158
            mov     AX,-12[BP]
            sub     AX,20
            mov     DX,@UW
            add     DX,AX
            mov     @UW,DX
            mov     AX,-10[BP]
            sub     AX,20
            mov     DX,@UW+4
            add     DX,AX
            mov     @UW+4,DX
            mov     AX,-12[BP]
            add     AX,20
            mov     DX,@UW+2
            add     DX,AX
            mov     @UW+2,DX
            mov     AX,-10[BP]
            add     AX,20
            mov     DX,@UW+6
            add     DX,AX
            mov     @UW+6,DX
            mov     AX,@IW
            or      AX,AX
            je      .0247
            mov     SI,@IW
            mov     AX,[SI]
            sub     AX,-12[BP]
            mov     SI,-106[BP]
            mov     [SI],AX
            mov     SI,@IW
            mov     AX,+4[SI]
            sub     AX,-12[BP]
            mov     SI,-106[BP]
            mov     +4[SI],AX
            mov     SI,@IW
            mov     AX,+2[SI]
            sub     AX,-10[BP]
            mov     SI,-106[BP]
            mov     +2[SI],AX
            mov     SI,@IW
            mov     AX,+6[SI]
            sub     AX,-10[BP]
            mov     SI,-106[BP]
            mov     +6[SI],AX
.0247:                      ;173
            mov     SI,-30[BP]
            add     WORD PTR -30[BP],2
            mov     AX,[SI]
            mov     -94[BP],AX
            or      AX,AX
            jne     ?2
            jmp     .0693
?2:
            mov     SI,-94[BP]
            mov     SI,+2[SI]
            mov     -88[BP],SI
            mov     AX,0
            mov     -82[BP],AX
.026A:                      ;9
            mov     SI,-94[BP]
            mov     AL,[SI]
            cbw
            sub     AX,1
            cmp     AX,-82[BP]
            jg      ?3
            jmp     .0690
?3:
            mov     AX,-88[BP]
            mov     -102[BP],AX
```

```
            mov     SI,-102[BP]
            mov     AX,[SI]
            mov     -74[BP],AX
            mov     SI,-102[BP]
            mov     AX,+4[SI]
            mov     -72[BP],AX
            mov     SI,-102[BP]
            mov     AX,+2[SI]
            mov     -70[BP],AX
            mov     SI,-102[BP]
            mov     AX,+6[SI]
            mov     -68[BP],AX
            lea     SI,-68[BP]
            push    SI
            lea     SI,-72[BP]
            push    SI
            lea     SI,-70[BP]
            push    SI
            lea     SI,-74[BP]
            push    SI
            call    CLIP
            add     SP,8
            cmp     AX,0
            jne     .02C2
            jmp     .0685
.02C2:                      ;186
            mov     SI,-102[BP]
            mov     AX,+4[SI]
            mov     SI,-102[BP]
            sub     AX,[SI]
            push    AX
            mov     SI,-102[BP]
            mov     AX,+6[SI]
            mov     SI,-102[BP]
            sub     AX,+2[SI]
            push    AX
            call    IATAN2
            add     SP,4
            mov     -42[BP],AX
            mov     AX,-42[BP]
            sub     AX,ICOURSE
            mov     -40[BP],AX
            mov     AX,MXDEVDIR
            neg     AX
            cmp     AX,-40[BP]
            jge     .0304
            mov     AX,-40[BP]
            cmp     AX,MXDEVDIR
            jge     .0304
            jmp     SHORT .0315
.0304:
            mov     AX,MXDEVDIR
            cwd
            add     AX,-32768
            adc     DX,-1
            cmp     AX,-40[BP]
            jle     .0317
.0315:
            jmp     SHORT .0332
.0317:                      ;196
            mov     AX,-32768
            mov     DX,-1
            push    DX
            push    AX
            mov     AX,MXDEVDIR
            cwd
            pop     BX
            pop     CX
            sub     BX,AX
            sbb     CX,DX
            cmp     BX,-40[BP]
            jl      ?4
            jmp     .0685
?4:
.0332:                      ;196
            mov     SI,-102[BP]
            mov     AX,[SI]
            mov     SI,-96[BP]
```

```
mov     [SI],AX
mov     SI,-102[BP]
mov     AX,+2[SI]
mov     SI,-96[BP]
mov     +2[SI],AX
mov     SI,-102[BP]
mov     AX,+4[SI]
mov     SI,-96[BP]
mov     +4[SI],AX
mov     SI,-102[BP]
mov     AX,+6[SI]
mov     SI,-96[BP]
mov     +6[SI],AX
push    WORD PTR ICOURSE
mov     SI,-94[BP]
mov     AL,+1[SI]
cbw
push    AX
call    PRIORITY
add     SP,2
push    AX
push    WORD PTR -96[BP]
call    RTLANE
add     SP,6
push    WORD PTR -96[BP]
call    INQEP
add     SP,2
or      AX,AX
jne     ?5
jmp     .0685 cmp     WORD PTR +4[BP],1
jne     .0405
lea     SI,-4[BP]
push    SI
mov     AX,0
push    AX
call    CVSITSF
add     SP,2
push    DX
push    AX
mov     SI,-96[BP]
mov     AX,+6[SI]
sub     AX,-10[BP]
push    AX
call    CVSITSF
add     SP,2
push    DX
push    AX
mov     SI,-96[BP]
mov     AX,+2[SI]
sub     AX,-10[BP]
push    AX
call    CVSITSF
add     SP,2
push    DX
push    AX
lea     SI,-8[BP]
push    SI
mov     AX,0
push    AX
call    CVSITSF
add     SP,2
push    DX
push    AX
mov     SI,-96[BP]
mov     AX,+4[SI]
sub     AX,-12[BP]
push    AX
call    CVSITSF
add     SP,2
push    DX
push    AX
mov     SI,-96[BP]
mov     AX,[SI]
sub     AX,-12[BP]
push    AX
call    CVSITSF
add     SP,2
push    DX
push    AX
```

```
call    CLOSTPT
add     SP,28
mov     -44[BP],AX
jmp     SHORT .0475
.0405:                  ;218
lea     SI,-4[BP]
push    SI
mov     AX,0
push    AX
call    CVSITSF
add     SP,2
push    DX
push    AX
mov     SI,-96[BP]
mov     AX,+6[SI]
sub     AX,-10[BP]
push    AX
call    CVSITSF
add     SP,2
push    DX
push    AX
mov     SI,-96[BP]
mov     AX,+2[SI]
sub     AX,-10[BP]
push    AX
call    CVSITSF
add     SP,2
push    DX
push    AX
lea     SI,-8[BP]
push    SI
mov     AX,0
push    AX
call    CVSITSF
add     SP,2
push    DX
push    AX
mov     SI,-96[BP]
mov     AX,+4[SI]
sub     AX,-12[BP]
push    AX
call    CVSITSF
add     SP,2
push    DX
push    AX
mov     SI,-96[BP]
mov     AX,[SI]
sub     AX,-12[BP]
push    AX
call    CVSITSF
add     SP,2
push    DX
push    AX
call    IPTDIST
add     SP,28
mov     -44[BP],AX
.0475:                  ;226
cmp     WORD PTR +4[BP],
jne     .047E
jmp     SHORT .04DE
.047E:                  ;234
push    WORD PTR -2[BP]
push    WORD PTR -4[BP]
mov     SI,-96[BP]
mov     AX,+6[SI]
sub     AX,-10[BP]
push    AX
call    CVSITSF
add     SP,2
push    DX
push    AX
mov     SI,-96[BP]
mov     AX,+2[SI]
sub     AX,-10[BP]
push    AX
call    CVSITSF
add     SP,2
push    DX
push    AX
push    WORD PTR -6[BP]
push    WORD PTR -8[BP]
```

```
        mov     SI,-96[BP]
        mov     AX,+4[SI]
        sub     AX,-12[BP]
        push    AX
        call    CVSITSF
        add     SP,2
        push    DX
        push    AX
        mov     SI,-96[BP]
        mov     AX,[SI]
        sub     AX,-12[BP]
        push    AX
        call    CVSITSF
        add     SP,2
        push    DX
        push    AX
        call    SFINCLSV
        add     SP,24
        or      AX,AX
        jne     ?6
        jmp     .0685
?6:
.04DE:                          ;234
        push    WORD PTR -6[BP]
        push    WORD PTR -8[BP]
        mov     AX,127
        mov     DX,-32768
        push    DX
        push    AX
        call    SFADD
        add     SP,8
        mov     -8[BP],AX
        mov     -6[BP],DX
        push    WORD PTR -2[BP]
        push    WORD PTR -4[BP]
        mov     AX,127
        mov     DX,-32768
        push    DX
        push    AX
        call    SFADD
        add     SP,8
        mov     -4[BP],AX
        mov     -2[BP],DX
        mov     SI,-102[BP]
        mov     AX,[SI]
        sub     AX,-12[BP]
        mov     SI,-104[BP]
        mov     [SI],AX
        mov     SI,-102[BP]
        mov     AX,+4[SI]
        sub     AX,-12[BP]
        mov     SI,-104[BP]
        mov     +4[SI],AX
        mov     SI,-102[BP]
        mov     AX,+2[SI]
        sub     AX,-10[BP]
        mov     SI,-104[BP]
        mov     +2[SI],AX
        mov     SI,-102[BP]
        mov     AX,+6[SI]
        sub     AX,-10[BP]
        mov     SI,-104[BP]
        mov     +6[SI],AX
        push    WORD PTR -106[BP]
        push    WORD PTR -104[BP]
        call    SFCONECT
        add     SP,4
        mov     -80[BP],AX
        mov     AX,-86[BP]
        or      AX,AX
        je      .05A1
        push    WORD PTR -6[BP]
        push    WORD PTR -8[BP]
        call    CVSFTSI
        add     SP,4
        mov     -58[BP],AX
        push    WORD PTR -2[BP]
        push    WORD PTR -4[BP]
        call    CVSFTSI
        add     SP,4
        mov     -54[BP],AX
        mov     AX,-44[BP]
        mov     -50[BP],AX
        mov     AX,-102[BP]
        mov     -100[BP],AX
        mov     AX,-94[BP]
        mov     -92[BP],AX
        mov     AX,-80[BP]
        mov     -78[BP],AX
        mov     AX,0
        mov     -86[BP],AX
        jmp     .0685
.05A1:                          ;262
        push    WORD PTR -2[BP]
        push    WORD PTR -4[BP]
        call    CVSFTSI
        add     SP,4
        push    AX
        mov     AX,0
        push    AX
        push    WORD PTR -6[BP]
        push    WORD PTR -8[BP]
        call    CVSFTSI
        add     SP,4
        push    AX
        mov     AX,0
        push    AX
        push    WORD PTR -54[BP]
        mov     AX,0
        push    AX
        push    WORD PTR -58[BP]
        mov     AX,0
        push    AX
        call    DOTPROD
        add     SP,16
        cmp     DX,0
        jl      .0635
        jne     .05E3
        cmp     AX,0
        jbe     .0635
.05E3:                          ;267
        mov     AX,-80[BP]
        cmp     AX,-78[BP]
        jle     .05ED
        jmp     SHORT .05FD
.05ED:                          ;270
        mov     AX,-80[BP]
        cmp     AX,-78[BP]
        jne     .0633
        mov     AX,-44[BP]
        cmp     AX,-50[BP]
        jge     .0633
.05FD:                          ;270
        push    WORD PTR -6[BP]
        push    WORD PTR -8[BP]
        call    CVSFTSI
        add     SP,4
        mov     -58[BP],AX
        push    WORD PTR -2[BP]
        push    WORD PTR -4[BP]
        call    CVSFTSI
        add     SP,4
        mov     -54[BP],AX
        mov     AX,-44[BP]
        mov     -50[BP],AX
        mov     AX,-80[BP]
        mov     -78[BP],AX
        mov     AX,-102[BP]
        mov     -100[BP],AX
        mov     AX,-94[BP]
        mov     -92[BP],AX
.0633:                          ;278
        jmp     SHORT .0685
.0635:                          ;278
        mov     AX,-80[BP]
        cmp     AX,-76[BP]
        jle     .063F
```

```
        jmp     SHORT .064F
.063F:                  ;281
        mov     AX,-80[BP]
        cmp     AX,-76[BP]
        jne     .0685
        mov     AX,-44[BP]
        cmp     AX,-48[BP]
        jge     .0685
.064F:                  ;281
        push    WORD PTR -6[BP]
        push    WORD PTR -8[BP]
        call    CVSFTSI
        add     SP,4
        mov     -56[BP],AX
        push    WORD PTR -2[BP]
        push    WORD PTR -4[BP]
        call    CVSFTSI
        add     SP,4
        mov     -52[BP],AX
        mov     AX,-44[BP]
        mov     -48[BP],AX
        mov     AX,-80[BP]
        mov     -76[BP],AX
        mov     AX,-102[BP]
        mov     -98[BP],AX
        mov     AX,-94[BP]
        mov     -90[BP],AX
.0685:                  ;295
        inc     WORD PTR -82[BP]
        add     WORD PTR -88[BP],4
        jmp     .026A
.0690:                  ;295
        jmp     .0247
.0693:                  ;296
        cmp     WORD PTR -50[BP],0
        jne     .069F
        mov     AX,1
        jmp     SHORT .06A2
.069F:                  ;299
        mov     AX,-50[BP]
.06A2:                  ;299
        mov     -50[BP],AX
        cmp     WORD PTR -86[BP],0
        jne     .06FF
        cmp     WORD PTR -48[BP],32766
        jge     .06FD
        mov     AX,-78[BP]
        cmp     AX,-76[BP]
        jle     .06BD
        jmp     SHORT .0708
.06BD:                  ;310
        mov     AX,-78[BP]
        cmp     AX,-76[BP]
        jge     .06C8
        jmp     .078A
.06C8:                  ;314
        mov     AX,-48[BP]
        add     AX,-50[BP]
        cmp     AX,30
        jge     .06D5
        jmp     SHORT .0701
.06D5:                  ;319
        mov     AX,-50[BP]
        push    AX
        mov     BX,100
        mov     AX,-48[BP]
        imul    BX
        pop     BX
        cwd
        idiv    BX
        mov     -46[BP],AX
        cmp     WORD PTR -46[BP],300
        jle     .06F1
        jmp     SHORT .0708
.06F1:                  ;323
        cmp     WORD PTR -46[BP],33
        jge     .06FB
        jmp     .078A
.06FB:                  ;326
        jmp     SHORT .0701
.06FD:                  ;329
        jmp     SHORT .0708
.06FF:                  ;331
        jmp     SHORT .0701
.0701:                  ;334
        mov     AX,0
        mov     SP,BP
        pop     BP
        ret
.0708:                  ;337
        lea     AX,@UW+8
        mov     @IW,AX
        mov     AX,-92[BP]
        mov     STRDAT,AX
        mov     AX,-100[BP]
        mov     STRCOOR,AX
        mov     SI,-100[BP]
        mov     AX,[SI]
        mov     SI,-96[BP]
        mov     [SI],AX
        mov     SI,@IW
        mov     [SI],AX
        mov     SI,-100[BP]
        mov     AX,+4[SI]
        mov     SI,-96[BP]
        mov     +4[SI],AX
        mov     SI,@IW
        mov     +4[SI],AX
        mov     SI,-100[BP]
        mov     AX,+2[SI]
        mov     SI,-96[BP]
        mov     +2[SI],AX
        mov     SI,@IW
        mov     +2[SI],AX
        mov     SI,-100[BP]
        mov     AX,+6[SI]
        mov     SI,-96[BP]
        mov     +6[SI],AX
        mov     SI,@IW
        mov     +6[SI],AX
        push    WORD PTR  COURSE
        mov     SI,-92[BP]
        mov     AL,+1[SI]
        cbw
        push    AX
        call    PRIORITY
        add     SP,2
        push    AX
        push    WORD PTR -96[BP]
        call    RTLANE
        add     SP,6
        mov     AX,-96[BP]
        mov     SP,BP
        pop     BP
        ret
.078A:                  ;350
        lea     AX,@UW+8
        mov     @IW,AX
        mov     AX,-90[BP]
        mov     STRDAT,AX
        mov     AX,-98[BP]
        mov     STRCOOR,AX
        mov     SI,-98[BP]
        mov     AX,[SI]
        mov     SI,-96[BP]
        mov     [SI],AX
        mov     SI,@IW
        mov     [SI],AX
        mov     SI,-98[BP]
        mov     AX,+4[SI]
        mov     SI,-96[BP]
        mov     +4[SI],AX
        mov     SI,@IW
        mov     +4[SI],AX
        mov     SI,-98[BP]
        mov     AX,+2[SI]
        mov     SI,-96[BP]
        mov     +2[SI],AX
        mov     SI,@IW
        mov     +2[SI],AX
```

```
              mov      SI,-98[BP]                              shl      AX,1
              mov      AX,+6[SI]                               shl      AX,1
              mov      SI,-96[BP]                              add      SI,AX
              mov      +6[SI],AX                               push     WORD PTR +2[SI]
              mov      SI,@IW                                  push     WORD PTR [SI]
              mov      +6[SI],AX                               call     CVSLTSF
              push     WORD PTR ICOURSE                        add      SP,4
              mov      SI,-90[BP]                     lea      SI,-56[BP]
              mov      AL,+1[SI]                               mov      BX,-22[BP]
              cbw                                              shl      BX,1
              push     AX                                      shl      BX,1
              call     PRIORITY                                add      SI,BX
              add      SP,2                                    mov      [SI],AX
              push     AX                                      mov      +2[SI],DX
              push     WORD PTR -96[BP]              .065:                       ;46
              call     RTLANE                                  inc      WORD PTR -22[BP]
              add      SP,6                                    jmp      SHORT .0C
              mov      AX,-96[BP]                    .06A:                       ;46
              mov      SP,BP                                   mov      SI,+4[BP]
              pop      BP                                      push     WORD PTR [SI]
              ret                                              call     INT2LONG
STRSRCH       ENDP                                             add      SP,2
                                                               push     DX
@CODE         ENDS                                             push     AX
@CODE         SEGMENT BYTE PUBLIC 'CODE'                       call     CVSLTSF
              include epilogue.h                               add      SP,4
                                                               mov      -20[BP],AX
@BIGMODEL     EQU      0                                       mov      -18[BP],DX
              include prologue.h                               mov      SI,+4[BP]
                                                               push     WORD PTR +5[SI]
              public   INQEP                                   call     INT2LONG
@CODE         ENDS                                             add      SP,2
@DATAB        SEGMENT                                          push     DX
              extrn    IQEPX:word                              push     AX
                                                               call     CVSLTSF
              extrn    IQEPY:word                              add      SP,4
                                                               mov      -16[BP],AX
@DATAB        ENDS                                             mov      -14[BP],DX
@CODE         SEGMENT BYTE PUBLIC 'CODE'                       mov      SI,+4[BP]
@CODE         ENDS                                             push     WORD PTR +2[SI]
              extrn    CVSLTSF:near                            call     INT2LONG
                                                               add      SP,2
              extrn    CVSITSF:near                            push     DX
                                                               push     AX
              extrn    CVSFTSL:near                            call     CVSLTSF
                                                               add      SP,4
              extrn    SFXPROD:near                            mov      -12[BP],AX
                                                               mov      -10[BP],DX
              extrn    INT2LONG:near                           mov      SI,+4[BP]
                                                               push     WORD PTR +7[SI]
              extrn    SFCMP:near                              call     INT2LONG
                                                               add      SP,2
@CODE         SEGMENT BYTE PUBLIC 'CODE'                       push     DX
INQEP         PROC     NEAR                                    push     AX
.00:                            ;27                            call     CVSLTSF
              push     BP                                      add      SP,4
              mov      BP,SP                                   mov      -8[BP],AX
              sub      SP,72                                   mov      -6[BP],DX
              mov      AX,0                                    mov      AX,0
              mov      -22[BP],AX                              mov      -24[BP],AX
.0C:                            ;43                            lea      SI,-56[BP]
              cmp      WORD PTR -22[BP],4                      push     WORD PTR +2[SI]
              jge      .06A                                    push     WORD PTR [SI]
              lea      SI,IQEPX                                lea      SI,-72[BP]
              mov      AX,-22[BP]                              push     WORD PTR +2[SI]
              shl      AX,1                                    push     WORD PTR [SI]
              shl      AX,1                                    push     WORD PTR -10[BP]
              add      SI,AX                                   push     WORD PTR -12[BP]
              push     WORD PTR +2[SI]                         push     WORD PTR -18[BP]
              push     WORD PTR [SI]                           push     WORD PTR -20[BP]
              call     CVSLTSF                                 push     WORD PTR -6[BP]
              add      SP,4                                    push     WORD PTR -8[BP]
              lea      SI,-72[BP]                              push     WORD PTR -14[BP]
              mov      BX,-22[BP]
              shl      BX,1                                    push     WORD PTR -16[BP]
              shl      BX,1                                    push     WORD PTR -18[BP]
              add      SI,BX                                   push     WORD PTR -20[BP]
              mov      [SI],AX                                 call     SFXPROD
              mov      +2[SI],DX                               add      SP,32
              lea      SI,IQEPY                                mov      -4[BP],AX
              mov      AX,-22[BP]                              mov      -2[BP],DX
```

```
        mov     AX,0
        cwd
        push    DX
        push    AX
        push    WORD PTR -2[BP]
        push    WORD PTR -4[BP]
        call    SFCMP
        add     SP,8
        cmp     AX,-1
        jle     .0133
        mov     AX,1
        jmp     SHORT .0136
.0133:                  ;57
        mov     AX,0
.0136:                  ;57
        mov     -26[BP],AX
        mov     AX,3
        lea     SI,-30[BP]
        mov     [SI],AX
        mov     AX,1
        mov     -22[BP],AX
.0147:                  ;59
        cmp     WORD PTR -22[BP],4
        jl      ?1
        jmp     .01F7
?1:
        lea     SI,-56[BP]
        mov     AX,-22[BP]
        shl     AX,1
        shl     AX,1
        add     SI,AX
        push    WORD PTR +2[SI]
        push    WORD PTR [SI]
        lea     SI,-72[BP]
        mov     AX,-22[BP]
        shl     AX,1
        shl     AX,1
        add     SI,AX
        push    WORD PTR +2[SI]
        push    WORD PTR [SI]
        push    WORD PTR -10[BP]
        push    WORD PTR -12[BP]
        push    WORD PTR -18[BP]
        push    WORD PTR -20[BP]
        push    WORD PTR -6[BP]
        push    WORD PTR -8[BP]
        push    WORD PTR -14[BP]
        push    WORD PTR -16[BP]
        push    WORD PTR -10[BP]
        push    WORD PTR -12[BP]
        push    WORD PTR -18[BP]
        push    WORD PTR -20[BP]
        call    SFXPROD
        add     SP,32
        mov     -4[BP],AX
        mov     -2[BP],DX
        mov     AX,0
        cwd
        push    DX
        push    AX
        push    WORD PTR -2[BP]
        push    WORD PTR -4[BP]
        call    SFCMP
        add     SP,8
        cmp     AX,-1
        jle     .01BF
        mov     AX,1
        jmp     SHORT .01C2
.01BF:                  ;62
        mov     AX,0
.01C2:                  ;62
        mov     -28[BP],AX
        mov     AX,-28[BP]
        cmp     AX,-26[BP]
        je      .01E8
        mov     AX,-22[BP]
        sub     AX,1
        lea     SI,-32[BP]
        mov     DX,-24[BP]
        inc     WORD PTR -24[BP]
        shl     DX,1
        add     SI,DX
        mov     [SI],AX
        mov     AX,-28[BP]
        mov     -26[BP],AX
.01E8:                  ;70
        cmp     WORD PTR -24[BP],2
        jne     .01F1
        jmp     SHORT .01F7
.01F1:                  ;71
        inc     WORD PTR -22[BP]
        jmp     .0147
.01F7:                  ;71
        cmp     WORD PTR -24[BP],0
        jne     .0205
        mov     AX,0
        mov     SP,BP
        pop     BP
        ret
.0205:                  ;76
        mov     AX,0
        mov     -22[BP],AX
.020B:                  ;76
        cmp     WORD PTR -22[BP],2
        jl      ?2
        jmp     .040C
?2:
        lea     SI,-56[BP]
        mov     AX,4
        push    AX
        lea     DI,-32[BP]
        mov     AX,-22[BP]
        shl     AX,1
        add     DI,AX
        mov     AX,[DI]
        add     AX,1
        pop     BX
        cwd
        idiv    BX
        shl     DX,1
        shl     DX,1
        add     SI,DX
        push    WORD PTR +2[SI]
        push    WORD PTR [SI]
        lea     SI,-72[BP]
        mov     AX,4
        push    AX
        lea     DI,-32[BP]
        mov     AX,-22[BP]
        shl     AX,1
        add     DI,AX
        mov     AX,[DI]
        add     AX,1
        pop     BX
        cwd
        idiv    BX
        shl     DX,1
        shl     DX,1
        add     SI,DX
        push    WORD PTR +2[SI]
        push    WORD PTR [SI]
        lea     SI,-56[BP]
        lea     DI,-32[BP]
        mov     AX,-22[BP]
        shl     AX,1
        add     DI,AX
        mov     AX,[DI]
        shl     AX,1
        shl     AX,1
        add     SI,AX
        push    WORD PTR +2[SI]
        push    WORD PTR [SI]
        lea     SI,-72[BP]
        lea     DI,-32[BP]
        mov     AX,-22[BP]
        shl     AX,1
        add     DI,AX
        mov     AX,[DI]
        shl     AX,1
        shl     AX,1
        add     SI,AX
        push    WORD PTR +2[SI]
        push    WORD PTR [SI]
```

```
        push    WORD PTR -10[BP]
        push    WORD PTR -12[BP]
        push    WORD PTR -18[BP]
        push    WORD PTR -20[BP]
        lea     SI,-56[BP]
        lea     DI,-32[BP]
        mov     AX,-22[BP]
        shl     AX,1
        add     DI,AX
        mov     AX,[DI]
        shl     AX,1
        shl     AX,1
        add     SI,AX
        push    WORD PTR +2[SI]
        push    WORD PTR [SI]
        lea     SI,-72[BP]
        lea     DI,-32[BP]
        mov     AX,-22[BP]
        shl     AX,1
        add     DI,AX
        mov     AX,[DI]
        shl     AX,1
        shl     AX,1
        add     SI,AX
        push    WORD PTR +2[SI]
        push    WORD PTR [SI]
        call    SFXPROD
        add     SP,32
        mov     -4[BP],AX
        mov     -2[BP],DX
        mov     AX,0
        cwd
        push    DX
        push    AX
        push    WORD PTR -2[BP]
        push    WORD PTR -4[BP]
        call    SFCMP
        add     SP,8
        cmp     AX,-1
        jle     .02FB
        mov     AX,1
        jmp     SHORT .02FE
.02FB:                  ;83
        mov     AX,0
.02FE:                  ;83
        lea     SI,-40[BP]
        mov     DX,-22[BP]
        shl     DX,1
        shl     DX,1
        add     SI,DX
        mov     [SI],AX
        lea     SI,-56[BP]
        mov     AX,4
        push    AX
        lea     DI,-32[BP]
        mov     AX,-22[BP]
        shl     AX,1
        add     DI,AX
        mov     AX,[DI]
        add     AX,1
        pop     BX
        cwd
        idiv    BX
        shl     DX,1
        shl     DX,1
        add     SI,DX
        push    WORD PTR +2[SI]
        push    WORD PTR [SI]
        lea     SI,-72[BP]
        mov     AX,4
        push    AX
        lea     DI,-32[BP]
        mov     AX,-22[BP]
        shl     AX,1
        add     DI,AX
        mov     AX,[DI]
        add     AX,1
        pop     BX
        cwd
        idiv    BX
        shl     DX,1
        add     SI,DX
        push    WORD PTR +2[SI]
        push    WORD PTR [SI]
        lea     SI,-56[BP]
        lea     DI,-32[BP]
        mov     AX,-22[BP]
        shl     AX,1
        add     DI,AX
        mov     AX,[DI]
        shl     AX,1
        shl     AX,1
        add     SI,AX
        push    WORD PTR +2[SI]
        push    WORD PTR [SI]
        push    WORD PTR -6[BP]
        push    WORD PTR -8[BP]
        push    WORD PTR -14[BP]
        push    WORD PTR -16[BP]
        lea     SI,-56[BP]
        lea     DI,-32[BP]
        mov     AX,-22[BP]
        shl     AX,1
        add     DI,AX
        mov     AX,[DI]
        shl     AX,1
        shl     AX,1
        add     SI,AX
        push    WORD PTR +2[SI]
        push    WORD PTR [SI]
        lea     SI,-72[BP]
        lea     DI,-32[BP]
        mov     AX,-22[BP]
        shl     AX,1
        add     DI,AX
        mov     AX,[DI]
        shl     AX,1
        shl     AX,1
        add     SI,AX
        push    WORD PTR +2[SI]
        push    WORD PTR [SI]
        call    SFXPROD
        add     SP,32
        mov     -4[BP],AX
        mov     -2[BP],DX
        mov     AX,0
        cwd
        push    DX
        push    AX
        push    WORD PTR -2[BP]
        push    WORD PTR -4[BP]
        call    SFCMP
        add     SP,8
        cmp     AX,-1
        jle     .03F2
        mov     AX,1
        jmp     SHORT .03F5
.03F2:                  ;89
        mov     AX,0
.03F5:                  ;89
        lea     SI,-40[BP]
        mov     DX,-22[BP]
        shl     DX,1
        shl     DX,1
        add     SI,DX
        mov     [SI],AX
.0406:                  ;0
        inc     WORD PTR -22[BP]
        jmp     .020B
```

```
.040C:                          ;90
        lea     SI,-38[BP]
        lea     DI,-40[BP]
        mov     AX,[DI]
        cmp     AX,[SI]
        jne     .0437
        lea     SI,-34[BP]
        lea     DI,-36[BP]
        mov     AX,[DI]
        cmp     AX,[SI]
        jne     .0437
        lea     SI,-36[BP]
        lea     DI,-40[BP]
        mov     AX,[DI]
        cmp     AX,[SI]
        je      .0437
        mov     AX,0
        mov     SP,BP
        pop     BP
        ret
.0437:                          ;94
        mov     AX,1
        mov     SP,BP
        pop     BP
        ret
INQEP   ENDP
@CODE   ENDS
@CODE   SEGMENT BYTE PUBLIC 'CODE'
        include epiloque.h
        end @BIGMODEL       EQU     0
        include prologue.h public  SFCONECT
@CODE   ENDS
        extrn   CVSITSF:near
        extrn   SFADD:near
        extrn   SFSUB:near
        extrn   SFDIV:near
        extrn   SFMUL:near
        extrn   XPROD:near
        extrn   SFINTRST:near
        extrn   SFINCLSV:near
        extrn   SFCMP:near @CODE   SEGMENT BYTE PUBLIC 'CODE'
SFCONECT        PROC    NEAR
.00:                            ;25
        push    BP
        mov     BP,SP
        sub     SP,44
        mov     AX,+4[BP]
        cmp     AX,0
        jne     .010
        jmp     SHORT .018
.010:                           ;33
        mov     AX,+6[BP]
        cmp     AX,0
        jne     .01F
.018:                           ;33
        mov     AX,0
        mov     SP,BP
        pop     BP
        ret
.01F:                           ;34
        mov     AX,+4[BP]
        cmp     AX,+6[BP]
        jne     .02E
        mov     AX,1
        mov     SP,BP
        pop     BP
        ret
.02E:                           ;37
        mov     SI,+6[BP]
        mov     DI,+4[BP]
        mov     AX,[DI]
        cmp     AX,[SI]
        jne     .04A
        mov     SI,+6[BP]
        mov     DI,+4[BP]
        mov     AX,+2[DI]
        cmp     AX,+2[SI]
        jne     .04A
        jmp     SHORT .065
.04A:
        mov     SI,+6[BP]
        mov     DI,+4[BP]
        mov     AX,[DI]
        cmp     AX,+4[SI]
        jne     .06C
        mov     SI,+6[BP]
        mov     DI,+4[BP]
        mov     AX,+2[DI]
        cmp     AX,+6[SI]
        jne     .06C
.065:                           ;38
        mov     AX,1
        mov     SP,BP
        pop     BP
        ret
.06C:                           ;40
        mov     SI,+6[BP]
        mov     DI,+4[BP]
        mov     AX,+4[DI]
        cmp     AX,[SI]
        jne     .089
        mov     SI,+6[BP]
        mov     DI,+4[BP]
        mov     AX,+6[DI]
        cmp     AX,+2[SI]
        jne     .089
        jmp     SHORT .0A5
.089:                           ;41
        mov     SI,+6[BP]
        mov     DI,+4[BP]
        mov     AX,+4[DI]
        cmp     AX,+4[SI]
        jne     .0AC
        mov     SI,+6[BP]
        mov     DI,+4[BP]
        mov     AX,+6[DI]
        cmp     AX,+6[SI]
        jne     .0AC
.0A5:                           ;41
        mov     AX,1
        mov     SP,BP
        pop     BP
        ret
.0AC:                           ;43
        mov     SI,+4[BP]
        push    WORD PTR [SI]
        call    CVSITSF
        add     SP,2
        mov     -32[BP],AX
        mov     -30[BP],DX
        mov     SI,+4[BP]
        push    WORD PTR +4[SI]
        call    CVSITSF
        add     SP,2
        mov     -28[BP],AX
        mov     -26[BP],DX
        mov     SI,+4[BP]
        push    WORD PTR +2[SI]
        call    CVSITSF
        add     SP,2
        mov     -16[BP],AX
        mov     -14[BP],DX
        mov     SI,+4[BP]
        push    WORD PTR +6[SI]
```

```
        call    CVSITSF
        add     SP,2
        mov     -12[BP],AX
        mov     -10[BP],DX
        mov     SI,+6[BP]                   5
        push    WORD PTR [SI]
        call    CVSITSF
        add     SP,2
        mov     -24[BP],AX
        mov     -22[BP],DX
        mov     SI,+6[BP]                  10
        push    WORD PTR +4[SI]
        call    CVSITSF
        add     SP,2
        mov     -20[BP],AX
        mov     -18[BP],DX
        mov     SI,+6[BP]                  15
        push    WORD PTR +2[SI]
        call    CVSITSF
        add     SP,2
        mov     -8[BP],AX
        mov     -6[BP],DX                  20
        mov     SI,+6[BP]
        push    WORD PTR +6[SI]
        call    CVSITSF
        add     SP,2
        mov     -4[BP],AX
        mov     -2[BP],DX                  25
        mov     AX,20
        push    AX
        call    CVSITSF
        add     SP,2
        mov     -36[BP],AX
        mov     -34[BP],DX                 30
        lea     SI,-40[BP]
        push    SI
        lea     SI,-44[BP]
        push    SI
        push    WORD PTR -2[BP]
        push    WORD PTR -4[BP]            35
        push    WORD PTR -6[BP]
        push    WORD PTR -8[BP]
        push    WORD PTR -10[BP]
        push    WORD PTR -12[BP]
        push    WORD PTR -14[BP]
        push    WORD PTR -16[BP]           40
        push    WORD PTR -18[BP]
        push    WORD PTR -20[BP]
        push    WORD PTR -22[BP]
        push    WORD PTR -24[BP]
        push    WORD PTR -26[BP]
        push    WORD PTR -28[BP]           45
        push    WORD PTR -30[BP]
        push    WORD PTR -32[BP]
        call    SFINTRST
        add     SP,36
        or      AX,AX                      50
        jne     ?1
        jmp     .03EF
?1:
        push    WORD PTR -38[BP]
        push    WORD PTR -40[BP]
        push    WORD PTR -10[BP]           55
        push    WORD PTR -12[BP]
        push    WORD PTR -14[BP]
        push    WORD PTR -16[BP]
        push    WORD PTR -2[BP]
        push    WORD PTR -4[BP]            60
        push    WORD PTR -26[BP]
        push    WORD PTR -28[BP]
        push    WORD PTR -30[BP]
        push    WORD PTR -32[BP]
        call    SFINCLSV
        add     SP,24                      65
        or      AX,AX
        je      .01C0
        jmp     .0239
.01C0:                                     ;74
        push    WORD PTR -34[BP]
        push    WORD PTR -36[BP]
```

```
        push    WORD PTR -38[BP]
        push    WORD PTR -40[BP]
        push    WORD PTR -14[BP]
        push    WORD PTR -16[BP]
        call    SFSUB
        add     SP,8
        push    DX
        push    AX
        push    WORD PTR -38[BP]
        push    WORD PTR -40[BP]
        push    WORD PTR -14[BP]
        push    WORD PTR -16[BP]
        call    SFSUB
        add     SP,8
        push    DX
        push    AX
        call    SFMUL
        add     SP,8
        push    DX
        push    AX
        push    WORD PTR -42[BP]
        push    WORD PTR -44[BP]
        push    WORD PTR -30[BP]
        push    WORD PTR -32[BP]
        call    SFSUB
        add     SP,8
        push    DX
        push    AX
        push    WORD PTR -42[BP]
        push    WORD PTR -44[BP]
        push    WORD PTR -30[BP]
        push    WORD PTR -32[BP]
        call    SFSUB
        add     SP,8
        push    DX
        push    AX
        call    SFMUL
        add     SP,8
        push    DX
        push    AX
        call    SFADD
        add     SP,8
        push    DX
        push    AX
        call    SFCMP
        add     SP,8
        cmp     AX,0
        jge     .023C
.0239:                                     ;74
        jmp     .0288
.023C:                                     ;74
        push    WORD PTR -34[BP]
        push    WORD PTR -36[BP]
        push    WORD PTR -38[BP]
        push    WORD PTR -40[BP]
        push    WORD PTR -10[BP]
        push    WORD PTR -12[BP]
        call    SFSUB
        add     SP,8
        push    DX
        push    AX
        push    WORD PTR -38[BP]
        push    WORD PTR -40[BP]
        push    WORD PTR -10[BP]
        push    WORD PTR -12[BP]
        call    SFSUB
        add     SP,8
        push    DX
        push    AX
        call    SFMUL
        add     SP,8
        push    DX
        push    AX
        push    WORD PTR -42[BP]
        push    WORD PTR -44[BP]
        push    WORD PTR -26[BP]
        push    WORD PTR -28[BP]
        call    SFSUB
        add     SP,8
        push    DX
        push    AX
```

```
        push    WORD PTR -42[BP]
        push    WORD PTR -44[BP]
        push    WORD PTR -26[BP]
        push    WORD PTR -28[BP]
        call    SFSUB
        add     SP,8
        push    DX
        push    AX
        call    SFMUL
        add     SP,8
        push    DX
        push    AX
        call    SFADD
        add     SP,8
        push    DX
        push    AX
        call    SFCMP
        add     SP,8
        cmp     AX,0
        jl      ?2
        jmp     .03E5
?2:
.02B8:                          ;74
        push    WORD PTR -38[BP]
        push    WORD PTR -40[BP]
        push    WORD PTR -2[BP]
        push    WORD PTR -4[BP]
        push    WORD PTR -6[BP]
        push    WORD PTR -8[BP]
        push    WORD PTR -42[BP]
        push    WORD PTR -44[BP]
        push    WORD PTR -18[BP]
        push    WORD PTR -20[BP]
        push    WORD PTR -22[BP]
        push    WORD PTR -24[BP]
        call    SFINCLSV
        add     SP,24
        or      AX,AX
        je      .02E9
        jmp     .0362
.02E9:                          ;74
        push    WORD PTR -34[BP]
        push    WORD PTR -36[BP]
        push    WORD PTR -38[BP]
        push    WORD PTR -40[BP]
        push    WORD PTR -6[BP]
        push    WORD PTR -8[BP]
        call    SFSUB
        add     SP,8
        push    DX
        push    AX
        push    WORD PTR -38[BP]
        push    WORD PTR -40[BP]
        push    WORD PTR -6[BP]
        push    WORD PTR -8[BP]
        call    SFSUB
        add     SP,8
        push    DX
        push    AX
        call    SFMUL
        add     SP,8
        push    DX
        push    AX
        push    WORD PTR -42[BP]
        push    WORD PTR -44[BP]
        push    WORD PTR -22[BP]
        push    WORD PTR -24[BP]
        call    SFSUB
        add     SP,8
        push    DX
        push    AX
        push    WORD PTR -42[BP]
        push    WORD PTR -44[BP]
        push    WORD PTR -22[BP]
        push    WORD PTR -24[BP]
        call    SFSUB
        add     SP,8
        push    DX
        push    AX
        call    SFMUL
        add     SP,8
        push    DX
        push    AX
        call    SFADD
        add     SP,8
        push    DX
        push    AX
        call    SFCMP
        add     SP,8
        cmp     AX,0
        jge     .0365
.0362:                          ;74
        jmp     .03DE
.0365:                          ;74
        push    WORD PTR -34[BP]
        push    WORD PTR -36[BP]
        push    WORD PTR -38[BP]
        push    WORD PTR -40[BP]
        push    WORD PTR -2[BP]
        push    WORD PTR -4[BP]
        call    SFSUB
        add     SP,8
        push    DX
        push    AX
        push    WORD PTR -38[BP]
        push    WORD PTR -40[BP]
        push    WORD PTR -2[BP]
        push    WORD PTR -4[BP]
        call    SFSUB
        add     SP,8
        push    DX
        push    AX
        call    SFMUL
        add     SP,8
        push    DX
        push    AX
        push    WORD PTR -42[BP]
        push    WORD PTR -44[BP]
        push    WORD PTR -18[BP]
        push    WORD PTR -20[BP]
        call    SFSUB
        add     SP,8
        push    DX
        push    AX
        push    WORD PTR -42[BP]
        push    WORD PTR -44[BP]
        push    WORD PTR -18[BP]
        push    WORD PTR -20[BP]
        call    SFSUB
        add     SP,8
        push    DX
        push    AX
        call    SFMUL
        add     SP,8
        push    DX
        push    AX
        call    SFADD
        add     SP,8
        push    DX
        push    AX
        call    SFCMP
        add     SP,8
        cmp     AX,0
        jge     .03E5
.03DE:                          ;74
        mov     AX,1
        mov     SP,BP
        pop     BP
        ret
.03E5:                          ;76
        mov     AX,0
        mov     SP,BP
        pop     BP
        ret
.03EC:                          ;77
        jmp     .0499
.03EF:                          ;78
        mov     SI,+4[BP]
```

```
            push    WORD PTR +6[SI]
            mov     SI,+6[BP]
            push    WORD PTR +2[SI]
            mov     SI,+4[BP]
            push    WORD PTR +4[SI]
            mov     SI,+6[BP]
            push    WORD PTR [SI]
            mov     SI,+4[BP]
            push    WORD PTR +2[SI]
            mov     SI,+6[BP]
            push    WORD PTR +2[SI]
            mov     SI,+4[BP]
            push    WORD PTR [SI]
            mov     SI,+6[BP]
            push    WORD PTR [SI]
            call    XFROD
            add     SP,16
            or      DX,AX
            je      .042D
            mov     AX,0
            mov     SP,BP
            pop     BP
            ret
.042D:                      ;84
            push    WORD PTR -6[BP]
            push    WORD PTR -8[BP]
            push    WORD PTR -10[BP]
            push    WORD PTR -12[BP]
            push    WORD PTR -14[BP]
            push    WORD PTR -16[BP]
            push    WORD PTR -22[BP]
            push    WORD PTR -24[BP]
            push    WORD PTR -26[BP]
            push    WORD PTR -28[BP]
            push    WORD PTR -30[BP]
            push    WORD PTR -32[BP]
            call    SFINCLSV
            add     SP,24
            or      AX,AX
            je      .045D
            jmp     SHORT .0488
.045D:                      ;85
            push    WORD PTR -2[BP]
            push    WORD PTR -4[BP]
            push    WORD PTR -10[BP]
            push    WORD PTR -12[BP]
            push    WORD PTR -14[BP]
            push    WORD PTR -16[BP]
            push    WORD PTR -18[BP]
            push    WORD PTR -20[BP]
            push    WORD PTR -26[BP]
            push    WORD PTR -28[BP]
            push    WORD PTR -30[BP]
            push    WORD PTR -32[BP]
            call    SFINCLSV
            add     SP,24
            or      AX,AX
            je      .0492
.0488:                      ;85
            mov     AX,1
            mov     SP,BP
            pop     BP
            ret
.0492:                      ;87
            mov     AX,0
            mov     SP,BP
            pop     BP
            ret
.0499:                      ;88
            mov     AX,0
            mov     SP,BP
            pop     BP
            ret
SFCONECT    ENDP

@CODE       ENDS
@CODE       SEGMENT BYTE PUBLIC CODE
```

```
@BIGMODEL        EQU      0
         include prologue.h
@CODE    ENDS
@DATAC   SEGMENT
         db      67,111,114,114,101,108,97,116,105,111,110,46,46,32
         db      102,114,111,109,32,37,100,44,37,100,44,32,116,111,32,37,100
         db      44,37,100,44,32,99,111,114,114,32,97,110,103,61,32,37
         db      100,44,32,99,97,114,32,97,110,103,61,32,37,100,10,0

@DATAC   ENDS
@CODE    SEGMENT BYTE PUBLIC 'CODE' public  BCORCALC
@CODE    ENDS
@DATAB   SEGMENT
         extrn   STRDAT:word extrn   STRCOUR:word extrn   IDRPX:word extrn   IDRPY:word extrn   IQEPX:word extrn   IQEPY:word extrn   ICOURSE:word @DATAB   ENDS
@CODE    SEGMENT BYTE PUBLIC 'CODE'
@CODE    ENDS
         extrn   CVSITSF:near extrn   CVSLTSF:near extrn   CLOSTPT:near extrn   CVSFTSI:near extrn   ISQRT:near extrn   NPAM:near extrn   MCBUF:near extrn   CORELATE:near extrn   PRINTF:near extrn   IATAN2:near extrn   ISMUL:near extrn   ICOS:near extrn   ISIN:near extrn   PRIORITY:near extrn   QEF_EXP:near
@CODE    SEGMENT BYTE PUBLIC 'CODE'
BCORCALC         PROC    NEAR
@CODE    ENDS
         extrn   $LRSSHIFT:near extrn   $LMUL:near extrn   $LSDIV:near extrn   $LLSHIFT:near @CODE    SEGMENT BYTE PUBLIC 'CODE'
.00:                     ;25
         push    BP
         mov     BP,SP
         sub     SP,82
         mov     AX,0
```

```
        mov     -26[BP],AX
        mov     AX,IDRPX
        mov     DX,IDRPX+2
        push    DX
        push    AX
        mov     AX,16
        mov     DX,0
        push    DX
        push    AX
        call    $LRSSHIFT
        pop     AX
        pop     DX
        mov     -54[BP],AX
        mov     AX,IDRPY
        mov     DX,IDRPY+2
        push    DX
        push    AX
        mov     AX,16
        mov     DX,0
        push    DX
        push    AX
        call    $LRSSHIFT
        pop     AX
        pop     DX
        mov     -52[BP],AX
        mov     AX,STRDAT
        mov     -82[BP],AX
        mov     AX,STRCOOR
        mov     -80[BP],AX
        lea     SI,-46[BP]
        push    SI
        mov     AX,0
        push    AX
        call    CVSITSF
        add     SP,2
        push    DX
        push    AX
        mov     SI,STRCOOR
        mov     AX,+6[SI]
        sub     AX,-52[BP]
        push    AX
        call    CVSITSF
        add     SP,2
        push    DX
        push    AX
        mov     SI,STRCOOR
        mov     AX,+2[SI]
        sub     AX,-52[BP]
push    AX
call    CVSITSF
add     SP,2
push    DX
push    AX
lea     SI,-50[BP]
push    SI
mov     AX,0
push    AX
call    CVSITSF
add     SP,2
push    DX
push    AX
mov     SI,STRCOOR
mov     AX,+4[SI]
sub     AX,-54[BP]
push    AX
call    CVSITSF
add     SP,2
push    DX
push    AX
mov     SI,STRCOOR
mov     AX,[SI]
sub     AX,-54[BP]
push    AX
call    CVSITSF
add     SP,2
push    DX
push    AX
call    CLOSTFT
add     SP,28
push    WORD PTR -48[BP]
push    WORD PTR -50[BP]
        call    CVSFTSI
        add     SP,4
        mov     DX,-54[BP]
        add     DX,AX
        mov     -54[BP],DX
        push    WORD PTR -44[BP]
        push    WORD PTR -46[BP]
        call    CVSFTSI
        add     SP,4
        mov     DX,-52[BP]
        add     DX,AX
        mov     -52[BP],DX
        lea     SI,IQEPX
        mov     AX,[SI]
        mov     DX,+2[SI]
        lea     SI,IQEPX+8
        sub     AX,[SI]
        sbb     DX,+2[SI]
        push    DX
        push    AX
        mov     AX,16
        mov     DX,0
        push    DX
        push    AX
        call    $LRSSHIFT
        pop     AX
        pop     DX
        mov     -18[BP],AX
        mov     -16[BP],DX
        lea     SI,IQEPY
        mov     AX,[SI]
        mov     DX,+2[SI]
        lea     SI,IQEPY+8
        sub     AX,[SI]
        sbb     DX,+2[SI]
        push    DX
        push    AX
        mov     AX,16
        mov     DX,0
        push    DX
        push    AX
        call    $LRSSHIFT
        pop     AX
        pop     DX
        mov     -14[BP],AX
        mov     -12[BP],DX
        push    WORD PTR -16[BP]
        push    WORD PTR -18[BP]
        push    WORD PTR -16[BP]
        push    WORD PTR -18[BP]
        call    $LMUL
        pop     AX
        pop     DX
        push    WORD PTR -12[BP]
        push    WORD PTR -14[BP]
        push    WORD PTR -12[BP]
        push    WORD PTR -14[BP]
        call    $LMUL
        pop     BX
        pop     CX
        add     AX,BX
        adc     DX,CX
        push    DX
        push    AX
        call    ISQRT
        add     SP,4
        mov     -20[BP],AX
        cmp     WORD PTR -20[BP],240
        jle     .0172
        mov     AX,240
        jmp     SHORT .0175
.0172:                          ;80
        mov     AX,-20[BP]
.0175:                          ;80
        mov     -20[BP],AX
        mov     AX,-20[BP]
        neg     AX
        mov     DX,1
        mov     CX,DX
        sar     AX,CL
        push    AX
```

```
        lea     SI,-52[BP]                          push    WORD PTR -52[BP]
        push    SI                                  push    WORD PTR -54[BP]
        lea     SI,-54[BP]                          push    WORD PTR -80[BP]
        push    SI
        lea     SI,-80[BP]                          push    WORD PTR -82[BP]
        push    SI                          5       call    MCBUF
        lea     SI,-82[BP]                          add     SP,8
        push    SI                                  call    CORELATE
        call    NPAM                                lea     SI,-76[BP]
        add     SP,10                               mov     [SI],AX
        mov     -24[BP],AX              10          cmp     AX,0
        push    WORD PTR -52[BP]                    jge     .025C
        push    WORD PTR -54[BP]                    jmp     .074B
        push    WORD PTR -80[BP]            .025C:
        push    WORD PTR -82[BP]                                        ;109
        call    MCBUF                               lea     SI,-68[BP]
        add     SP,8                    15          mov     AX,[SI]
        call    CORELATE                            lea     SI,-70[BP]
                                                    sub     AX,[SI]
        lea     SI,-78[BP]                          cmp     AX,8
        mov     [SI],AX                             jle     .027D
        cmp     AX,0                                jmp     SHORT .028F
        jge     .01C0                   20  .027D:
        jmp     .074B                                               ;109
.01C0:                  ;90                         lea     SI,-66[BP]
        mov     AX,0                                mov     AX,[SI]
        lea     SI,-70[BP]                          lea     SI,-68[BP]
        mov     [SI],AX                             sub     AX,[SI]
        mov     AX,-20[BP]              25          cmp     AX,8
        mov     DX,1                                jg      ?1
        mov     CX,DX                               jmp     .048B
        sar     AX,CL                       ?1:
        sub     AX,-24[BP]                  .028F:
        push    AX                                                  ;109
        lea     SI,-52[BP]              30          lea     SI,-76[BP]
        push    SI                                  lea     DI,-78[BP]
        lea     SI,-54[BP]                          mov     AX,[DI]
        push    SI                                  cmp     AX,[SI]
        lea     SI,-80[BP]                          jle     .02CF
        push    SI                                  lea     SI,-74[BP]
        lea     SI,-82[BP]              35          lea     DI,-76[BP]
        push    SI                                  mov     AX,[DI]
        call    NPAM                                cmp     AX,[SI]
        add     SP,10                               jg      .02CF
        mov     -22[BP],AX                          lea     SI,-66[BP]
        push    WORD PTR -52[BP]        40          mov     AX,[SI]
        push    WORD PTR -54[BP]                    lea     SI,-68[BP]
        push    WORD PTR -80[BP]                    sub     AX,[SI]
        push    WORD PTR -82[BP]                    lea     SI,-68[BP]
        call    MCBUF                               mov     DX,[SI]
        add     SP,8                                lea     SI,-70[BP]
        call    CORELATE                45          sub     DX,[SI]
        lea     SI,-74[BP]                          cmp     DX,AX
        mov     [SI],AX                             jl      .02C7
        cmp     AX,0                                mov     AX,1
        jge     .0211                               mov     -10[BP],AX
        jmp     .074B                               jmp     SHORT .02CD
.0211:                  ;97             50  .02C7:
        mov     AX,-22[BP]                                          ;121
        mov     -56[BP],AX                          mov     AX,2
        lea     SI,-66[BP]                          mov     -10[BP],AX
        mov     [SI],AX                     .02CD:
        mov     AX,-56[BP]                                          ;122
        mov     DX,1                    55          jmp     SHORT .0329
        mov     CX,DX                       .02CF:
        sar     AX,CL                                               ;123
        mov     -62[BP],AX                          lea     SI,-76[BP]
        lea     SI,-68[BP]                          lea     DI,-78[BP]
        mov     [SI],AX                             mov     AX,[DI]
        mov     AX,-62[BP]              60          cmp     AX,[SI]
        neg     AX                                  jg      .0303
        push    AX                                  lea     SI,-74[BP]
        lea     SI,-52[BP]                          lea     DI,-76[BP]
        push    SI                                  mov     AX,[DI]
        lea     SI,-54[BP]              65          cmp     AX,[SI]
        push    SI                                  jle     .0303
        lea     SI,-80[BP]
        push    SI                                  lea     SI,-74[BP]
        lea     SI,-82[BP]                          lea     DI,-78[BP]
        push    SI                                  mov     AX,[DI]
        call    NPAM                                cmp     AX,[SI]
        add     SP,10                               jge     .02FB
                                                    mov     AX,1
                                                    mov     -10[BP],AX
                                                    jmp     SHORT .0301
                                            .02FB:
                                                                    ;128
                                                    mov     AX,2
                                                    mov     -10[BP],AX
```

```
.0301:                  ;129
        jmp     SHORT .0329
.0303:                  ;130
        lea     SI,-76[BP]
        lea     DI,-78[BP]
        mov     AX,[DI]
        cmp     AX,[SI]
        jle     .0323
        lea     SI,-74[BP]
        lea     DI,-76[BP]
        mov     AX,[DI]
        cmp     AX,[SI]
        jle     .0323
        mov     AX,2
        mov     -10[BP],AX
        jmp     SHORT .0329
.0323:                  ;134
        mov     AX,1
        mov     -10[BP],AX
.0329:                  ;139
        cmp     WORD PTR -10[BP],1
        je      ??
        jmp     .03DF
??:
        lea     SI,-70[BP]
        mov     AX,[SI]
        lea     SI,-68[BP]
        add     AX,[SI]
        mov     DX,1
        mov     CX,DX
        sar     AX,CL
        lea     SI,-64[BP]
        mov     [SI],AX
        lea     SI,-64[BP]
        mov     AX,[SI]
        sub     AX,-62[BP]
        push    AX
        lea     SI,-52[BP]
        push    SI
        lea     SI,-54[BP]
        push    SI
        lea     SI,-80[BP]
        push    SI
        lea     SI,-82[BP]
        push    SI
        call    NPAM
        add     SP,10
        lea     SI,-64[BP]
        mov     AX,[SI]
        mov     -62[BP],AX
        push    WORD PTR -52[BP]
        push    WORD PTR -54[BP]
        push    WORD PTR -80[BP]
        push    WORD PTR -82[BP]
        call    MCBUF
        add     SP,8
        call    CORELATE
        lea     SI,-72[BP]
        mov     [SI],AX
        cmp     AX,0
        jge     .0392
        jmp     .074B
.0392:                  ;147
        lea     SI,-76[BP]
        lea     DI,-72[BP]
        mov     AX,[DI]
        cmp     AX,[SI]
        jle     .03B4
        lea     SI,-72[BP]
        mov     AX,[SI]
        lea     SI,-78[BP]
        mov     [SI],AX
        lea     SI,-64[BP]
        mov     AX,[SI]
        lea     SI,-70[BP]
        mov     [SI],AX
        jmp     SHORT .03DC
.03B4:                  ;149
        lea     SI,-74[BP]
        mov     AX,[SI]
        lea     SI,-74[BP]
        mov     [SI],AX
        lea     SI,-68[BP]
        mov     AX,[SI]
        lea     SI,-66[BP]
        mov     [SI],AX
        lea     SI,-72[BP]
        mov     AX,[SI]
        lea     SI,-76[BP]
        mov     [SI],AX
        lea     SI,-64[BP]
        mov     AX,[SI]
        lea     SI,-68[BP]
        mov     [SI],AX
.03DC:                  ;153
        jmp     .0488
.03DF:                  ;154
        lea     SI,-68[BP]
        mov     AX,[SI]
        lea     SI,-66[BP]
        add     AX,[SI]
        mov     DX,1
        mov     CX,DX
        sar     AX,CL
        lea     SI,-64[BP]
        mov     [SI],AX
        lea     SI,-64[BP]
        mov     AX,[SI]
        sub     AX,-62[BP]
        push    AX
        lea     SI,-52[BP]
        push    SI
        lea     SI,-54[BP]
        push    SI
        lea     SI,-80[BP]
        push    SI
        lea     SI,-82[BP]
        push    SI
        call    NPAM
        add     SP,10
        lea     SI,-64[BP]
        mov     AX,[SI]
        mov     -62[BP],AX
        push    WORD PTR -52[BP]
        push    WORD PTR -54[BP]
        push    WORD PTR -80[BP]
        push    WORD PTR -82[BP]
        call    MCBUF
        add     SP,8
        call    CORELATE
        lea     SI,-72[BP]
        mov     [SI],AX
        cmp     AX,0
        jge     .043E
        jmp     .074B
.043E:                  ;160
        lea     SI,-72[BP]
        lea     DI,-76[BP]
        mov     AX,[DI]
        cmp     AX,[SI]
        jle     .0474
        lea     SI,-76[BP]
        mov     AX,[SI]
        lea     SI,-78[BP]
        mov     [SI],AX
        lea     SI,-68[BP]
        mov     AX,[SI]
        lea     SI,-70[BP]
        mov     [SI],AX
        lea     SI,-72[BP]
        mov     AX,[SI]
        lea     SI,-76[BP]
        mov     [SI],AX
        lea     SI,-64[BP]
        mov     AX,[SI]
        lea     SI,-68[BP]
```

```
            mov     [SI],AX
            jmp     SHORT .0488
.0474:
                        ;163
            lea     SI,-72[BP]
            mov     AX,[SI]
            lea     SI,-74[BP]
            mov     [SI],AX
            lea     SI,-64[BP]
            mov     AX,[SI]
            lea     SI,-66[BP]
            mov     [SI],AX
.0488:
                        ;167
            jmp     .026C
.0488:
                        ;168
            lea     SI,-76[BP]
            lea     DI,-78[BP]
            mov     AX,[DI]
            cmp     AX,[SI]
            jg      ?3
            jmp     .074B
?3:
            lea     SI,-74[BP]
            lea     DI,-76[BP]
            mov     AX,[DI]
            cmp     AX,[SI]
            jl      ?4
            jmp     .074B
?4:
            lea     SI,-76[BP]
            mov     AX,[SI]
            cmp     AX,3600
            jl      5
            jmp     .074B
5:
            lea     SI,-60[BP]
            mov     AX,[SI]
            lea     SI,-70[BP]
            sub     AX,[SI]
            push    AX
            lea     SI,-78[BP]
            mov     AX,[SI]
            lea     SI,-76[BP]
            mov     DX,[SI]
            mov     BX,1
            mov     CX,BX
            shl     DX,CL
            sub     AX,DX
            lea     SI,-74[BP]
            add     AX,[SI]
            pop     BX
            cwd
            idiv    BX
            cmp     AX,17
            jg      ?6
            jmp     .074B
?6:
            lea     SI,-70[BP]
            mov     AX,[SI]
            lea     SI,-68[BP]
            add     AX,[SI]
            mov     DX,1
            mov     CX,DX
            sar     AX,CL
            mov     -8[BP],AX
            lea     SI,-68[BP]
            mov     AX,[SI]
            lea     SI,-66[BP]
            add     AX,[SI]
            mov     DX,1
            mov     CX,DX
            sar     AX,CL
            mov     -6[BP],AX
            lea     SI,-78[BP]
            mov     AX,[SI]
            lea     SI,-76[BP]
            sub     AX,[SI]
            mov     -4[BP],AX
            lea     SI,-76[BP]
            mov     AX,[SI]

lea     SI,-74[BP]
            sub     AX,[SI]
            mov     -2[BP],AX
            mov     AX,-6[BP]
            cwd
            push    DX
            push    AX
            mov     AX,-2[BP]
            sub     AX,-4[BP]
            cwd
            push    DX
            push    AX
            mov     AX,-6[BP]
            sub     AX,-8[BP]
            cwd
            push    DX
            push    AX
            mov     AX,-6[BP]
            cwd
            push    DX
            push    AX
            call    $LMUL
            pop     AX
            pop     DX
            push    DX
            push    AX
            call    $LSDIV
            pop     AX
            pop     DX
            pop     BX
            pop     CX
            sub     BX,AX
            sbb     CX,DX
            lea     SI,-64[BP]
            mov     [SI],BX
            lea     SI,-64[BP]
            mov     AX,[SI]
            sub     AX,-62[BP]
            push    AX
            lea     SI,-52[BP]
            push    SI
            lea     SI,-54[BP]
            push    SI
            lea     SI,-80[BP]
            push    SI
            lea     SI,-82[BP]
            push    SI
            call    NPAM
            add     SP,10
            mov     AX,182
            push    AX
            mov     AX,ICOURSE
            pop     BX
            cwd
            idiv    BX
            push    AX
            mov     AX,182
            push    AX
            mov     AX,-54[BP]
            mov     BX,IDRPX
            mov     CX,IDRPX+2
            push    CX
            push    BX
            mov     BX,16
            mov     CX,0
            push    CX
            push    BX
            call    $LRSSHIFT
            pop     BX
            pop     CX
            sub     AX,BX
            push    AX
            mov     AX,-52[BP]
            mov     BX,IDRPY
            mov     CX,IDRPY+2
            push    CX
            push    BX
            mov     BX,16
            mov     CX,0
            push    CX
```

```
push    BX
call    $LRSSHIFT
pop     BX
pop     CX
sub     AX,BX
push    AX
call    IATAN2
add     SP,4
pop     BX
cwd
idiv    BX
push    AX
push    WORD PTR -52[BP]
push    WORD PTR -54[BP]
mov     AX,IDRPY
mov     DX,IDRPY+2
push    DX
push    AX
mov     AX,16
mov     DX,0
push    DX
push    AX
call    $LRSSHIFT
pop     AX
pop     DX
push    AX
mov     AX,IDRPX
mov     DX,IDRPX+2
push    DX
push    AX
mov     AX,16
mov     DX,0
push    DX
push    AX
call    $LRSSHIFT
pop     AX
pop     DX
push    AX
lea     AX,@SW
push    AX
call    PRINTF
add     SP,14
mov     AX,-54[BP]
cwd
push    DX
push    AX
mov     AX,16
mov     DX,0
push    DX
push    AX
call    $LLSHIFT
pop     AX
pop     DX
mov     IDRPX,AX
mov     IDRPX+2,DX
mov     AX,-52[BP]
cwd
push    DX
push    AX
mov     AX,16
mov     DX,0
push    DX
push    AX
call    $LLSHIFT
pop     AX
pop     DX
mov     IDRPY,AX
mov     IDRPY+2,DX
mov     AX,-80[BP]
mov     STRCOOR,AX
mov     SI,STRCOO
mov     AX,+4[SI]
mov     SI,STRCOOR
sub     AX,[SI]
push    AX
mov     SI,STRCOOR
mov     AX,+6[SI]
mov     SI,STRCOOR
sub     AX,+2[SI]
push    AX call    IATAN2
add     SP,4
mov     -28[BP],AX
mov     AX,20
push    AX
push    WORD PTR -28[BP]
call    ICOS
add     SP,2
push    AX
call    ISMUL
add     SP,4
cwd
push    DX
push    AX
mov     AX,16
mov     DX,0
push    DX
push    AX
call    $LLSHIFT
pop     AX
pop     DX
mov     -36[BP],AX
mov     -34[BP],DX
mov     AX,20
push    AX
push    WORD PTR -28[BP]
call    ISIN
add     SP,2
push    AX
call    ISMUL
add     SP,4
cwd
push    DX
push    AX
mov     AX,16
mov     DX,0
push    DX
push    AX
call    $LLSHIFT
pop     AX
pop     DX
mov     -32[BP],AX
mov     -30[BP],DX
mov     SI,STRDAT
mov     AL,+1[SI]
cbw
push    AX
call    PRIORITY
add     SP,2
mov     -42[BP],AX
mov     AX,-42[BP]
imul    WORD PTR -42[BP]
add     AX,196
cwd
push    DX
push    AX
call    ISQRT
add     SP,4
push    AX
mov     AX,0
push    AX
mov     AX,-32[BP]
mov     DX,-30[BP]
neg     DX
neg     AX
sbb     DX,0
push    DX
push    AX
call    CVSLTSF
add     SP,4
push    DX
push    AX
push    WORD PTR -30[BP]
push    WORD PTR -32[BP]
call    CVSLTSF
add     SP,4
push    DX
push    AX
mov     AX,-36[BP]
mov     DX,-34[BP]
neg     DX
```

```
           neg     AX
           sbb     DX,0
           push    DX
           push    AX
           call    CVSLTSF
           add     SP,4
           push    DX
           push    AX
           push    WORD PTR -34[BP]
           push    WORD PTR -36[BP]
           call    CVSLTSF
           add     SP,4
           push    DX
           push    AX
           call    QEP_EXP
           add     SP,20
           mov     AX,1
           mov     SP,BP
           pop     BP
           ret
.074B:                     ;213
           mov     AX,0
           mov     STRDAT,AX
           mov     STRCOOR,AX
           mov     SP,BP
           pop     BP
           ret
BCORCALC   ENDP @CODE      ENDS
@CODE      SEGMENT BYTE PUBLIC 'CODE'
           include epilogue.h
           end @BIGMODEL  EQU     0
           include prologue.h
@CODE      ENDS
@DATAU     SEGMENT
           db      14 DUP (?)

public  NPAM
@DATAU     ENDS
@CODE      SEGMENT BYTE PUBLIC 'CODE'
@CODE      ENDS
           extrn   CVSFTSL:near extrn   CVSITSF:near extrn   SFADD:near extrn   SFSUB:near extrn   SFMUL:near extrn   SFDIV:near extrn   ISQRT:near extrn   @ABS:near extrn   CVSFTSI:near extrn   RSFTSI:near @CODE      SEGMENT BYTE PUBLIC 'CODE'
NPAM       PROC    NEAR
@CODE      ENDS
           extrn   $LMUL:near @CODE      SEGMENT BYTE PUBLIC 'CODE'
.00:                       ;41
           push    BP
           mov     BP,SP
           sub     SP,24
           mov     SI,+4[BP]
           mov     SI,+4[SI]
           mov     -24[BP],SI
           mov     AX,+10[BP]
           mov     -18[BP],AX
           push    WORD PTR +10[BP]
           call    CVSITSF
           add     SP,2
           mov     -8[BP],AX
           mov     -6[BP],DX
           mov     -4[BP],AX
           mov     -2[BP],DX
           mov     SI,+4[BP]
           mov     SI,[SI]
           mov     DI,+4[BP]
           mov     DI,[DI]
           add     SI,+8[DI]
           mov     DI,+4[BP]
           mov     DI,+2[DI]
           add     SI,+4[DI]
           mov     -20[BP],SI
.045:
           mov     AX,1
           or      AX,AX
           jne     ?1
           jmp     .0333
?1:
           mov     SI,-24[BP]
           mov     AX,[SI]
           cmp     AX,@UW+2
           je      .05A
           jmp     SHORT .066
.05A:                      ;80
           mov     SI,-24[BP]
           mov     AX,+2[SI]
           cmp     AX,@UW+4
           je      .068
.066:                      ;80
           jmp     SHORT .074
.068:                      ;80
           mov     SI,-24[BP]
           mov     AX,+5[SI]
           cmp     AX,@UW+6
           je      .076
.074:                      ;80
           jmp     SHORT .085
.076:                      ;80
           mov     SI,-24[BP]
           mov     AX,+7[SI]
           cmp     AX,@UW+8
           jne     ?2
           jmp     .0FE
?2:
.085:                      ;80
           mov     SI,-24[BP]
           mov     AX,[SI]
           mov     @UW+2,AX
           mov     SI,-24[BP]
           mov     AX,+2[SI]
           mov     @UW+4,AX
           mov     SI,-24[BP]
           mov     AX,+5[SI]
           mov     @UW+6,AX
           mov     SI,-24[BP]
           mov     AX,+7[SI]
           mov     @UW+8,AX
           mov     AX,@UW+6
           sub     AX,@UW+2
           mov     @UW+10,AX
           mov     AX,@UW+8
           sub     AX,@UW+4
           mov     @UW+12,AX
           mov     AX,@UW+10
           cwd
           push    DX
           push    AX
           mov     AX,@UW+10
           cwd
           push    DX
           push    AX
           call    $LMUL
           pop     AX
           pop     DX
           push    DX
           push    AX
```

```
              mov     AX,@UW+12
              cwd
              push    DX
              push    AX
              mov     AX,@UW+12
              cwd
              push    DX
              push    AX
              call    $LMUL
              pop     AX
              pop     DX
              pop     BX
              pop     CX
              add     BX,AX
              adc     CX,DX
              push    CX
              push    BX
              call    ISQRT
              add     SP,4
              mov     @UW,AX
.0FE:                                 ;93
              push    WORD PTR @UW+12
              call    @ABS
              add     SP,2
              push    AX
              push    WORD PTR @UW+10
              call    @ABS
              add     SP,2
              pop     DX
              cmp     AX,DX
              jle     .0152
              push    WORD PTR @UW
              call    CVSITSF
              add     SP,2
              push    DX
              push    AX
              push    WORD PTR @UW+10
              call    CVSITSF
              add     SP,2
              push    DX
              push    AX
              mov     SI,+6[BP]
              mov     AX,[SI]
              sub     AX,@UW+2
              push    AX
              call    CVSITSF
              add     SP,2
              push    DX
              push    AX
              call    SFDIV
              add     SP,8
              push    DX
              push    AX
              call    SFMUL
              add     SP,8
              jmp     SHORT .018A
.0152:                                ;97
              push    WORD PTR @UW
              call    CVSITSF
              add     SP,2
              push    DX
              push    AX
              push    WORD PTR @UW+12
              call    CVSITSF
              add     SP,2
              push    DX
              push    AX
              mov     SI,+8[BP]
              mov     AX,[SI]
              sub     AX,@UW+4
              push    AX
              call    CVSITSF
              add     SP,2
              push    DX
              push    AX
              call    SFDIV
              add     SP,8
              push    DX
              push    AX
              call    SFMUL
              add     SP,8
.018A:                                ;97
              mov     -16[BP],AX
              mov     -14[BP],DX
              push    WORD PTR -6[BP]
              push    WORD PTR -8[BP]
              push    WORD PTR -14[BP]
              push    WORD PTR -16[BP]
              call    SFADD
              add     SP,8
              mov     -12[BP],AX
              mov     -10[BP],DX
              push    WORD PTR -10[BP]
              push    WORD PTR -12[BP]
              call    CVSFTSI
              add     SP,4
              cmp     AX,0
              jge     .0212
              mov     AX,@UW+2
              mov     SI,+6[BP]
              mov     [SI],AX
              mov     AX,@UW+4
              mov     SI,+8[BP]
              mov     [SI],AX
              mov     AX,-12[BP]
              mov     DX,-10[BP]
              mov     -8[BP],AX
              mov     -6[BP],DX
              mov     AX,-24[BP]
              mov     -22[BP],AX
              sub     AX,5
              cmp     AX,-20[BP]
              jae     .0203
              push    WORD PTR -6[BP]
              push    WORD PTR -8[BP]
              push    WORD PTR -2[BP]
              push    WORD PTR -4[BP]
              call    SFSUB
              add     SP,8
              push    DX
              push    AX
              call    RSFTSI
              add     SP,4
              mov     SP,BP
              pop     BP
              ret
.0203:                                ;109
              mov     AX,-24[BP]
              mov     -22[BP],AX
              sub     AX,5
              mov     -24[BP],AX
              jmp     .0330
.0212:                                ;110
              push    WORD PTR -10[BP]
              push    WORD PTR -12[BP]
              call    CVSFTSI
              add     SP,4
              cmp     AX,@UW
              jg      ?3
              jmp     .02AF
?3:
              mov     AX,@UW+6
              mov     SI,+6[BP]
              mov     [SI],AX
              mov     AX,@UW+8
              mov     SI,+8[BP]
              mov     [SI],AX
              push    WORD PTR @UW
              call    CVSITSF
              add     SP,2
              push    DX
              push    AX
              push    WORD PTR -10[BP]
              push    WORD PTR -12[BP]
              call    SFSUB
              add     SP,8
```

```
        mov     -8[BP],AX
        mov     -6[BP],DX
        mov     AX,-24[BP]
        mov     -22[BP],AX
        add     AX,5
        push    AX
        mov     AX,-20[BP]
        push    AX
        mov     BX,5
        mov     SI,+4[BP]
        mov     SI,+2[SI]
        mov     AL,+2[SI]
        and     AX,255
        mul     BX
        pop     SI
        add     SI,AX
        sub     SI,5
        pop     DI
        cmp     SI,DI
        ja      .02A0
        push    WORD PTR -6[BP]
        push    WORD PTR -8[BP]
        push    WORD PTR -2[BP]
        push    WORD PTR -4[BP]
        call    SFSUB
        add     SP,8
        push    DX
        push    AX
        call    RSFTSI
        add     SP,4
        mov     SP,BP
        pop     BP
        ret
.02A0:                          ;118
        mov     AX,-24[BP]
        mov     -22[BP],AX
        add     AX,5
        mov     -24[BP],AX
        jmp     .0330
.02AF:                          ;119
        push    WORD PTR -10[BP]
        push    WORD PTR -12[BP]
        push    WORD PTR @UW
        call    CVSITSF
        add     SP,2
        push    DX
        push    AX
        push    WORD PTR @UW+10
        call    CVSITSF
        add     SP,2
        push    DX
        push    AX
        call    SFDIV
        add     SP,8
        push    DX
        push    AX
        call    SFMUL
        add     SP,8
        push    DX
        push    AX
        call    RSFTSI
        add     SP,4
        add     AX,@UW+2
        mov     SI,+6[BP]
        mov     [SI],AX
        push    WORD PTR -10[BP]
        push    WORD PTR -12[BP]
        push    WORD PTR @UW
        call    CVSITSF
        add     SP,2
        push    DX
        push    AX
        push    WORD PTR @UW+12
        call    CVSITSF
        add     SP,2
        push    DX
        push    AX
        call    SFDIV
        add     SP,8
        push    DX
        push    AX
        call    SFMUL
        add     SP,8
        push    DX
        push    AX
        call    RSFTSI
        add     SP,4
        add     AX,@UW+4
        mov     SI,+8[BP]
        mov     [SI],AX
        mov     AX,-18[BP]
        mov     SP,BP
        pop     BP
        ret
.0330:                          ;129
        jmp     .043
.0333:                          ;130
        mov     SP,BP
        pop     BP
        ret
NFAM    ENDP @CODE   ENDS
@CODE   SEGMENT BYTE PUBLIC 'CODE'
        include epiloque.h
        end @BIGMODEL       EQU     0
        include proloque.h public  MCBUF
@CODE   ENDS
@DATAB  SEGMENT
        extrn   ICOURSE:word extrn   HIST:word @DATAB  ENDS
@CODE   SEGMENT BYTE PUBLIC 'CODE'
@CODE   ENDS
        extrn   IATAN2:near extrn   ISQRT:near @CODE   SEGMENT BYTE PUBLIC 'CODE'
MCBUF   PROC    NEAR
@CODE   ENDS
        extrn   $LMUL:near @CODE   SEGMENT BYTE PUBLIC 'CODE'
.00:                            ;36
        push    BP
        mov     BP,SP
        sub     SP,24
        mov     SI,+4[BP]
        mov     SI,+4[SI]
        mov     -18[BP],SI
        mov     -16[BP],SI
        mov     AX,0
        mov     HIST+4,AX
        mov     SI,-18[BP]
        mov     AX,+5[SI]
        mov     SI,-18[BP]
        sub     AX,[SI]
        push    AX
        mov     SI,-18[BP]
        mov     AX,+7[SI]
        mov     SI,-18[BP]
        sub     AX,+2[SI]
        push    AX
        call    IATAN2
        add     SP,4
        mov     -10[BP],AX
        mov     AX,-10[BP]
        mov     -8[BP],AX
        mov     AX,-1
        mov     -12[BP],AX
        mov     AX,-10[BP]
        sub     AX,ICOURSE
        cmp     AX,16384
        jle     .056
        jmp     SHORT .063
.056:                           ;76
```

```
        mov     AX,-10[BP]
        sub     AX,ICOURSE
        cmp     AX,-16384
        jge     .07C
.063:                           ;76
        mov     AX,1
        mov     -12[BP],AX
        add     WORD PTR -16[BP],5
        mov     AX,-32768
        mov     DX,-1
        mov     BX,-8[BP]
        add     BX,AX
        mov     -8[BP],BX
.07C:                           ;84
        mov     AX,0
        mov     -6[BP],AX
        mov     -4[BP],AX
        mov     SI,+4[BP]
        mov     SI,[SI]
        mov     DI,+4[BP]
        mov     DI,[DI]
        add     SI,+8[DI]
        mov     DI,+4[BP]
        mov     DI,+2[DI]
        add     SI,+4[DI]
        mov     -14[BP],SI
.09E:                           ;93
        mov     AX,-16[BP]
        cmp     AX,-14[BP]
        jae     ?1
        jmp     .020D
?1:
        mov     AX,-14[BP]
        push    AX
        mov     BX,5
        mov     SI,+4[BP]
        mov     SI,+2[SI]
        mov     AL,+2[SI]
        and     AX,255
        mul     BX
        pop     SI
        add     SI,AX
        sub     SI,5
        cmp     SI,-16[BP]
        jae     ?2
        jmp     .020D
?2:
        mov     SI,-16[BP]
        mov     BX,5
        mov     AX,-12[BP]
        imul    BX
        sub     SI,AX
        mov     AX,[SI]
        mov     SI,-16[BP]
        sub     AX,[SI]
        push    AX
        mov     SI,-16[BP]
        mov     BX,5
        mov     AX,-12[BP]
        imul    BX
        sub     SI,AX
        mov     AX,+2[SI]
        mov     SI,-16[BP]
        sub     AX,+2[SI]
        push    AX
        call    IATAN2
        add     SP,4
        mov     -10[BP],AX
        mov     SI,-16[BP]
        mov     AX,+2[SI]
        sub     AX,+8[BP]
        cwd
        push    DX
        push    AX
        mov     SI,-16[BP]
        mov     AX,+2[SI]
        sub     AX,+8[BP]
        cwd
        push    DX
        push    AX
        call    $LMUL
        pop     AX
        pop     DX
        push    DX
        push    AX
        mov     SI,-16[BP]
        mov     AX,[SI]
        sub     AX,+6[BP]
        cwd
        push    DX
        push    AX
        mov     SI,-16[BP]
        mov     AX,[SI]
        sub     AX,+6[BP]
        cwd
        push    DX
        push    AX
        call    $LMUL
        pop     AX
        pop     DX
        pop     BX
        pop     CX
        add     BX,AX
        adc     CX,DX
        push    CX
        push    BX
        call    ISQRT
        add     SP,4
        mov     -2[BP],AX
        mov     AX,-2[BP]
        add     -4[BP],AX
.0153:                          ;113
        lea     AX,HIST+134
        mov     DX,HIST+2
        shl     DX,1
        add     AX,DX
        mov     SI,AX
        mov     AX,[SI]
        push    AX
        lea     AX,HIST+134
        push    AX
        mov     AX,16
        push    AX
        mov     AX,HIST+2
        add     AX,-6[BP]
        pop     BX
        cwd
        idiv    BX
        shl     DX,1
        pop     SI
        add     SI,DX
        pop     AX
        sub     AX,[SI]
        mov     -24[BP],AX
        cmp     AX,-4[BP]
        jge     .01E9
        mov     AX,-24[BP]
        cmp     AX,+10[BP]
        jge     .01E9
        mov     AX,-10[BP]
        mov     DX,-10[BP]
        sub     DX,-8[BP]
        mov     BX,1
        mov     CX,BX
        sar     DX,CL
        sub     AX,DX
        lea     DX,HIST+70
        mov     BX,-6[BP]
        shl     BX,1
        add     DX,BX
        mov     SI,DX
        mov     [SI],AX
        mov     AX,-10[BP]
        mov     -8[BP],AX
        mov     AX,-6[BP]
        add     AX,1
        mov     HIST+4,AX
        mov     AX,HIST+4
        cmp     AX,+12[BP]
        jl      .01CC
```

```
        jmp     SHORT .020D
.01CC:                          ;122
        mov     AX,16
        push    AX
        mov     AX,HIST+2
        add     AX,-6[BP]
        pop     BX
        cwd
        idiv    BX
        cmp     DX,HIST
        jne     .01E3
        jmp     SHORT .020D
.01E3:                          ;124
        inc     WORD PTR -6[BP]
        jmp     .0153
.01E9:                          ;126
        mov     SI,-16[BP]
        mov     AX,[SI]
        mov     +6[BP],AX
        mov     SI,-16[BP]
        mov     AX,+2[SI]
        mov     +8[BP],AX
        mov     BX,5
        mov     AX,-12[BP]
        imul    BX
        mov     DX,-16[BP]
        add     DX,AX
        mov     -16[BP],DX
        jmp     .09E
.020D:                          ;131
        mov     SP,BP
        pop     BP
        ret
MCBUF   ENDP @CODE   ENDS
@CODE   SEGMENT BYTE PUBLIC 'CODE'
        include epilogue.h
        end -@BIGMODEL       EQU     0
        include prologue.h public  CORELATE
@CODE   ENDS
@DATAB  SEGMENT
        extrn   HIST:word @DATAB  ENDS
@CODE   SEGMENT BYTE PUBLIC 'CODE'
@CODE   ENDS
        extrn   ISQRT:near @CODE   SEGMENT BYTE PUBLIC 'CODE'
CORELATE        PROC    NEAR
@CODE   ENDS
        extrn   $LSDIV:near extrn   $LLSHIFT:near @CODE   SEGMENT BYTE PUBLIC 'CODE'
.00:                            ;17
        push    BP
        mov     BP,SP
        sub     SP,14
        mov     AX,0
        mov     DX,0
        mov     -8[BP],AX
        mov     -6[BP],DX
        mov     AX,0
        mov     -14[BP],AX
        mov     AX,HIST+2
        mov     -12[BP],AX
.01F:                           ;37
        lea     AX,HIST+6
        mov     DX,-12[BP]
        shl     DX,1
        add     AX,DX
        mov     SI,AX
        mov     AX,[SI]

lea     DX,HIST+70
        mov     BX,-14[BP]
        shl     BX,1
        add     DX,BX
        mov     SI,DX
        sub     AX,[SI]
        mov     DX,8
        mov     CX,DX
        sar     AX,CL
        mov     -4[BP],AX
        mov     AX,-4[BP]
        imul    WORD PTR -4[BP]
        cwd
        mov     BX,-8[BP]
        mov     CX,-6[BP]
        add     BX,AX
        adc     CX,DX
        mov     -8[BP],BX
        mov     -6[BP],CX
        mov     AX,-12[BP]
        mov     -10[BP],AX
        mov     AX,16
        push    AX
        inc     WORD PTR -12[BP]
        mov     AX,-12[BP]
        pop     BX
        cwd
        idiv    BX
        mov     -12[BP],DX
.075:                           ;43
        inc     WORD PTR -14[BP]
        mov     AX,-14[BP]
        cmp     AX,HIST+4
        jge     .08C
        mov     AX,HIST
        cmp     AX,-10[BP]
        je      .08C
        jmp     SHORT .01F
.08C:                           ;43
        mov     AX,-14[BP]
        cwd
        push    DX
        push    AX
        push    WORD PTR -6[BP]
        push    WORD PTR -8[BP]
        call    $LSDIV
        pop     AX
        pop     DX
        push    DX
        push    AX
        mov     AX,16
        mov     DX,0
        push    DX
        push    AX
        call    $LLSHIFT
        pop     AX
        pop     DX
        push    DX
        push    AX
        call    ISQRT
        add     SP,4
        mov     SP,BP
        pop     BP
        ret
CORELATE        ENDP @CODE   ENDS
@CODE   SEGMENT BYTE PUBLIC 'CODE'
        include epilogue.h
        end @BIGMODEL       EQU     0
        include prologue.h public  IPTDIST
@CODE   ENDS
        extrn   CVSFTSL:near extrn   SFADD:near
```

```
        extrn   SFSUB:near
        extrn   SFMUL:near
        extrn   SFDIV:near
        extrn   ISQRT:near
GCODE   SEGMENT BYTE PUBLIC 'CODE'
IPTDIST PROC    NEAR
.00:                    ;21
        push    BP
        mov     BP,SP
        sub     SP,28
        push    WORD PTR +20[BP]
        push    WORD PTR +18[BP]
        push    WORD PTR +24[BP]
        push    WORD PTR +22[BP]
        call    SFSUB
        add     SP,8
        mov     -8[BP],AX
        mov     -6[BP],DX
        push    WORD PTR +6[BP]
        push    WORD PTR +4[BP]
        push    WORD PTR +10[BP]
        push    WORD PTR +8[BP]
        call    SFSUB
        add     SP,8
        mov     -4[BP],AX
        mov     -2[BP],DX
        push    WORD PTR -2[BP]
        push    WORD PTR -4[BP]
        push    WORD PTR -2[BP]
        push    WORD PTR -4[BP]
        call    SFMUL
        add     SP,8
        push    DX
        push    AX
        push    WORD PTR -6[BP]
        push    WORD PTR -8[BP]
        push    WORD PTR -6[BP]
        push    WORD PTR -8[BP]
        call    SFMUL
        add     SP,8
        push    DX
        push    AX
        call    SFADD
        add     SP,8
        mov     -20[BP],AX
        mov     -18[BP],DX
        push    WORD PTR -6[BP]
        push    WORD PTR -8[BP]
        push    WORD PTR -6[BP]
        push    WORD PTR -8[BP]
        call    SFMUL
        add     SP,8
        push    DX
        push    AX
        push    WORD PTR -2[BP]
        push    WORD PTR -4[BP]
        push    WORD PTR +14[BP]
        push    WORD PTR +12[BP]
        call    SFMUL
        add     SP,8
        push    DX
        push    AX
        call    SFADD
        add     SP,8
        mov     -16[BP],AX
        mov     -14[BP],DX
        push    WORD PTR +24[BP]
        push    WORD PTR +22[BP]
        push    WORD PTR +6[BP]
        push    WORD PTR +4[BP]
        call    SFMUL
        add     SP,8
        push    DX
        push    AX
        push    WORD PTR +20[BP]
        push    WORD PTR +18[BP]
        push    WORD PTR +10[BP]
        push    WORD PTR +8[BP]
        call    SFMUL
        add     SP,8
        push    DX
        push    AX
        call    SFSUB
        add     SP,8
        mov     -12[BP],AX
        mov     -10[BP],DX
        push    WORD PTR -18[BP]
        push    WORD PTR -20[BP]
        push    WORD PTR -10[BP]
        push    WORD PTR -12[BP]
        push    WORD PTR -6[BP]
        push    WORD PTR -8[BP]
        call    SFMUL
        add     SP,8
        push    DX
        push    AX
        push    WORD PTR -14[BP]
        push    WORD PTR -16[BP]
        push    WORD PTR -2[BP]
        push    WORD PTR -4[BP]
        call    SFMUL
        add     SP,8
        push    DX
        push    AX
        call    SFSUB
        add     SP,8
        push    DX
        push    AX
        call    SFDIV
        add     SP,8
        mov     -28[BP],AX
        mov     -26[BP],DX
        push    WORD PTR -18[BP]
        push    WORD PTR -20[BP]
        push    WORD PTR -16[BP]
        push    WORD PTR -6[BP]
        push    WORD PTR -8[BP]
        call    SFMUL
        add     SP,8
        push    DX
        push    AX
        push    WORD PTR -10[BP]
        push    WORD PTR -12[BP]
        push    WORD PTR -2[BP]
        push    WORD PTR -4[BP]
        call    SFMUL
        add     SP,8
        push    DX
        push    AX
        call    SFADD
        add     SP,8
        push    DX
        push    AX
        call    SFDIV
        add     SP,8
        mov     -24[BP],AX
        mov     -22[BP],DX
        push    WORD PTR +14[BP]
        push    WORD PTR +12[BP]
        push    WORD PTR -26[BP]
        push    WORD PTR -28[BP]
        call    SFSUB
        add     SP,8
        mov     -20[BP],AX
        mov     -18[BP],DX
        push    WORD PTR +28[BP]
        push    WORD PTR +26[BP]
        push    WORD PTR -22[BP]
        push    WORD PTR -24[BP]
        call    SFSUB
        add     SP,8
```

```
        mov     -16[BP],AX
        mov     -14[BP],DX
        push    WORD PTR -14[BP]
        push    WORD PTR -16[BP]
        push    WORD PTR -14[BP]
        push    WORD PTR -16[BP]
        call    SFMUL
        add     SP,8
        push    DX
        push    AX
        push    WORD PTR -18[BP]
        push    WORD PTR -20[BP]
        push    WORD PTR -18[BP]
        push    WORD PTR -20[BP]
        call    SFMUL
        add     SP,8
        push    DX
        push    AX
        call    SFADD
        add     SP,8
        mov     -20[BP],AX
        mov     -18[BP],DX
        mov     AX,-28[BP]
        mov     DX,-26[BP]
        mov     SI,+16[BP]
        mov     [SI],AX
        mov     +2[SI],DX
        mov     AX,-24[BP]
        mov     DX,-22[BP]
        mov     SI,+20[BP]
        mov     [SI],AX
        mov     +2[SI],DX
        push    WORD PTR -18[BP]
        push    WORD PTR -20[BP]
        mov     AX,127
        mov     DX,-32768
        push    DX
        push    AX
        call    SFADD
        add     SP,8
        push    DX
        push    AX
        call    CVSFISL
        add     SP,4
        push    DX
        push    AX
        call    ISQRT
        add     SP,4
        mov     SP,BP
        pop     BP
        ret
IPTDIST ENDP @CODE   ENDS
@CODE   SEGMENT BYTE PUBLIC 'CODE'
        include epilogue.h
        end
@BIGMODEL       EQU     0
        include prologue.h public  QEP_MOD
@CODE   ENDS
@DATAB  SEGMENT
        extrn   IQEPX:word extrn   IQEPY:word extrn   IDRPX:word extrn   IDRPY:word extrn   STRDAT:word @DATAB  ENDS
@CODE   SEGMENT BYTE PUBLIC 'CODE'
@CODE   ENDS
        extrn   SFADD:near extrn   SFMUL:near extrn   CVSLTSF:near extrn   CVSITSF:near extrn   CVSFTSL:near extrn   IPTDIST:near extrn   SFINCLSV:near extrn   SFCMP:near extrn   PRIORITY:near extrn   QEP_EXP:near extrn   ISQRT:near @CODE   SEGMENT BYTE PUBLIC 'CODE'
QEP_MOD PROC    NEAR
@CODE   ENDS
        extrn   $LLSHIFT:near @CODE   SEGMENT BYTE PUBLIC 'CODE'
.00:                            ;42
        push    BP
        mov     BP,SP
        sub     SP,114
        mov     AX,0
        mov     -114[BP],AX
.0C:                            ;71
        cmp     WORD PTR -114[BP],4
        jge     .06A
        lea     SI,IQEPX
        mov     AX,-114[BP]
        shl     AX,1
        shl     AX,1
        add     SI,AX
        push    WORD PTR +2[SI]
        push    WORD PTR [SI]
        call    CVSLTSF
        add     SP,4
        lea     SI,-40[BP]
        mov     BX,-114[BP]
        shl     BX,1
        shl     BX,1
        add     SI,BX
        mov     [SI],AX
        mov     +2[SI],DX
        lea     SI,IQEPY
        mov     AX,-114[BP]
        shl     AX,1
        shl     AX,1
        add     SI,AX
        push    WORD PTR +2[SI]
        push    WORD PTR [SI]
        call    CVSLTSF
        add     SP,4
        lea     SI,-24[BP]
        mov     BX,-114[BP]
        shl     BX,1
        shl     BX,1
        add     SI,BX
        mov     [SI],AX
        mov     +2[SI],DX
.065:                           ;74
        inc     WORD PTR -114[BP]
        jmp     SHORT .0C
.06A:                           ;74
        mov     SI,+4[BP]
        mov     AX,[SI]
        cwd
        push    DX
        push    AX
        mov     AX,16
        mov     DX,0
        push    DX
        push    AX
        call    $LLSHIFT
```

```
pop     AX
pop     DX
sub     AX,IDRPX
sbb     DX,IDRPX+2
push    DX
push    AX
call    CVSLTSF
add     SP,4
mov     -56[BP],AX
mov     -54[BP],DX
mov     SI,+4[BP]
mov     AX,+4[SI]
cwd
push    DX
push    AX
mov     AX,16
mov     DX,0
push    DX
push    AX
call    $LLSHIFT
pop     AX
pop     DX
sub     AX,IDRPX
sbb     DX,IDRPX+2
push    DX
push    AX
call    CVSLTSF
add     SP,4
mov     -48[BP],AX
mov     -46[BP],DX
mov     SI,+4[BP]
mov     AX,+2[SI]
cwd
push    DX
push    AX
mov     AX,16
mov     DX,0
push    DX
push    AX
call    $LLSHIFT
pop     AX
pop     DX
sub     AX,IDRPY
sbb     DX,IDRPY+2
push    DX
push    AX
call    CVSLTSF
add     SP,4
mov     -52[BP],AX
mov     -50[BP],DX
mov     SI,+4[BP]
mov     AX,+6[SI]
cwd
push    DX
push    AX
mov     AX,16
mov     DX,0
push    DX
push    AX
call    $LLSHIFT
pop     AX
pop     DX
sub     AX,IDRPY
sbb     DX,IDRPY+2
push    DX
push    AX
call    CVSLTSF
add     SP,4
mov     -44[BP],AX
mov     -42[BP],DX
lea     SI,-100[BP]
push    SI
mov     AX,0
cwd
push    DX
push    AX
push    WORD PTR -42[BP]
push    WORD PTR -44[BP]
push    WORD PTR -50[BP]
push    WORD PTR -52[BP]
lea     SI,-104[BP]
push    SI
mov     AX,0
cwd
push    DX
push    AX
push    WORD PTR -46[BP]
push    WORD PTR -48[BP]
push    WORD PTR -54[BP]
push    WORD PTR -56[BP]
call    IPTDIST
add     SP,28
push    WORD PTR -8[BP]
push    WORD PTR -100[BP]
push    WORD PTR -42[BP]
push    WORD PTR -44[BP]
push    WORD PTR -50[BP]
push    WORD PTR -52[BP]
push    WORD PTR -102[BP]
push    WORD PTR -104[BP]
push    WORD PTR -46[BP]
push    WORD PTR -48[BP]
push    WORD PTR -54[BP]
push    WORD PTR -56[BP]
call    SFINCLSV
add     SP,24
or      AX,AX
jne     ?1
jmp     .0580
?1:
mov     AX,511
mov     DX,-1
mov     -64[BP],AX
mov     -62[BP],DX
mov     AX,255
mov     DX,-1
mov     -60[BP],AX
mov     -58[BP],DX
mov     SI,+4[BP]
mov     DI,+4[BP]
mov     AX,[DI]
cmp     AX,+4[SI]
jne     ?2
jmp     .0300
?2:
mov     AX,0
mov     -114[BP],AX
.01AA:                  ;103
cmp     WORD PTR -114[BP],4
jl      ?3
jmp     .02FD
?3:
lea     AX,-80[BP]
mov     DX,-114[BP]
shl     DX,1
shl     DX,1
add     AX,DX
push    AX
mov     AX,127
mov     DX,-32768
push    DX
push    AX
lea     SI,-24[BP]
mov     AX,4
push    AX
mov     AX,-114[BP]
add     AX,1
pop     BX
cwd
idiv    BX
shl     DX,1
shl     DX,1
add     SI,DX
push    WORD PTR +2[SI]
push    WORD PTR [SI]
lea     SI,-24[BP]
mov     AX,-114[BP]
```

```
shl     AX,1
shl     AX,1
add     SI,AX
push    WORD PTR +2[SI]
push    WORD PTR [SI]
call    SFADD
add     SP,8
push    DX
push    AX
call    SFMUL
add     SP,8
push    DX
push    AX
push    WORD PTR -42[BP]
push    WORD PTR -44[BP]
push    WORD PTR -50[BP]
push    WORD PTR -52[BP]
lea     AX,-96[BP]
mov     DX,-114[BP]
shl     DX,1
shl     DX,1
add     AX,DX
push    AX
mov     AX,127
mov     DX,-32768
push    DX
push    AX
lea     SI,-40[BP]
mov     AX,4
push    AX
mov     AX,-114[BP]
add     AX,1
pop     BX
cwd
idiv    BX
shl     DX,1
shl     DX,1
add     SI,DX
push    WORD PTR +2[SI]
push    WORD PTR [SI]
lea     SI,-40[BP]
mov     AX,-114[BP]
shl     AX,1
shl     AX,1
add     SI,AX
push    WORD PTR +2[SI]
push    WORD PTR [SI]
call    SFADD
add     SP,8
push    DX
push    AX
call    SFMUL
add     SP,8
push    DX
push    AX
push    WORD PTR -46[BP]
push    WORD PTR -48[BP]
push    WORD PTR -54[BP]
push    WORD PTR -56[BP]
call    IPTDIST
add     SP,28
mov     -108[BP],AX
push    WORD PTR -58[BP]
push    WORD PTR -60[BP]
lea     SI,-96[BP]
mov     AX,-114[BP]
shl     AX,1
shl     AX,1
add     SI,AX
push    WORD PTR +2[SI]
push    WORD PTR [SI]
call    SFCMP
add     SP,8
cmp     AX,-1
jne     .02B8
mov     AX,-114[BP]
mov     -112[BP],AX
lea     SI,-96[BP]
mov     AX,-114[BP]
shl     AX,1
shl     AX,1
add     SI,AX
mov     AX,[SI]
mov     DX,+2[SI]
mov     -60[BP],AX
mov     -58[BP],DX
.02B8:                  ;115
push    WORD PTR -62[BP]
push    WORD PTR -64[BP]
lea     SI,-96[BP]
mov     AX,-114[BP]
shl     AX,1
shl     AX,1
add     SI,AX
push    WORD PTR +2[SI]
push    WORD PTR [SI]
call    SFCMP
add     SP,8
cmp     AX,1
jne     .02F7
mov     AX,-114[BP]
mov     -110[BP],AX
lea     SI,-96[BP]
mov     AX,-114[BP]
shl     AX,1
shl     AX,1
add     SI,AX
mov     AX,[SI]
mov     DX,+2[SI]
mov     -64[BP],AX
mov     -62[BP],DX
.02F7:                  ;119
inc     WORD PTR -114[BP]
jmp     .01AA
.02FD:                  ;119
jmp     .0459
.0300:                  ;120
mov     AX,0
mov     -114[BP],AX
.0306:                  ;121
cmp     WORD PTR -114[BP],4
jl      ?4
jmp     .0459
?4:
lea     AX,-80[BP]
mov     DX,-114[BP]
shl     DX,1
shl     DX,1
add     AX,DX
push    AX
mov     AX,127
mov     DX,-32768
push    DX
push    AX
lea     SI,-24[BP]
mov     AX,4
push    AX
mov     AX,-114[BP]
add     AX,1
pop     BX
cwd
idiv    BX
shl     DX,1
shl     DX,1
add     SI,DX
push    WORD PTR +2[SI]
push    WORD PTR [SI]
lea     SI,-24[BP]
mov     AX,-114[BP]
shl     AX,1
shl     AX,1
add     SI,AX
push    WORD PTR +2[SI]
push    WORD PTR [SI]
call    SFADD
add     SP,8
push    DX
push    AX
call    SFMUL
```

```
        add     SP,8
        push    DX
        push    AX
        push    WORD PTR -42[BP]
        push    WORD PTR -44[BP]
        push    WORD PTR -50[BP]
        push    WORD PTR -52[BP]
        lea     AX,-96[BP]
        mov     DX,-114[BP]
        shl     DX,1
        shl     DX,1
        add     AX,DX
        push    AX
        mov     AX,127
        mov     DX,-32768
        push    DX
        push    AX
        lea     SI,-40[BP]
        mov     AX,4
        push    AX
        mov     AX,-114[BP]
        add     AX,1
        pop     BX
        cwd
        idiv    BX
        shl     DX,1
        shl     DX,1
        add     SI,DX
        push    WORD PTR +2[SI]
        push    WORD PTR [SI]
        lea     SI,-40[BP]
        mov     AX,-114[BP]
        shl     AX,1
        shl     AX,1
        add     SI,AX
        push    WORD PTR +2[SI]
        push    WORD PTR [SI]
        call    SFADD
        add     SP,8
        push    DX
        push    AX
        call    SFMUL
        add     SP,8
        push    DX
        push    AX
        push    WORD PTR -46[BP]
        push    WORD PTR -48[BP]
        push    WORD PTR -54[BP]
        push    WORD PTR -56[BP]
        call    IPTDIST
        add     SP,28
        mov     -108[BP],AX
        push    WORD PTR -58[BP]
        push    WORD PTR -60[BP]
        lea     SI,-80[BP]
        mov     AX,-114[BP]
        shl     AX,1
        shl     AX,1
        add     SI,AX
        push    WORD PTR +2[SI]
        push    WORD PTR [SI]
        call    SFCMP
        add     SP,8
        cmp     AX,-1
        jne     .0414
        mov     AX,-114[BP]
        mov     -112[BP],AX
        lea     SI,-80[BP]
        mov     AX,-114[BP]
        shl     AX,1
        shl     AX,1
        add     SI,AX
        mov     AX,[SI]
        mov     DX,+2[SI]
        mov     -60[BP],AX
        mov     -58[BP],DX
.0414:                          ;133
        push    WORD PTR -62[BP]
        push    WORD PTR -64[BP]
        lea     SI,-80[BP]
        mov     AX,-114[BP]
        shl     AX,1
        shl     AX,1
        add     SI,AX
        push    WORD PTR +2[SI]
        push    WORD PTR [SI]
        call    SFCMP
        add     SP,8
        cmp     AX,1
        jne     .0453
        mov     AX,-114[BP]
        mov     -110[BP],AX
        lea     SI,-80[BP]
        mov     AX,-114[BP]
        shl     AX,1
        shl     AX,1
        add     SI,AX
        mov     AX,[SI]
        mov     DX,+2[SI]
        mov     -64[BP],AX
        mov     -62[BP],DX
.0453:                          ;137
        inc     WORD PTR -114[BP]
        jmp     .0306
.0457:                          ;138
        mov     SI,STRUA
        mov     AL,+1[SI]
        cbw
        push    AX
        call    PRIORITY
        add     SP,2
        mov     -106[BP],AX
        mov     AX,-106[BP]
        imul    WORD PTR -106[BP]
        add     AX,196
        cwd
        push    DX
        push    AX
        call    ISQRT
        add     SP,4
        push    AX
        mov     AX,0
        push    AX
        lea     SI,-80[BP]
        mov     AX,-110[BP]
        shl     AX,1
        shl     AX,1
        add     SI,AX
        push    WORD PTR +2[SI]
        push    WORD PTR [SI]
        lea     SI,-80[BP]
        mov     AX,-112[BP]
        shl     AX,1
        shl     AX,1
        add     SI,AX
        push    WORD PTR +2[SI]
        push    WORD PTR [SI]
        lea     SI,-96[BP]
        mov     AX,-110[BP]
        shl     AX,1
        shl     AX,1
        add     SI,AX
        push    WORD PTR +2[SI]
        push    WORD PTR [SI]
        lea     SI,-96[BP]
        mov     AX,-112[BP]
        shl     AX,1
        shl     AX,1
        add     SI,AX
        push    WORD PTR +2[SI]
        push    WORD PTR [SI]
        call    QEP_EXP
        add     SP,20
        push    WORD PTR -102[BP]
        push    WORD PTR -104[BP]
        call    CVSFTSL
```

```
            add     SP,4
            mov     -8[BP],AX
            mov     -6[BP],DX
            push    WORD PTR -98[BP]
            push    WORD PTR -100[BP]
            call    CVSFTSL
            add     SP,4
            mov     -4[BP],AX
            mov     -2[BP],DX
            mov     AX,-8[BP]
            mov     DX,-6[BP]
            mov     BX,IDRPX
            mov     CX,IDRPX+2
            add     BX,AX
            adc     CX,DX
            mov     IDRPX,BX
            mov     IDRPX+2,CX
            mov     AX,-4[BP]
            mov     DX,-2[BP]
            mov     BX,IDRPY
            mov     CX,IDRPY+2
            add     BX,AX
            adc     CX,DX
            mov     IDRPY,BX
            mov     IDRPY+2,CX
            mov     AX,0
            mov     -114[BP],AX
.052B:                      ;163
            cmp     WORD PTR -114[BP],4
            jge     .0579
            mov     AX,-8[BP]
            mov     DX,-6[BP]
            lea     SI,IQEPX
            mov     BX,-114[BP]
            shl     BX,1
            shl     BX,1
            add     SI,BX
            mov     BX,[SI]
            mov     CX,+2[SI]
            sub     BX,AX
            sbb     CX,DX
            mov     [SI],BX
            mov     +2[SI],CX
            mov     AX,-4[BP]
            mov     DX,-2[BP]
            lea     SI,IQEPY
            mov     BX,-114[BP]
            shl     BX,1
            shl     BX,1
            add     SI,BX
            mov     BX,[SI]
            mov     CX,+2[SI]
            sub     BX,AX
            sbb     CX,DX
            mov     [SI],BX
            mov     +2[SI],CX
.0574:                      ;167
            inc     WORD PTR -114[BP]
            jmp     SHORT .052B
.0579:                      ;167
            mov     AX,1
            mov     SP,BP
            pop     BP
            ret
.0580:                      ;170
            mov     AX,0
            mov     SP,BP
            pop     BP
            ret
QEP_MOD     ENDP @CODE       ENDS
@CODE       SEGMENT BYTE PUBLIC 'CODE'
            include epilogue.h
            end
@BIGMODEL   EQU     0
            include prologue.h public  UFDSTCAL @CODE       ENDS
@DATAB      SEGMENT
            extrn   COMPASS:word
            extrn   DISTCAL:word
            extrn   IDRPX:word
            extrn   IDRPY:word
@DATAB      ENDS
@CODE       SEGMENT BYTE PUBLIC 'CODE'
@CODE       ENDS
            extrn   LABS:near
            extrn   IATAN2:near
            extrn   @ABS:near @CODE       SEGMENT BYTE PUBLIC  CODE
UFDSTCAL    PROC    NEAR
@CODE       ENDS
            extrn   $LRSSHIFT:near @CODE       SEGMENT BYTE PUBLIC 'CODE'
.00:                        ;30
            push    BP
            mov     BP,SP
            sub     SP,4
            mov     AX,COMPASS
            sub     AX,+4[BP]
            push    AX
            call    @ABS
            add     SP,2
            mov     -4[BP],AX
            cmp     WORD PTR -4[BP],13653
            jge     .020
            jmp     SHORT .027
.020:                       ;45
            cmp     WORD PTR -4[BP],20935
            jle     .02B
.027:                       ;45
            mov     SP,BP
            pop     BP
            ret
.02B:                       ;50
            mov     AX,IDRPX
            mov     DX,IDRPX+2
            sub     AX,+6[BP]
            sbb     DX,+8[BP]
            push    DX
            push    AX
            call    LABS
            add     SP,4
            push    DX
            push    AX
            mov     AX,IDRPY
            mov     DX,IDRPY+2
            sub     AX,+10[BP]
            sbb     DX,+12[BP]
            push    DX
            push    AX
            call    LABS
            add     SP,4
            pop     BX
            pop     CX
            add     BX,AX
            adc     CX,DX
            cmp     CX,10
            jg      .06F
            jne     .06B
            cmp     BX,0
            jae     .06F
.06B:                       ;50
            mov     SP,BP
            pop     BP
            ret
.06F:                       ;54
            mov     AX,IDRPX
```

```
        mov     DX,IDRPX+2
        sub     AX,+6[BP]
        sbb     DX,+8[BP]
        push    DX
        push    AX
        mov     AX,16
        mov     DX,0
        push    DX
        push    AX
        call    $LRSSHIFT
        pop     AX
        pop     DX
        push    AX
        mov     AX,IDRPY
        mov     DX,IDRPY+2
        sub     AX,+10[BP]
        sbb     DX,+12[BP]
        push    DX
        push    AX
        mov     AX,16
        mov     DX,0
        push    DX
        push    AX
        call    $LRSSHIFT
        pop     AX
        pop     DX
        push    AX
        call    IATAN2
        add     SP,4
        mov     -2[BP],AX
        mov     AX,-2[BP]
        sub     AX,+4[BP]
        cmp     AX,4550
        jge     .0FB
        mov     AX,-2[BP]
        sub     AX,+4[BP]
        cmp     AX,-4550
        jle     .0FB
        mov     AX,DISTCAL
        mov     DX,DISTCAL+2
        push    DX
        push    AX
        mov     AX,14
        mov     DX,0
        push    DX
        push    AX
        call    $LRSSHIFT
        pop     AX
        pop     DX
        mov     BX,DISTCAL
        mov     CX,DISTCAL+2
        add     BX,AX
        adc     CX,DX
        mov     DISTCAL,BX
        mov     DISTCAL+2,CX
        mov     SP,BP
        pop     BP
        ret
.0FB:                   ;64
        mov     AX,-2[BP]
        sub     AX,+4[BP]
        cwd
        cmp     DX,-1
        jg      .0111
        jne     .010F
        cmp     AX,-28218
        jae     .0111
.010F:                  ;64
        jmp     SHORT .0125
.0111:                  ;64
        mov     AX,-2[BP]
        sub     AX,+4[BP]
        cwd
        cmp     DX,-1
        jl      .0154
        jne     .0125
        cmp     AX,28218
        jbe     .0154
.0125:                  ;64
        mov     AX,DISTCAL
        mov     DX,DISTCAL+2
        push    DX
        push    AX
        mov     AX,14
        mov     DX,0
        push    DX
        push    AX
        call    $LRSSHIFT
        pop     AX
        pop     DX
        mov     BX,DISTCAL
        mov     CX,DISTCAL+2
        sub     BX,AX
        sbb     CX,DX
        mov     DISTCAL,BX
        mov     DISTCAL+2,CX
        mov     SP,BP
        pop     BP
        ret
.0154:                  ;71
        mov     SP,BP
        pop     BP
        ret
UPDSTCAL        ENDP @CODE   ENDS
@CODE   SEGMENT BYTE PUBLIC 'CODE'
        include epilogue.h
        end
@BIGMODEL       EQU     0
        include prologue.h public  DEVCORR
@CODE   ENDS
@DATAB  SEGMENT
        extrn   DEV:word @DATAB  ENDS
@CODE   SEGMENT BYTE PUBLIC 'CODE'
DEVCORR PROC    NEAR
@CODE   ENDS
        extrn   $LRSSHIFT:near extrn   $LMUL:near @CODE   SEGMENT BYTE PUBLIC 'CODE'
.00:                    ;15
        push    BP
        mov     BP,SP
        sub     SP,6
        mov     AX,32
        push    AX
        mov     AX,-32768
        mov     DX,0
        add     AX,+4[BP]
        mov     DX,11
        mov     CX,DX
        shr     AX,CL
        pop     BX
        xor     DX,DX
        div     BX
        mov     -6[BP],DX
        lea     SI,DEV
        mov     AX,-6[BP]
        shl     AX,1
        shl     AX,1
        add     SI,AX
        mov     AX,[SI]
        mov     DX,+2[SI]
        push    DX
        push    AX
        mov     AX,16
        mov     DX,0
        push    DX
        push    AX
        call    $LRSSHIFT
        pop     AX
        pop     DX
        mov     -4[BP],AX
        lea     SI,DEV
        mov     AX,32
        push    AX
```

```
            mov     AX,-6[BP]
            add     AX,1
            pop     BX
            cwd
            idiv    BX
            shl     DX,1
            shl     DX,1
            add     SI,DX
            mov     AX,[SI]
            mov     DX,+2[SI]
            push    DX
            push    AX
            mov     AX,16
            mov     DX,0
            push    DX
            push    AX
            call    $LRSSHIFT
            pop     AX
            pop     DX
            mov     -2[BP],AX
            mov     AX,2048
            push    AX
            mov     AX,+4[BP]
            pop     BX
            xor     DX,DX
            div     BX
            mov     AX,DX
            xor     DX,DX
            push    DX
            push    AX
            mov     AX,-2[BP]
            sub     AX,-4[BP]
            cwd
            push    DX
            push    AX
            call    $LMUL
            pop     AX
            pop     DX
            push    DX
            push    AX
            mov     AX,11
            mov     DX,0
            push    DX
            push    AX
            call    $LRSSHIFT
            pop     AX
            pop     DX
            add     AX,-4[BP]
            mov     DX,+4[BP]
            add     DX,AX
            mov     +4[BP],DX
            mov     AX,+4[BP]
            mov     SP,BP
            pop     BP
            ret
DEVCORR     ENDP @CODE       ENDS
@CODE       SEGMENT BYTE PUBLIC 'CODE'
            include epilogue.h
            end @BIGMODEL   EQU     0
            include prologue.h public  DEVCORR
@CODE       ENDS
@DATAB      SEGMENT
            extrn   DEV:word @DATAB      ENDS
@CODE       SEGMENT BYTE PUBLIC 'CODE'
DEVCORR     PROC    NEAR
@CODE       ENDS extrn   $LRSSHIFT:near
            extrn   $LMUL:near @CODE       SEGMENT BYTE PUBLIC 'CODE'
.00:                                    ;15
            push    BP
            mov     BP,SP
            sub     SP,6
            mov     AX,32
            push    AX
            mov     AX,-32768
            mov     DX,0
            add     AX,+4[BP]
            mov     DX,11
            mov     CX,DX
            shr     AX,CL
            pop     BX
            xor     DX,DX
            div     BX
            mov     -6[BP],DX
            lea     SI,DEV
            mov     AX,-6[BP]
            shl     AX,1
            shl     AX,1
            add     SI,AX
            mov     AX,[SI]
            mov     DX,+2[SI]
            push    DX
            push    AX
            mov     AX,16
            mov     DX,0
            push    DX
            push    AX
            call    $LRSSHIFT
            pop     AX
            pop     DX
            mov     -4[BP],AX
            lea     SI,DEV
            mov     AX,32
            push    AX
            mov     AX,-6[BP]
            add     AX,1
            pop     BX
            cwd
            idiv    BX
            shl     DX,1
            shl     DX,1
            add     SI,DX
            mov     AX,[SI]
            mov     DX,+2[SI]
            push    DX
            push    AX
            mov     AX,16
            mov     DX,0
            push    DX
            push    AX
            call    $LRSSHIFT
            pop     AX
            pop     DX
            mov     -2[BP],AX
            mov     AX,2048
            push    AX
            mov     AX,+4[BP]
            pop     BX
            xor     DX,DX
            div     BX
            mov     AX,DX
            xor     DX,DX
            push    DX
            push    AX
            mov     AX,-2[BP]
            sub     AX,-4[BP]
```

```
            cwd
            push    DX
            push    AX
            call    $LMUL
            pop     AX
            pop     DX
            push    DX
            push    AX
            mov     AX,11
            mov     DX,0
            push    DX
            push    AX
            call    $LRSSHIFT
            pop     AX
            pop     DX
            add     AX,-4[BP]
            mov     DX,+4[BP]
            add     DX,AX
            mov     +4[BP],DX
            mov     AX,+4[BP]
            mov     SP,BP
            pop     BP
            ret
DEVCORR     ENDP @CODE       ENDS
@CODE       SEGMENT BYTE PUBLIC 'CODE'
            include epilogue.h
            end
```

What is claimed is:

1. Apparatus for providing information to improve the accuracy of tracking a vehicle movable over streets in a given area, comprising:
   (a) first means for providing data identifying respective positions of the vehicle, each position having an accuracy relative to an actual location of the vehicle and one of said positions being a current position, and for providing data identifying a measured heading of the vehicle;
   (b) second means for providing a map data base of the streets; and
   (c) means for deriving any of a plurality of parameters in dependence on one or more respective positions of the vehicle and the streets of the map data base to determine if a more probable current position exists, wherein one of said parameters is the measured heading of the vehicle as compared with the headings of the streets of the map data base.

2. Apparatus for providing information to improve the accuracy of tracking a vehicle movable over streets in a given area, comprising:
   (a) first means for providing data identifying respective positions of the vehicle, each position having an accuracy relative to an actual location of the vehicle and one of said positions being a current position;
   (b) second means for providing a map data base of the streets; and
   (c) means for deriving any of a plurality of parameters in dependence on one or more respective positions of the vehicle and the streets of the map data base to determine if a more probable current position exists, wherein one of the parameters is the closeness of two streets of the map data base to one another.

3. Apparatus, according to claim 2, wherein the two streets qualify as possibly correponding to the more probable current position, one of said two streets being on one side of said current position and the other of said two being on the other side of said current position.

4. Apparatus, according to claim 3, wherein said means for deriving rejects said two streets as possibly corresponding to said more probable current position if the distance between said current position and said one street and the distance between said current position and said other street are similar to each other.

5. Apparatus for providing information to improve the accuracy of tracking a vehicle movable over streets in a given area, comprising:
   (a) first means for providing data identifying respective positions of the vehicle, each position having an accuracy relative to an actual location of the vehicle and one of said positions being a current position, and for providing data identifying a measured heading of the vehicle;
   (b) second means for providing a map data base of the streets;
   (c) means for deriving any of a plurality of parameters in dependence on one or more respective positions of the vehicle and the streets of the map data base to determine if a more probable current position exists, wherein one of said parameters is the measured heading of the vehicle as compared with the headings of the streets of the map data base; and
   (d) means for providing an estimate of said accuracy of the respective positions.

6. Apparatus, according to claim 5, wherein each position of the vehicle has an accumulation of error, and wherein said estimate changes as the vehicle moves to reflect the accumulation of error and changes if a more probable current position is determined to exist to reflect a greater accuracy of the more probable current position.

7. Apparatus, according to claim 6, wherein said estimate changes at a varying rate as the vehicle moves.

8. Apparatus, according to claim 6, wherein said estimate is a contour enclosing an area having a probability of containing the actual location of the vehicle.

9. Apparatus, according to claim 5, wherein one of said parameters is the closeness of said current position to respective streets of the map data base, said closeness being dependent on said estimate.

10. Apparatus, according to claim 9, wherein a given street of the map data base does not qualify as possibly corresponding to the more probable current position if said closeness parameter indicates that the distance of said current position to said given street is greater than a given threshold.

11. Apparatus, according to claim 9, wherein a given street of the map data base qualifies as possibly corresponding to the more probable current position if said closeness parameter indicates that the distance of said current position to said given street is less than a given threshold.

12. Apparatus for providing information to improve the accuracy of tracking a vehicle movable over streets in a given area, comprising:
   (a) first means for providing data identifying respective positions of the vehicle, each position having an accuracy relative to an actual location of the vehicle and one of said positions being a current position;

(b) second means for providing a map data base of the streets; and (c) means for deriving any of a plurality of parameters in dependence on one or more respective positions of the vehicle and the streets of the map data base to determine if a more probable current position exists, wherein one of the parameters is the connectivity of the streets of the map data base.

13. Apparatus, according to claim 12, wherein one of the positions of the vehicle is an old position corresponding to a point on one of the streets of the map data base, and wherein a given street may not qualify as possibly corresponding to the more probable current position if said given street is not directly connected to said one street.

14. Apparatus, according to claim 12, wherein one of the positions of the vehicle is an old position corresponding to a point on one of the streets of the map data base, and wherein a given street qualifies as possibly corresponding to the more probable current position if said given street is directly connected to said one street.

15. Apparatus for providing information to improve the accuracy of tracking a vehicle movable over streets in a given area, comprising:

(a) first means for providing data identifying respective positions of the vehicle, each position having an accuracy relative to an actual location of the vehicle and one of said positions being a current position;

(b) second means for providing a map data base of the streets; and (c) means for deriving any of a plurality of parameters in dependence on one or more respective positions of the vehicle and the streets of the map data base to determine if a more probable current position exists, wherein one of said parameters is a correlation of the path of the vehicle indicated by the respective positions of the vehicle and the path of a given street of the map data base.

16. Apparatus, according to claim 15, wherein said means for deriving determines that the more probable current position corresponds to a point on said given street indicated by said correlation parameter as the best correlation.

17. Apparatus, according to claim 15, wherein a given street does not qualify as possibly corresponding to the more probable current position if said correlation parameter has a minimum value greater than a given threshold.

18. Apparatus, according to claim 15, wherein said correlation parameter has a minimum value, and wherein said given street does not qualify as possibly corresponding to the more probable current position if a second order difference equation identifies a change in slope at said minimum value less than a given threshold.

19. Apparatus, according to claim 15, wherein a given street qualifies as possibly corresponding to the more probable current position if said correlation parameter has a minimum value less than a given threshold and if a second order difference equation identifies a change in slope at said minimum value greater than a given threshold.

20. Apparatus for providing information to improve the accuracy of tracking a vehicle movable over streets in a given area, comprising:

(a) first means for providing data identifying respective positions of the vehicle, each position having an accuracy relative to an actual location of the vehicle and one of said positions being a current position, and for providing data identifying a measured heading of the vehicle;

(b) second means for providing a map data base of the streets; and (c) means for deriving any of a plurality of parameters in dependence on one or more respective positions of the vehicle and the streets of the map data base to determine if a more probable current position exists, wherein one of said parameters is the measured heading of the vehicle as compared with the headings of the streets of the map data base, and wherein a given street of the map data base does not qualify as possibly corresponding to the more probable current position if the difference between said measured heading and the heading of said given street is greater than a given threshold.

21. Apparatus for providing information to improve the accuracy of tracking a vehicle movable over streets in a given area, comprising:

(a) first means for providing data identifying respective positions of the vehicle, each position having an accuracy relative to an actual location of the vehicle and one of said positions being a current position, and for providing data identifying a measured heading of the vehicle;

(b) second means for providing a map data base of the streets; and (c) means for deriving any of a plurality of parameters in dependence on one or more respective positions of the vehicle and the streets of the map data base to determine if a more probable current position exists, wherein one of said parameters is the measured heading of the vehicle as compared with the headings of the streets of the map data base, and wherein a given street of the map data base qualifies as possibly corresponding to the more probable current position if the difference between said measured heading and the heading of said given street is less than a given threshold.

22. Apparatus for providing information to improve the accuracy of tracking a vehicle movable over streets in a given area, comprising:

(a) first means for providing data identifying respective positions of the vehicle, each position having an accuracy relative to an actual location of the vehicle and one of said positions being a current position;

(b) second means for providing a map data base of the streets; and (c) means for deriving any of a plurality of parameters in dependence on one or more respective positions of the vehicle and the streets of the map data base to determine if a more probable current position exists, wherein said means for deriving determines from said plurality of parameters if any said streets of said map data base qualify as possibly corresponding to the more probable current position, and if no said street is determined, then said current position is retained as an old position by said first means for providing data to provide data identifying a succeeding position of the vehicle.

23. Apparatus for providing information to improve the accuracy of tracking a vehicle movable over streets in a given area, comprising:

(a) first means for providing data identifying respective positions of the vehicle, each position having an accuracy relative to an actual location of the vehicle and one of said positions being a current position;

(b) second means for providing a map data base of the streets; and (c) means for deriving any of a plurality of parameters in dependence on one or more respective positions of the vehicle and the streets of the map data base to determine if a more probable current position exists, wherein said means for deriving determines from said plurality of parameters if any of said streets of said map data base qualify as possibly corresponding to the more probable current position, and if one of said streets is determined, then said more probable current position is retained as an old position by said first means for providing data to provide data identifying a succeeding position of the vehicle.

24. Apparatus for providing information to improve the accuracy of tracking a vehicle movable over streets in a given area, comprising:
(a) first means for providing data identifying respective positions of the vehicle, each position having an accuracy relative to an actual location of the vehicle and one of said positions being a current position;
(b) second means for providing a map data base of the streets;
(c) means for deriving any of a plurality of parameters in dependence on one or more respective positions of the vehicle and the streets of the map data base to determine if a more probable current position exists; and
(d) wherein said first means for providing data comprises sensor means for producing heading data indicating the direction of the vehicle, wherein a given one of said streets of said map data base has a direction corresponding to the direction of the vehicle, and further comprising means for calibrating said sensor means by comparing said direction of the vehicle and said direction of said given street and adjusting said heading data to minimize average error between said direction of the vehicle and said direction of said given street.

25. Apparatus for providing information to improve the accuracy of tracking a vehicle movable over streets in a given area, comprising:
(a) first means for providing data identifying respective positions of the vehicle, each position having an accuracy relative to an actual location of the vehicle and one of said positions being a current position;
(b) second means for providing a map data base of the streets;
(c) means for deriving any of a plurality of parameters in dependence on one or more respective positions of the vehicle and the streets of the map data base to determine if a more probable current position exists; and
(d) wherein said first means for providing comprises sensor means for producing distance data indicating the distance traveled by the vehicle; wherein, upon the vehicle moving from one street onto another street, the position of the vehicle may be at a certain distance away from the corresponding other street of the map data base; and further comprising means for calibrating said sensor means by adjusting said distance data in dependence on said certain distance.

26. A method of automatically tracking a vehicle movable about streets of an overall given area, comprising:
(a) providing first data identifying respective positions of the vehicle as the vehicle moves about the streets, each position having a certain accuracy and one of the positions being a current position;
(b) providing second data being an estimate of the accuracy of the respective positions of the vehicle, the estimate changing as the vehicle moves about the streets to reflect the accuracy of the respective positions;
(c) providing a map data base of the streets of the given area; and
(d) determining if a more probable current position than the current position exists in response to the first data, the second data and the map data base.

27. Apparatus for providing information to improve the accuracy of tracking a vehicle movable over streets, comprising:
(a) first means for providing data identifying respective positions of the vehicle, each position having a certain accuracy and a current position possibly being subject to being updated; and
(b) second means for providing an estimate of the accuracy of the positions of the vehicle, the estimate changing as the vehicle moves and changing if the current position is updated, the estimate being used to determine if a more probable position than the current position exists.

28. Apparatus, according to claim 27, wherein said first means for providing data comprises sensor means for generating information about the distance traveled and heading of the vehicle, and wherein said estimate changes in dependence on the accuracy of said sensor means.

29. Apparatus, according to claim 27, further comprising means for providing a map data base having a certain accuracy of the location of the streets, and wherein said estimate is dependent on the accuracy of said map data base.

30. Apparatus, according to claim 27, wherein said estimate changes at a varying rate as the vehicle moves.

31. Apparatus, according to claim 30, wherein said first means for providing data comprises sensor means for generating information having a certain quality about the heading of the vehicle, and wherein said varying rate is dependent on the quality of the heading information.

32. Apparatus, according to claim 30, wherein said first means for providing data comprises sensor means for generating information having a certain quality about the distance traveled by the vehicle, and wherein said varying rate is dependent on the quality of the distance information.

33. Apparatus, according to claim 30, wherein said varying rate is dependent on the performance of the apparatus.

34. Apparatus, according to claim 33, wherein said performance is dependent on the distance that a current position was moved upon being updated and the distance traveled by the vehicle between the update of a preceding position and the update of the current position.

35. Apparatus, according to claim 27, wherein said estimate of the accuracy of the positions can be different in different directions relative to the direction of movement of the vehicle.

36. Apparatus, according to claim 27, wherein said estimate of the accuracy of the respective positions is a probability density function in the vicinity of the respective positions.

37. Apparatus, according to claim 27, wherein said estimate of the accuracy of the respecitve positions is a plurality of points defining a shape enclosing an area having a probabilty of including the actual location of the vehicle.

38. Apparatus, according to claim 27, wherein said estimate of the accuracy of the respective positions is a set of one or more equations defining a distribution of probability associated with the respective positions.

39. Apparatus, according to claim 27, wherein said estimate is a table of values defining a distribution of probability associated with the respective positions.

40. Apparatus for automatically tracking a vehicle movable about streets of an overall given area, comprising:
 (a) first means for providing first data identifying respective positions of the vehicle as the vehicle moves about the streets, each position having a certain accuracy and one of the positions being a current position;
 (b) second means for providing second data being an estimate of the accuracy of the respective positions of the vehicle, the estimate changing as the vehicle moves about the streets to reflect the accuracy of the respective positions;
 (c) third means for providing a map data base of the streets of the given area; and
 (d) means for determining if a more probable position than the current position exists in response to the first data, the second data and the map data base.

41. Apparatus, according to claim 40, wherein said means for determining updates the current position to an updated current position if a more probable position exists.

42. Apparatus, according to claim 41, wherein said means for determining comprises:
 (a) means for identifying a most probable street on which the vehicle may be actually moving; and
 (b) means for correlating certain of the positions with positions along the most probable street, the updated current position corresponding to a most probable point on the most probable street in response to the correlation.

43. Apparatus, according to claim 41, wherein said means for determining updates the estimate of the accuracy of the current position to an updated estimate of the accuracy of the updated position.

44. Apparatus, according to claim 43, wherein said updated estimate is decreased in size relative to the size of the estimate of the accuracy of the current position to reflect the greater accuracy of the updated current position.

45. Apparatus, according to claim 40, wherein said means for determining does not update the current position if it is determined that a more probable position does not exist.

46. Apparatus, according to claim 40, further comprising fourth means for providing calibration data for calibrating said first data providing means, and means for periodically adjusting the calibration data.

47. Apparatus, according to claim 40, wherein said means for determining comprises:
 (a) means for identifying the current position;
 (b) means for identifying a most probable street on which the vehicle may be actually moving;
 (c) means for determining a most probable point on the most probable street; and
 (d) means for determining a most probable overall update position of the vehicle in response to the current position and the most probable point, the overall update position not necessarily lying on the most probable street.

48. Apparatus, according to claim 40, wherein the vehicle may be moving over an actual path not all of which is in the map data base, and wherein said means for determining updates and does not update the current position to a more probable position as the vehicle moves on and off the streets of the map data base.

49. Apparatus for automatically tracking a vehicle movable about streets of an overall given area, comprising:
 (a) first means for providing first data identifying respective dead reckoned positions of the vehicle as the vehicle moves about the streets, each dead reckoned position having a certain accuracy and one of the dead reckoned positions being a current position;
 (b) second means for providing second data identifying an estimate of the accuracy of the respective dead reckoned positions in the form of a contour containing the respective dead reckoned positions of the vehicle and approximating a probability of containing the actual location on the vehicle, the contour changing as the vehicle moves about the streets;
 (c) third means for providing a map data base of the streets of the given area; and
 (d) means for updating the current dead reckoned position of the vehicle to an updated current dead reckoned position corresponding to a more probable point on one of the streets in response to said first data identifying the current dead reckoned position, said second data identifying the contour associated with the current dead reckoned position, and said map data base.

50. Apparatus, according to claim 49, further comprising means for updating the contour associated with the current dead reckoned position to an updated contour upon updating the current dead reckoned position.

51. Apparatus, according to claim 50, wherein the contour associated with the current dead reckoned position is updated in response to the second data identifying the contour associated with the current dead reckoned position and the one street of the map data base, the updated contour having approximately the same probability of containing the actual location of the vehicle as the contour associated with the current dead reckoned position but contracting in size to reflect the increased accuracy of the updated dead reckoned position as compared to the current dead reckoned position.

52. Apparatus, according to claim 49, wherein said first means for providing comprises:
 (a) means for producing data indicating the distance traveled by the vehicle; and
 (b) means for producing data indicating the heading of the vehicle.

53. Apparatus, according to claim 52, further comprising:
 (a) means for providing calibration data for calibrating said means for producing distance data and said means for producing heading data; and
 (b) means for adjusting the calibration data.

54. Apparatus, according to claim 49, wherein the contour associated with one dead reckoned position is moved and expanded relative to the contour associated with a preceding dead reckoned position if the vehicle has moved a minimum distance.

55. Apparatus, according to claim 54, wherein the contour is expanded in proportion to the distance traveled by the vehicle.

56. Apparatus, according to claim 54, wherein the contour is expanded in proportion to the accuracy of said first means for providing data.

57. Apparatus, according to claim 49, wherein said means for updating determines one or more streets of said map data base as qualifying as lines-of-position.

58. Apparatus, according to claim 57, wherein the line-of-position of the one street having the point corresponding to the updated current dead reckoned position is substantially parallel to the heading of the vehicle.

59. Apparatus, according to claim 58, wherein the line-of-position of the one street intersects the contour associated with the current dead reckoned position.

60. Apparatus, according to claim 59, wherein the line-of-position of the one street is connected to another line-of-position having a point corresponding to a next preceding updated current dead reckoned position.

61. Apparatus, according to claim 49, wherein said means for updating comprises means for correlating certain of the dead reckoned positions indicating the path of the vehicle with the path of the one street to determine said more probable point on the one street in response to the correlation.

62. Apparatus, according to claim 49, wherein said means for updating determines lines-of-position in response to the map data base, each line-of-position corresponding to a street over which the vehicle may be moving and being substantially parallel to the heading of the vehicle and intersecting the contour associated with the current dead reckoned position.

63. Apparatus, according to claim 62, wherein said means for updating determines which one of the lines-of-position is the most probable line-of-position corresponding to the most probable street over which the vehicle may be moving, the most probable street being the one street.

64. Apparatus, according to claim 63, wherein said means for updating determines if no one line-of-position is most probable and, in response, the current dead reckoned position is not updated.

65. A system for automatically tracking a vehicle movable on streets of a given area, comprising:
 (a) first means for providing first data being respective dead reckoned positions of the vehicle, one of the dead reckoned positions being current dead reckoned position, including
  (i) means for generating data identifying the distance traveled by the vehicle, and
  (ii) means for generating data identifying the heading of the vehicle;
 (b) second means for providing second data identifying and estimate of the accuracy of the respective dead reckoned positions in the form of a contour of equal probability containing the respective dead reckoned positions of the vehicle and approximating a probability of containing the actual location of the vehicle, the contour changing as the vehicle moves on the streets;
 (c) means for providing third data identifying a map data base of the streets of the given area;
 (d) means for determining lines-of-position corresponding to the streets in response to the map data base, in which one or more lines-of-position are substantially parallel to the heading of the vehicle and intersect the contour associated with the current dead reckoned position, one of which may be a most probable line-of-position corresponding to a street on which the vehicle most probably is moving;
 (e) means for updating the current dead reckoned position to an updated current dead reckoned position corresponding to a point on the most probable line-of-position; and
 (f) means for updating the contour associated with the current dead reckoned position to an updated contour upon updating the current dead reckoned position, in which the contour containing the respective dead reckoned positions expands in size as the vehicle moves to reflect a decreased accuracy in the respective dead reckoned positions until the updated dead reckoned position is produced and then contracts in size to reflect the increased accuracy of the updated dead reckoned position as compared to the current dead reckoned position, the expanding contour and contracted contour having approximately the same probability of containing the actual location of the vehicle.

66. A system, according to claim 65, wherein said means for generating distance data and said means for generating heading data each has a certain accuracy, and wherein the contour expands in proportion to the said accuracy.

67. A system, according to claim 66, wherein the contour expands at a varying rate which is dependent on the distance that the current dead reckoned position is moved upon being updated and the distance traveled by the vehicle between a preceding update of a dead reckoned position and the update of the current dead reckoned position.

68. A system, according to claim 66, wherein said means for generating heading data comprises:
 (a) first sensor means for generating first heading data; and
 (b) second sensor means for generating second heading data.

69. A system, according to claim 68, wherein the contour expands at a varying rate which is dependent on any difference between said first heading data and said second heading data.

70. A system, according to claim 65, wherein said means for determining lines-of-position comprises:
 (a) means for determining all the lines-of-position on one side of the current dead reckoned position and selecting one line-of-position on the one side closest to the current dead reckoned position;
 (b) means for determining all the lines-of-position on the other side of the current dead reckoned position and selecting one line-of-position on that other side closest to the current dead reckoned position; and
 (c) means for selecting between the one line-of-position on the one side or the one line-of-position on the other side as the most probable line of position.

71. A system, according to claim 70, wherein neither the one line-of-position on the one side or the one line-of-position on the other side is selected if the distance between the one line-of-position on the one side and the one line-of-position on the other side is smaller than a given threshold.

72. A system, according to claim 65, wherein said third data identifying a map data base includes street foreshortening error information, and wherein said dead reckoned positions are provided in dependence on said street foreshortening error information.

73. A vehicle navigational system for automatically tracking a motor vehicle movable over streets of a given area identified by a map, the vehicle navigational system being installable on the vehicle, comprising:
 (a) first means for sensing the distance traveled by the motor vehicle and for generating distance data;
 (b) second means for sensing the heading of the motor vehicle and for generating heading data;
 (c) means for storing a map data base identifying of the streets;
(d) means for displaying the map and a motor vehicle symbol movable relative to the displayed map; and
(e) programmed computer means for:
  (i) providing data identifying respective dead reckoned positions of the motor vehicle in response to the distance data and the heading data, one of the dead reckoned positions being a current dead reckoned position;
  (ii) providing data identifying a contour containing the respective dead reckoned positions, the contour expanding from one dead reckoned position to another dead reckoned position as the vehicle moves until the current dead reckoned position is updated;
  (iii) determining lines-of-position corresponding to respective streets in response to the map data base, one of which may be a most probable line-of-position corresponding to a street over which the motor vehicle may be moving, the most probable line-of-position being substantially parallel to the heading of the motor vehicle, intersecting the contour associated with the current dead reckoned position and being connected to a next preceding most probable line-of-position corresponding to a next preceding updated current dead reckoned position;
  (iv) updating the current dead reckoned position to an updated dead reckoned position on a more probable point on the most probable line-of-position in response to the current dead reckoned position, the contour associated with the current dead reckoned position and the most probable line-of-position;
  (v) updating the contour associated with the current dead reckoned position to an updated contour containing the updated dead reckoned position in response to the contour associated with the current dead reckoned position and the most probable line-of-position; and
  (vi) controlling said displaying means to display the map in response to the map data base and to display the motor vehicle symbol in response to the data identifying the respective dead reckoned positions.

74. A vehicle navigational system, according to claim 73, wherein the current dead reckoned position is not updated if it is determined that there is no most probable line-of-position.

75. A vehicle navigational system, according to claim 74, wherein said programmed computer means stores calibration data about said first means for sensing and said second means for sensing and adjusts the calibration data upon updating the current dead reckoned position and the contour.

76. A vehicle navigational system, according to claim 74, wherein the contour expands at a varying rate which is dependent on the distance that the current dead reckoned position is moved upon being updated and the distance traveled by the vehicle between a peceding update of a dead reckoned position and the update of the current dead reckoned position.

77. A vehicle navigational system, according to claim 76, wherein said first means and said second means for sensing each has a certain accuracy, and said varying rate is in proportion to such accuracy.

78. A method for providing information to improve the accuracy of tracking a vehicle movable over streets in a given area, comprising:
(a) providing data identifying respective positions of the vehicle, each position having an accuracy relative to an actual location of the vehicle and one of the positions being a current position;
(b) providing a map data base of the streets; and
(c) deriving any of a plurality of parameters in dependence on one or more respective positions of the vehicle and the streets of the map data base to determine if a more probable current position exists.

* * * * *

UNITED STATES PATENT AND TRADEMARK OFFICE
CERTIFICATE OF CORRECTION

PATENT NO. : 4,796,191

DATED : January 3, 1989

INVENTOR(S) : Honey, et al.

It is certified that error appears in the above-identified patent and that said Letters Patent is hereby corrected as shown below:

Column 8, line 51: "parts $P_1-R_5$" should be -- parts $P_1-P_5$ --

Column 8, line 58: "true length" should be -- true lengths --

Column 10, line 48: "horizontal of XY" should be
    -- horizontal or XY --

Column 11, line 42: "time of the vehicle" should be
    -- time the vehicle --

Column 14, line 51: "segments $S_2$" should be -- segment $S_2$ --

Column 27, line 55: "$S_1$" should be -- S --

Column 29, Line 1: The "(20)" should be moved to the right

Column 29, lines 11-12: After "of" add "the".

Column 30, lines 15-16: "placed on the position" should be
    -- placed the position --

Column 30, line 52: "where $D_4$" should be -- where $D_R$ --

Column 117, line 12: "may not quality" should be
    -- may not qualify --

Column 120, line 69: "respecitve positions" should be
    -- respective positions --

UNITED STATES PATENT AND TRADEMARK OFFICE
CERTIFICATE OF CORRECTION

PATENT NO. : 4,796,191
DATED : January 3, 1989
INVENTOR(S) : Honey, et al

Page 2 of 2

It is certified that error appears in the above-identified patent and that said Letters Patent is hereby corrected as shown below:

Column 123, line 49: "and estimate" should be --an estimate--.

Column 126, line 22: "a peceding" should be -- a preceding --.

Signed and Sealed this

Seventh Day of November, 1989

Attest:

JEFFREY M. SAMUELS

Attesting Officer

Acting Commissioner of Patents and Trademarks